(12) United States Patent
Avedissian et al.

(10) Patent No.: US 12,273,585 B2
(45) Date of Patent: Apr. 8, 2025

(54) INTERACTIVE VIDEO DISTRIBUTION SYSTEM AND VIDEO PLAYER UTILIZING A CLIENT SERVER ARCHITECTURE

(71) Applicant: Scorpcast, LLC, Leander, TX (US)

(72) Inventors: Narbeh Avedissian, Encino, CA (US); Nikhil Sreenath, Leander, TX (US)

(73) Assignee: Scorpcast, LLC, Leander, TX (US)

( * ) Notice: Subject to any disclaimer, the term of this patent is extended or adjusted under 35 U.S.C. 154(b) by 0 days.

(21) Appl. No.: 18/673,819

(22) Filed: May 24, 2024

(65) Prior Publication Data

US 2024/0314387 A1   Sep. 19, 2024

Related U.S. Application Data

(63) Continuation of application No. 18/413,710, filed on Jan. 16, 2024, which is a continuation of application
(Continued)

(51) Int. Cl.
*H04N 21/431* (2011.01)
*G06F 3/0481* (2022.01)
(Continued)

(52) U.S. Cl.
CPC ....... *H04N 21/4312* (2013.01); *G06F 3/0481* (2013.01); *G06F 3/04842* (2013.01);
(Continued)

(58) Field of Classification Search
None
See application file for complete search history.

(56) References Cited

U.S. PATENT DOCUMENTS 5,774,869 A   6/1998   Toader
5,911,131 A   6/1999   Vig
(Continued)

FOREIGN PATENT DOCUMENTS

CN   102547566   7/2012
CN   102946378   2/2013
(Continued)

OTHER PUBLICATIONS

Cocks et al., Decision Denying Institution of Inter Partes Review, "*MG Freesites Ltd., v. Scorpcast, LLC*," IPR2021-00511, U.S. Pat. No. 8,595,057 B2, Paper 15, Sep. 3, 2021, in 24 pages.
(Continued)

*Primary Examiner* — Alexander Q Huerta
(74) *Attorney, Agent, or Firm* — Knobbe, Martens, Olson & Bear LLP

(57) ABSTRACT

An interactive video distribution system and video player are described. A client server arrangement may be used for providing a video player and video content to a client device. The video player may display navigation images enabling navigation to specific portions of the video content by activating a corresponding navigation image. The video player may also enable the sharing of a segment of the video with other video players, enabling the video players to play the streamed segment of the video without having to play the entire video, thereby reducing network bandwidth usage. The video player may be embeddable. The server may associate searchable tags with respective video segments.

32 Claims, 47 Drawing Sheets

Related U.S. Application Data

No. 17/821,777, filed on Aug. 23, 2022, now Pat. No. 11,902,614, which is a continuation of application No. 17/455,639, filed on Nov. 18, 2021, now Pat. No. 11,432,033, which is a continuation of application No. 17/163,082, filed on Jan. 29, 2021, now Pat. No. 11,184,664, which is a continuation of application No. 16/775,983, filed on Jan. 29, 2020, now Pat. No. 11,012,734, which is a continuation of application No. 16/250,883, filed on Jan. 17, 2019, now Pat. No. 10,560,738, which is a continuation of application No. 16/011,480, filed on Jun. 18, 2018, now Pat. No. 10,205,987, which is a continuation of application No. 15/797,988, filed on Oct. 30, 2017, now Pat. No. 10,057,628, which is a continuation of application No. 14/990,690, filed on Jan. 7, 2016, now Pat. No. 9,832,519, which is a continuation-in-part of application No. 14/167,867, filed on Jan. 29, 2014, now abandoned, which is a continuation-in-part of application No. 13/804,121, filed on Mar. 14, 2013, now Pat. No. 8,682,809, which is a continuation-in-part of application No. 13/451,478, filed on Apr. 19, 2012, now Pat. No. 8,635,169, and a continuation-in-part of application No. 13/449,610, filed on Apr. 18, 2012, now Pat. No. 8,615,474.

(51) Int. Cl.

| | |
|---|---|
| *G06F 3/04842* | (2022.01) |
| *G06Q 30/02* | (2023.01) |
| *G06Q 30/0251* | (2023.01) |
| *G11B 27/10* | (2006.01) |
| *H04N 21/4223* | (2011.01) |
| *H04N 21/4722* | (2011.01) |
| *H04N 21/475* | (2011.01) |
| *H04N 21/4788* | (2011.01) |
| *H04N 21/482* | (2011.01) |
| *H04N 21/61* | (2011.01) |
| *H04N 21/81* | (2011.01) |
| *H04N 21/845* | (2011.01) |
| *H04N 21/858* | (2011.01) |

(52) U.S. Cl.
CPC ..... *G06Q 30/0261* (2013.01); *G06Q 30/0278* (2013.01); *G11B 27/10* (2013.01); *H04N 21/4223* (2013.01); *H04N 21/4722* (2013.01); *H04N 21/4756* (2013.01); *H04N 21/4788* (2013.01); *H04N 21/4828* (2013.01); *H04N 21/6125* (2013.01); *H04N 21/812* (2013.01); *H04N 21/8456* (2013.01); *H04N 21/8586* (2013.01)

(56) References Cited

U.S. PATENT DOCUMENTS

| | | | |
|---|---|---|---|
| 5,913,204 | A | 6/1999 | Kelly |
| 6,029,141 | A | 2/2000 | Bezos et al. |
| 6,073,127 | A | 6/2000 | Lannert et al. |
| 6,086,380 | A | 7/2000 | Chu et al. |
| 6,175,840 | B1 | 1/2001 | Chen et al. |
| 6,216,112 | B1 | 4/2001 | Fuller et al. |
| 6,248,946 | B1 | 6/2001 | Dwek |
| 6,317,761 | B1 | 11/2001 | Landsman et al. |
| 6,317,811 | B1 | 11/2001 | Deshpande et al. |
| 6,317,881 | B1 | 11/2001 | Shah-Nazaroff et al. |
| 6,343,313 | B1 | 1/2002 | Salesky et al. |
| 6,363,356 | B1 | 3/2002 | Horstmann |
| 6,496,981 | B1 | 12/2002 | Wistendahl et al. |
| 6,530,082 | B1 | 3/2003 | Del Sesto et al. |
| 6,968,243 | B1 | 11/2005 | Oh |
| 7,027,983 | B2 | 4/2006 | Puterbaugh et al. |
| 7,069,310 | B1 | 6/2006 | Bartholomew |
| 7,076,434 | B1 | 7/2006 | Newnam et al. |
| 7,080,139 | B1 | 7/2006 | Briggs et al. |
| 7,139,813 | B1 | 11/2006 | Wallenius |
| 7,158,942 | B2 | 1/2007 | Miyazaki et al. |
| 7,162,433 | B1 | 1/2007 | Foroutan |
| 7,191,023 | B2 | 3/2007 | Williams |
| 7,297,860 | B2 | 11/2007 | Decuir |
| 7,308,413 | B1 | 12/2007 | Tota et al. |
| 7,512,421 | B2 | 3/2009 | Kim et al. |
| 7,539,742 | B2 | 5/2009 | Spector |
| 7,592,532 | B2 | 9/2009 | Coleman |
| 7,664,678 | B1 | 2/2010 | Haber |
| 7,720,707 | B1 | 5/2010 | Mowry |
| 7,735,101 | B2 | 6/2010 | Lanza et al. |
| 7,792,782 | B2 | 9/2010 | Yun |
| 7,809,802 | B2 | 10/2010 | Lerman et al. |
| 7,865,394 | B1 | 1/2011 | Calloway et al. |
| 7,945,463 | B2 | 5/2011 | Sussman et al. |
| 8,099,325 | B2 | 1/2012 | Gangadharpalli et al. |
| 8,103,545 | B2 | 1/2012 | Ramer et al. |
| 8,162,758 | B1 * | 4/2012 | Powers ............... H04N 21/4756 |
| | | | 705/12 |
| 8,175,252 | B2 | 5/2012 | Batni et al. |
| 8,209,396 | B1 | 6/2012 | Raman |
| 8,250,070 | B1 | 8/2012 | He |
| 8,290,824 | B1 | 10/2012 | Mesaros |
| 8,312,486 | B1 | 11/2012 | Briggs et al. |
| 8,342,412 | B2 | 1/2013 | Schacherer et al. |
| 8,365,081 | B1 | 1/2013 | Amacker |
| 8,447,324 | B2 | 5/2013 | Shuman et al. |
| 8,458,053 | B1 | 6/2013 | Buron |
| 8,479,246 | B2 | 7/2013 | Hudson et al. |
| 8,595,057 | B2 | 11/2013 | Avedissian |
| 8,615,474 | B2 | 12/2013 | Avedissian |
| 8,635,169 | B2 | 1/2014 | Avedissian |
| 8,682,809 | B2 | 3/2014 | Avedissian |
| 8,700,714 | B1 * | 4/2014 | Pan ......................... H04L 65/60 |
| | | | 709/206 |
| 8,806,000 | B1 * | 8/2014 | Wattenhofer ......... G06F 40/143 |
| | | | 709/224 |
| 8,813,132 | B2 | 8/2014 | Andrews, II et al. |
| 8,849,945 | B1 | 9/2014 | Desjardins |
| 9,071,730 | B2 | 6/2015 | Livesey |
| 9,661,390 | B2 | 5/2017 | Li et al. |
| 9,697,504 | B2 | 7/2017 | Spitz |
| 10,055,768 | B2 | 8/2018 | Briggs |
| 10,080,056 | B2 | 9/2018 | Amento |
| 10,095,390 | B1 | 10/2018 | Lewis et al. |
| 10,289,732 | B2 | 5/2019 | Marchiori et al. |
| 2001/0025259 | A1 | 9/2001 | Rouchon |
| 2002/0013785 | A1 | 1/2002 | Miyazaki et al. |
| 2002/0056123 | A1 | 5/2002 | Liwerant |
| 2002/0091455 | A1 | 7/2002 | Williams |
| 2002/0103695 | A1 | 8/2002 | Urken et al. |
| 2002/0143607 | A1 | 10/2002 | Connelly |
| 2002/0198723 | A1 | 12/2002 | Mowry |
| 2003/0028873 | A1 | 2/2003 | Lemmons |
| 2003/0036944 | A1 | 2/2003 | Lesandrini et al. |
| 2003/0075036 | A1 | 4/2003 | Isozaki et al. |
| 2003/0093790 | A1 * | 5/2003 | Logan ................. G06F 16/7867 |
| | | | 348/E7.071 |
| 2003/0105666 | A1 | 6/2003 | Taub et al. |
| 2003/0130894 | A1 | 7/2003 | Huettner et al. |
| 2003/0079015 | A1 | 8/2003 | Fein et al. |
| 2003/0149574 | A1 | 8/2003 | Rudman |
| 2003/0164084 | A1 | 9/2003 | Redmann et al. |
| 2003/0167465 | A1 | 9/2003 | Davis et al. |
| 2003/0171982 | A1 | 9/2003 | Paul |
| 2003/0187802 | A1 | 10/2003 | Booth |
| 2003/0229537 | A1 | 12/2003 | Dunning et al. |
| 2004/0003097 | A1 | 1/2004 | Willis et al. |
| 2004/0015427 | A1 | 1/2004 | Camelio |
| 2004/0090462 | A1 * | 5/2004 | Graham ................. G06F 16/40 |
| | | | 715/767 |
| 2004/0093236 | A1 | 5/2004 | Chacker |
| 2004/0093249 | A1 | 5/2004 | Chacker |

(56) References Cited

U.S. PATENT DOCUMENTS

| | | |
|---|---|---|
| 2005/0021903 A1 | 1/2005 | Baxter, Jr. |
| 2005/0022226 A1 | 1/2005 | Ackley |
| 2005/0071865 A1 | 3/2005 | Martins |
| 2005/0097613 A1 | 5/2005 | Ulate et al. |
| 2005/0120389 A1 | 6/2005 | Boss et al. |
| 2005/0195292 A1 | 9/2005 | McIntyre et al. |
| 2005/0229227 A1 | 10/2005 | Rogers |
| 2005/0246377 A1 | 11/2005 | Faso |
| 2005/0251399 A1 | 11/2005 | Agarwal et al. |
| 2005/0267819 A1 | 12/2005 | Kaplan |
| 2005/0276246 A1 | 12/2005 | Walker et al. |
| 2006/0009979 A1 | 1/2006 | McHale et al. |
| 2006/0015893 A1 | 1/2006 | Kitsukawa |
| 2006/0026593 A1 | 2/2006 | Canning et al. |
| 2006/0080716 A1 | 4/2006 | Nishikawa |
| 2006/0106675 A1 | 5/2006 | Cohen et al. |
| 2006/0129688 A1 | 6/2006 | Chatani et al. |
| 2006/0143068 A1 | 6/2006 | Calabria |
| 2006/0149681 A1 | 7/2006 | Meisner |
| 2006/0155575 A1 | 7/2006 | Gross |
| 2006/0212350 A1 | 9/2006 | Ellis et al. |
| 2006/0212367 A1 | 9/2006 | Gross |
| 2006/0218153 A1 | 9/2006 | Voon et al. |
| 2006/0229993 A1 | 10/2006 | Cole |
| 2006/0242139 A1 | 10/2006 | Butterfield et al. |
| 2006/0242269 A1 | 10/2006 | Gross |
| 2006/0253599 A1 | 11/2006 | Monteiro et al. |
| 2006/0267995 A1* | 11/2006 | Radloff ............ H04N 21/47217 345/530 |
| 2006/0292541 A1 | 12/2006 | Ehmann |
| 2007/0044639 A1 | 3/2007 | Farbood et al. |
| 2007/0056002 A1 | 3/2007 | Ganesan et al. |
| 2007/0112762 A1 | 5/2007 | Brubaker |
| 2007/0130040 A1 | 6/2007 | Stinski |
| 2007/0156507 A1 | 7/2007 | Connelly et al. |
| 2007/0157251 A1 | 7/2007 | Shrivastava et al. |
| 2007/0174774 A1 | 7/2007 | Lerman |
| 2007/0186272 A1 | 8/2007 | Hunter et al. |
| 2007/0243509 A1 | 10/2007 | Stiebel |
| 2007/0250378 A1 | 10/2007 | Hughes et al. |
| 2007/0260677 A1 | 11/2007 | DeMarco |
| 2007/0263984 A1 | 11/2007 | Sterner |
| 2007/0266399 A1 | 11/2007 | Sidi |
| 2007/0277205 A1 | 11/2007 | Grannan |
| 2007/0294177 A1 | 12/2007 | Volk et al. |
| 2007/0300258 A1 | 12/2007 | O'Connor |
| 2008/0034066 A1 | 2/2008 | Shamus et al. |
| 2008/0034295 A1 | 2/2008 | Kulas |
| 2008/0036917 A1 | 2/2008 | Pascarella |
| 2008/0040235 A1 | 2/2008 | Avedissian |
| 2008/0040444 A1 | 2/2008 | Anguist et al. |
| 2008/0050713 A1 | 2/2008 | Avedissian |
| 2008/0050714 A1 | 2/2008 | Avedissian |
| 2008/0059256 A1 | 3/2008 | Lynch |
| 2008/0059891 A1 | 3/2008 | Herzog |
| 2008/0066107 A1 | 3/2008 | Moonka |
| 2008/0077517 A1 | 3/2008 | Sappington |
| 2008/0082417 A1 | 4/2008 | Publicover |
| 2008/0082421 A1 | 4/2008 | Onyon et al. |
| 2008/0092062 A1 | 4/2008 | Motsinger |
| 2008/0097984 A1* | 4/2008 | Candelore .......... H04N 21/4332 707/999.005 |
| 2008/0104626 A1 | 5/2008 | Avedissian |
| 2008/0104627 A1 | 5/2008 | Avedissian |
| 2008/0109841 A1 | 5/2008 | Heather et al. |
| 2008/0143481 A1 | 6/2008 | Abraham et al. |
| 2008/0147558 A1 | 6/2008 | Kraus |
| 2008/0163283 A1 | 7/2008 | Tan |
| 2008/0172705 A1 | 7/2008 | Liwerant |
| 2008/0178230 A1 | 7/2008 | Eyal |
| 2008/0189752 A1 | 8/2008 | Moradi et al. |
| 2008/0255961 A1 | 10/2008 | Livesey |
| 2008/0262931 A1 | 10/2008 | Chan et al. |
| 2008/0275763 A1 | 11/2008 | Tran |
| 2008/0307454 A1 | 12/2008 | Ahanger |
| 2009/0019487 A1 | 1/2009 | Kulas |
| 2009/0024922 A1 | 1/2009 | Markowitz |
| 2009/0024923 A1 | 1/2009 | Hartwig |
| 2009/0037967 A1 | 2/2009 | Barkan |
| 2009/0048921 A1 | 2/2009 | Tokuda |
| 2009/0055742 A1 | 2/2009 | Nordhagen |
| 2009/0079835 A1 | 3/2009 | Kaplan |
| 2009/0094520 A1 | 4/2009 | Kulas |
| 2009/0094629 A1 | 4/2009 | Lee |
| 2009/0144772 A1 | 6/2009 | Fink et al. |
| 2009/0150920 A1 | 6/2009 | Jones |
| 2009/0192972 A1 | 7/2009 | Spivack et al. |
| 2009/0210779 A1 | 8/2009 | Badoiu |
| 2009/0228347 A1 | 9/2009 | Spector |
| 2009/0276805 A1 | 11/2009 | Andrews, II |
| 2009/0287532 A1 | 11/2009 | Cohen et al. |
| 2009/0300475 A1 | 12/2009 | Fink |
| 2009/0307092 A1* | 12/2009 | Gugliuzza .......... G06Q 30/0601 715/716 |
| 2009/0313546 A1 | 12/2009 | Katpelly |
| 2009/0328122 A1 | 12/2009 | Amento |
| 2010/0005498 A1 | 1/2010 | Lanahan |
| 2010/0153831 A1 | 6/2010 | Beaton |
| 2010/0226438 A1 | 9/2010 | Saunders |
| 2010/0269144 A1 | 10/2010 | Forsman |
| 2010/0274673 A1 | 10/2010 | Isaac |
| 2010/0279766 A1 | 11/2010 | Pliska |
| 2010/0293190 A1 | 11/2010 | Kaiser |
| 2010/0332283 A1 | 12/2010 | Ng et al. |
| 2011/0059770 A1 | 3/2011 | Silverbrook et al. |
| 2011/0112915 A1* | 5/2011 | Geer, III ................ G06Q 30/00 705/14.73 |
| 2011/0138326 A1 | 6/2011 | Roberts et al. |
| 2011/0145065 A1 | 6/2011 | Mustafa |
| 2011/0161820 A1 | 6/2011 | Lee |
| 2011/0162002 A1* | 6/2011 | Jones ................ G06Q 30/0241 725/32 |
| 2011/0163971 A1 | 7/2011 | Wagner |
| 2011/0191809 A1 | 8/2011 | Briggs et al. |
| 2011/0196724 A1 | 8/2011 | Fenton et al. |
| 2011/0202874 A1 | 8/2011 | Ramer et al. |
| 2011/0229108 A1 | 9/2011 | Ryckman et al. |
| 2011/0231260 A1 | 9/2011 | Price |
| 2011/0251897 A1 | 10/2011 | Litvack et al. |
| 2011/0276712 A1 | 11/2011 | Narula |
| 2011/0296463 A1 | 12/2011 | Suslov |
| 2011/0304771 A1* | 12/2011 | Blanchard .......... H04N 21/6125 348/565 |
| 2011/0307783 A1 | 12/2011 | Robert |
| 2012/0022924 A1 | 1/2012 | Runnels |
| 2012/0066355 A1 | 3/2012 | Tiwari et al. |
| 2012/0095839 A1 | 4/2012 | LaBarca |
| 2012/0096357 A1* | 4/2012 | Folgner ................ H04N 21/658 715/726 |
| 2012/0110474 A1 | 5/2012 | Chen |
| 2012/0150997 A1 | 6/2012 | McClements |
| 2012/0166532 A1 | 6/2012 | Juan et al. |
| 2012/0206647 A1 | 8/2012 | Allsbrook et al. |
| 2012/0216121 A1* | 8/2012 | Lin ................ H04N 21/234327 709/219 |
| 2012/0266197 A1 | 10/2012 | Andrews, II et al. |
| 2013/0004138 A1 | 1/2013 | Kilar |
| 2013/0046566 A1 | 2/2013 | Camelio |
| 2013/0054757 A1 | 2/2013 | Spitz et al. |
| 2013/0097644 A1 | 4/2013 | Brande |
| 2013/0117262 A1 | 5/2013 | Lenahan |
| 2013/0144903 A1 | 6/2013 | Andrews, II et al. |
| 2013/0152123 A1 | 6/2013 | Briggs et al. |
| 2013/0166382 A1 | 6/2013 | Cassidy |
| 2013/0174037 A1 | 7/2013 | Gao |
| 2013/0232516 A1 | 9/2013 | Paull |
| 2013/0282533 A1 | 10/2013 | Foran-Owens et al. |
| 2013/0283301 A1 | 10/2013 | Avedissian et al. |
| 2013/0317944 A1 | 11/2013 | Huang et al. |
| 2014/0032366 A1 | 1/2014 | Spitz et al. |
| 2014/0033039 A1 | 1/2014 | Kandekar |
| 2014/0068660 A1 | 3/2014 | Briggs et al. |
| 2014/0089966 A1 | 3/2014 | Briggs et al. |
| 2014/0095330 A1 | 4/2014 | Briggs et al. |

(56) References Cited

U.S. PATENT DOCUMENTS

| | | |
|---|---|---|
| 2014/0150029 A1 | 5/2014 | Avedissian et al. |
| 2014/0164283 A1 | 6/2014 | Avedissian et al. |
| 2014/0165086 A1 | 6/2014 | Avedissian et al. |
| 2014/0250211 A1 | 9/2014 | Spitz et al. |
| 2014/0280111 A1 | 9/2014 | Granstrom |
| 2014/0280187 A1 | 9/2014 | Molaro |
| 2014/0280294 A1 | 9/2014 | Stekkelpak et al. |
| 2014/0280498 A1 | 9/2014 | Frankel et al. |
| 2014/0280566 A1 | 9/2014 | Chen et al. |
| 2014/0280586 A1 | 9/2014 | Hoffman et al. |
| 2014/0280750 A1 | 9/2014 | Panje et al. |
| 2014/0281852 A1 | 9/2014 | Wolfram et al. |
| 2014/0281971 A1 | 9/2014 | Isbell, III et al. |
| 2014/0281972 A1 | 9/2014 | Kramer et al. |
| 2014/0281973 A1 | 9/2014 | Klappert et al. |
| 2014/0282700 A1 | 9/2014 | Briggs et al. |
| 2014/0310736 A1 | 10/2014 | Roberts |
| 2014/0359671 A1 | 12/2014 | Andrews, II et al. |
| 2014/0379469 A1* | 12/2014 | Cipolletta ............ H04N 21/482 705/14.53 |
| 2015/0020110 A1 | 1/2015 | Fitzsimmons |
| 2015/0074711 A1 | 3/2015 | Spitz |
| 2015/0092111 A1 | 4/2015 | Spitz |
| 2015/0095782 A1 | 4/2015 | Avedissian et al. |
| 2015/0221345 A1 | 8/2015 | Zhao |
| 2016/0191981 A1 | 6/2016 | Briggs et al. |
| 2016/0191982 A1 | 6/2016 | Briggs et al. |
| 2016/0191983 A1 | 6/2016 | Briggs et al. |
| 2016/0191984 A1 | 6/2016 | Briggs et al. |
| 2016/0192015 A1 | 6/2016 | Briggs et al. |
| 2016/0192031 A1 | 6/2016 | Briggs et al. |
| 2016/0205431 A1 | 7/2016 | Avedissian |
| 2016/0300594 A1 | 10/2016 | Allen et al. |
| 2016/0323646 A1 | 11/2016 | Pratt |
| 2017/0078351 A1 | 3/2017 | von Sneidern et al. |
| 2017/0134779 A9 | 5/2017 | Briggs et al. |
| 2017/0195400 A1 | 7/2017 | Spitz et al. |
| 2017/0301003 A1 | 10/2017 | Spitz et al. |

FOREIGN PATENT DOCUMENTS

| | | |
|---|---|---|
| WO | WO 9952056 A1 | 10/1999 |
| WO | WO 2006/037053 A2 | 9/2004 |

OTHER PUBLICATIONS

Craig Havighurst, "Webcasters say proposed royalty rate will put them out of business," Byline (Business; p. 1 E): Jul. 1, 2002.

Decision Denying Institution of Inter Partes Review filed on IPR 2021-00514, U.S. Pat. No. 10,205,987 B2, dated Aug. 16, 2021, in 20 pages.

Decision Denying Institution of Inter Partes Review filed on IPR 2021-00515, U.S. Pat. No. 10,205,987 B2, dated Aug. 16, 2021, in 21 pages.

Decision Denying Institution of Inter Partes Review, United States Patent and Trademark Office, Patent Trial and Appeal Board, IPR2021-00517, U.S. Pat. No. 10,560,738 B2, entered Aug. 20, 2021, 33 pages.

Decision Denying Institution of Inter Partes Review, United States Patent and Trademark Office, Patent Trial and Appeal Board, IPR2021-00516, U.S. Pat. No. 10,506,278 B2, entered Aug. 19, 2021, 33 pages.

Decision Granting Institution of Inter Partes Review 25 U.S.C. § 314, dated Sep. 9, 2021, *MG Freesites Ltd.* v. *Scorpcast, LLC*, IPR2021-00513 U.S. Pat. No. 9,832,519 B2, in 30 pages.

Decision Granting Institution of Inter Partes Review filed on IPR 2020-01697, U.S. Pat. No. 9,965,780 B2, dated Apr. 19, 2021, in 77 pages.

Decision Granting Institution of Inter Partes Review filed on IPR 2021-00510, U.S. Pat. No. 9,899,063 B2, dated Aug. 12, 2021, in 42 pages.

Decision Granting Institution of Inter Partes Review filed on IPR 2021-00512, U.S. Pat. No. 9,703,463 B2, dated Aug. 12, 2021, in 31 pages.

Defendants' Initial Invalidity and Subject Matter Ineligibility Contentions in U.S. District Court, Eastern District of Texas, Marshall Division, Case No. 2:20-cv-00193-JRG, dated Nov. 4, 2020, 77 pages.

Exhibit 1: U.S. Publication No. 2007/0263984 (Sterner) in U.S. District Court Case, Eastern District of Texas, Marshall Division, No. 2:20-cv-00193-JRG, 59 pages, dated Nov. 4, 2020.

Exhibit 10: Wellcomemat System in U.S. District Court Case, Eastern District of Texas, Marshall Division, No. 2:20-cv-00193-JRG, 67 pages, dated Nov. 4, 2020.

Exhibit 11: Youtube System in U.S. District Court Case, Eastern District of Texas, Marshall Division, No. 2:20-cv-00193-JRG, 50 pages, dated Nov. 4, 2020.

Exhibit 12: Viddler System in U.S. District Court Case, Eastern District of Texas, Marshall Division, No. 2:20-cv-00193-JRG, 24 pages, dated Nov. 4, 2020.

Exhibit 13: Obviousness Chart in U.S. District Court Case, Eastern District of Texas, Marshall Division, No. 2:20-cv-00193-JRG, 116 pages, dated Nov. 4, 2020.

Exhibit 2: U.S. Publication No. 2011/0112915 (Geer) in U.S. District Court Case, Eastern District of Texas, Marshall Division, No. 2:20-cv-00193-JRG, 48 pages, dated Nov. 4, 2020.

Exhibit 3: U.S. Publication No. 2009/0300475 (Fink) in U.S. District Court Case, Eastern District of Texas, Marshall Division, No. 2:20-cv-00193-JRG, 39 pages, dated Nov. 4, 2020.

Exhibit 4: U.S. Publication No. 2009/0297118 (Fink) in U.S. District Court Case, Eastern District of Texas, Marshall Division, No. 2:20-cv-00193-JRG, 44 pages, dated Nov. 4, 2020.

Exhibit 5: U.S. Publication No. 2009/0187825 (Sandquist) in U.S. District Court Case, Eastern District of Texas, Marshall Division, No. 2:20-cv-00193-JRG, 43 pages, dated Nov. 4, 2020.

Exhibit 6: U.S. Pat. No. 8,392,821 (DeMarco) in U.S. District Court Case, Eastern District of Texas, Marshall Division, No. 2:20-cv-00193-JRG, 42 pages, dated Nov. 4, 2020.

Exhibit 7: U.S. Publication No. 2013/0004138 (Kilar) in U.S. District Court Case, Eastern District of Texas, Marshall Division, No. 2:20-cv-00193-JRG, 44 pages, dated Nov. 4, 2020.

Exhibit 8: U.S. Publication No. 2010/0037149 (Heath) in U.S. District Court Case, Eastern District of Texas, Marshall Division, No. 2:20-cv-00193-JRG, 50 pages, dated Nov. 4, 2020.

Exhibit 9: U.S. Publication No. 2009/0210779 (Badoiu) in U.S. District Court Case No. 2:20-cv-00193-JRG, 39 pages, dated Nov. 4, 2020.

Final Office Action, U.S. Appl. No. 14/167,867, dated Jul. 14, 2015.
Final Office Action, U.S. Appl. No. 14/180,241, dated Nov. 5, 2015.
Final Office Action, U.S. Appl. No. 14/180,264, dated Oct. 30, 2015.
Final Office Action, U.S. Appl. No. 14/567,997, dated Dec. 18, 2015.

"How to create google video sitemap urls for very large video files with distinct segments"; Dec. 6, 2011, 1 Page; downloaded from http://webmasters.stackexchange.com/questions/23021/how-to-create-google-video-sitemap-urls-for-very-large-video-files-with-distinct.

Jarboe, Greg, *YouTube and Video Marketing, An Hour a Day*, 2nd ed. (2012) (from IPR 512).

Ludwig, Sean, Vimeo begins rolling out silky smooth redesign with huge videos, http://venturebeat.com/2012/01/24/vimeo-new-design, 4 pages, Jan. 24, 2012.

Marshall, Carla, A Guide to YouTube Interactive Cards—Future of Annotations, http://www.reelseo.com/youtube-cards/, 14 pages, Mar. 19, 2015.

*MG Freesites LTD.* v *Scorpcast, LLC*; Inter Partes Review; IPR2020-01697, U.S. Pat. No. 9,965,780 B2; Paper 38; Judgment Final Written Decision, Apr. 15, 2022; 64 pages.

Miller, Michael, *YouTube for Business*, 2nd ed. (2011) ("Miller") (from IPR 512).

O'Neill, Megan, How To Set Start and End Times on YouTube Embeds, tp//www. e:embeds/101142, 5 pages, Jul. 3, 2012.

Petition for Inter Partes Review of U.S. Pat. No. 10,205,987, IPR2021-00514, filed Feb. 8, 2021, 117 pages.

(56) References Cited

OTHER PUBLICATIONS

Petition for Inter Partes Review of U.S. Pat. No. 10,205,987, IPR2021-00515, filed Feb. 8, 2021, 117 pages.
Petition for Inter Partes Review of U.S. Pat. No. 10,506,278, IPR2021-00516, filed Feb. 8, 2021, 133 pages.
Petition for Inter Partes Review of U.S. Pat. No. 10,560,738, IPR2021-00517, filed Feb. 8, 2021, 120 pages.
Petition for Inter Partes Review of U.S. Pat. No. 9,730,463, IPR2021-00512, filed Feb. 8, 2021, 114 pages.
Petition for Inter Partes Review of U.S. Pat. No. 9,832,519, IPR2021-00513, filed Feb. 22, 2021, 119 pages.
Petition for Inter Partes Review of U.S. Pat. No. 9,899,063, IPR2021-00510, filed Feb. 8, 2021, 116 pages.
Petition for Inter Partes Review of U.S. Pat. No. 9,965,780, filed Sep. 28, 2020.
Rack, C and Seeliger, R. and Arbanowski, S; Featured Media: Nonlinear, clickable multimedia content for an interactive video experience; 2010 Second International Conferences on Advances in Multimedia; Jul. 2010 [Retrieved on Apr. 11, 2017] Retrieved from the Internet: htto://ieeexolore.ieee.org/document/5501602/.
Raoul V. Mowatt, in "Web radio royalty rate Postponed" (Metro; Zone: N; p. 2): May 22, 2002.
United States Patent and Trademark Office, Before the Patent Trial and Appeal Board, Judgment, Final Written Decision regarding U.S. Pat. No. 9,899,063 B2, IPR2021-00510, dated Aug. 3, 2022 73 pages.
United States Patent and Trademark Office, , Before the Patent Trial and Appeal Board, Judgment, Final Written Decision regarding U.S. Pat. No. 9,703,463 B2, IPR2021-00512, dated Aug. 3, 2022 55 pages.
Webpage from www.IdolUnderground.com, Selecting Idol Underground Competitions; captured Aug. 9, 2007, original publication date unknown.
Webpage from www.MusicNation.com, Selecting homepage; captured Aug. 9, 2007, original publication date unknown.
Webpage from www.MySpace.com, Selecting MySpace Ringtones; captured Aug. 9, 2007, original publication date unknown.
Webpage from www.YouTube.com, Selecting YouTube Community; captured Aug. 9, 2007, original publication date unknown.
Webpage from www.YouTube.com, Selecting YouTube Contests; captured Aug. 9, 2007, original publication date unknown.
YouTube: a history, http://www.telegraph.co.uk/finance/newsbysector/mediatechnologyand telecoms/digital-media/7596636/YouTube-a-history.html, 3 pages, Apr. 17, 2010.
Merriam-Webster Definition for "adjacent" (Ex. 13), 2012.
Merriam-Webster Online Definition for "adjacent" (Ex. 14), 2023.
Request for Ex Parte Reexamination of Avedissian et al., U.S. Pat. No. 9,703,463, dated Mar. 7, 2023, in 271 pages.
USPTO Order Granting Request for Ex Parte Reexamination, Reexam Control No. 90/015,159, mailed Mar. 8, 2023, regarding U.S. Pat. No. 10,506,278, 40 pages.
Final Ex Parte Reexamination Communication, regarding Application No. 90/015,149, filed Dec. 16, 2022, U.S. Pat. No. 10,205,987, 45 pages, mailed Aug. 16, 2023.
United States Patent and Trademark Office, "Ex Parte Reexamination Communication Transmittal Form," Ex Parte Final Rejection, regarding U.S. Pat. No. 10,506,278, mailed Sep. 18, 2023, 31 pages.
Request for Ex Parte Reexamination of U.S. Pat. No. 10,560,738 dated Nov. 10, 2022, 695 pages.
Final Written Decision, *MG Freesites LTd v. Scorpcast LLC*, IPR2021-00510, Paper 38, dated Aug. 3, 2022 (Ex. 6), 74 pages.
Petition, *MG Freesites Ltd. v. Scorpcast LlC*, IPR2021-00510, Paper 1, dated Feb. 8, 2021 (Ex. 5), 117 pages.
Request for Ex Parte Reexamination of U.S. Pat. No. 10,506,278, dated Nov. 10, 2022, 737 pages.
Request for Ex Parte Reexamination of U.S. Pat. No. 9,899,063, dated Dec. 23, 2022, 81 pages.
Administrative Patent Judge Meredith C. Petravick, et al., "Judgement-Final Written Decision Determining No Challenged Claims Unpatentable Dismissing Petitioner's Motion to Exclude;" IPR2021-00513; U.S. Pat. No. 9,832,519 B2; Sep. 6, 2022; U.S. Patent and Trademark Office Patent Trial and Appeal Board; in 34 pages.
Request for Ex Parte Reexamination of U.S. Pat. No. 10,205,987, dated Nov. 1, 2022, 688 pages.
DialogSrch11 Jul2013; Examiner Dialog search conducted Jul. 11, 2013.
*Ulead DVD MovieFactory 2 User Guide*, Nov. 2002 (from IPR 512).
www.talentnetworks.com, 53 pages, Jun. 12, 2003.
U.S. Appl. No. 60/783,463, filed Mar. 17, 2006 (Ex. 7).
U.S. Appl. No. 60/825,725, filed Sep. 12, 2006 (Ex. 11).
U.S. Appl. No. 11/768,656, filed Jun. 26, 2007 (Ex. 10).
Veeple FAQ (as archived by the Wayback Machine on Nov. 26, 2009) (Ex. 9).
Veeple FAQ (as archived by the Wayback Machine on Nov. 26, 2009) (Ex. 12).
BubblePLY FAQs (as archived by the Wayback Machine on Nov. 11, 2008) (Ex. 16).
"What is Tonos?", pp. 1-3, http://www.tonos.com/app2/tonos/jsp/what is tonos.jsp, 2001-2002.
Perez, Luis, "iMovie '09 Basics", Apr. 2009, pp. 1-12, downloaded from: https://etc.usf.edu/te_mac/movies/pdf/imovie09.pdf (Year: 2009).
Claim Construction Memorandum Opinion and Order filed on May 13, 2021, *Scorpcast, LLC d/b/a Haulstars, v. Boutique Media*, Case No. 2:20-cv-00193-JRG-RSP (Lead Case), in the United States District Court for the Eastern District of Texas, Marshall Division, 25 pages.
Nathaniel E Frank-White, Wayback Machine Affidavit (Ex. 9A), Oct. 12, 2022.
Veeple Whitepaper (as archived by the Wayback Machine on Dec. 20, 2008) (Ex. 3).
S.J. Davis, C.H. Ritz and I.S. Burnett, "Using Social Networking and Collections to Enable Video Semantics Acquisition," in IEEE MultiMedia, vol. 16, No. 4, pp. 52-61, Apr. 2009, doi: 10.1109/MMUL.2009.95 (Year: 2009).

* cited by examiner

INTERACTIVE VIDEO DISTRIBUTION SYSTEM AND VIDEO PLAYER UTILIZING A CLIENT SERVER ARCHITECTURE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The present invention relates to video distribution and media players.

Description of the Related Art

The broad accessibility of internet, along with the increasing popularity of affordable digital video recording devices has led to the proliferation of videos shared over the internet. However, conventional techniques for distributing such video content have been inefficient, and conventional media players have not provided adequate controls for navigating through or sharing video content over a network. Further, conventional video distribution systems and media players may use an undesirable amount of network bandwidth in transmitting and accessing portions of a video that will not be utilized.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods and systems are described for distributing video content. In addition, a media player (e.g., a video player) is described that provides enhanced video navigation and video content sharing. A video may include multiple segments in terms of subject-matter content, even though the video may be continuous in nature. Optionally, the video may be arbitrarily logically divided into segments even though the video is in the nature of a single item of content. The video content may be streamed from a server over a network (e.g., an IP network) to a client terminal for playback via the media player. As described herein, navigation images may be received and presented by the media player enabling a user to navigate directly to a video segment corresponding to the navigation image, without having to manipulate a scrubber control and without having to fast forward to the segment. Further, controls and communication protocols are provided that enable a user to share a segment of video content so that the recipient does not have to view content preceding the shared segment and does not have to manipulate a scrubber control to navigate to the video segment, thereby reducing network bandwidth usage for video transmission and providing an enhanced user interface.

In one example, if a viewer clicks on a navigation image corresponding to a video segment to be shared, the browser will generate or access, and transmit a resource locator, such as a URL, to a destination specified by the user. The resource locator may point to the video content and may include a timecode corresponding to a starting point of the video segment being shared. The timecode (or other segment pointer, such as an item identifier associated with an item depicted in the video segment) may be contained within the URL itself, or it may be appended to the end of the URL in a query string or in a URL anchor. Following are examples of resource locators with references to a video segment.

The example below includes a timecode ("tp=32" in this example) pointing to a segment in a referenced video file ("acme-haul" in this example):

http://player.videosite.domain/video/acme-haul?tp=32

The following example refers to a particular item in the video file (a midnight black crop shirt) that corresponds to the shared segment:

http://player.videosite.domain/video/acme+Haul#Midnight+Black+Crop+Shirt

By way of example, the media player may transmit the segment resource locator via one or more communication channels, optionally including one or more of the following: a messaging service (e.g., a short messaging service, such as SMS, MMS, iMessage), an email, a social networking page, a microblog, or otherwise.

An aspect of the disclosure relates to a video player system, comprising: at least one processing device; non-transitory memory storing programmatic code that when executed by the at least one processing device, cause the video player system to: receive a first plurality of navigation images corresponding to respective different segments of a video, the video having a first plurality of video segments; receive the video via streaming from a video hosting server; decode and play the streaming video; display the first plurality of navigation images while the streaming video is played; receive a video sharing instruction; provide a user interface enabling selection of at least one of the first plurality of video segments; provide a user interface enabling specification of at least one communication channel; provide a user interface enabling specification of at least one destination; receive a selection of a video segment via the user interface enabling selection of at least one of the first plurality of video segments; receive a specification of a communication channel via the user interface enabling specification of at least one communication channel; receive a specification of a destination via the user interface enabling specification of at least one destination; generate or access a resource locator including a pointer to the selected video segment; transmit the resource locator including the pointer to the selected video segment via the specified communication channel to the specified destination.

An aspect of the disclosure relates to a system for distribution of video content, comprising: at least one processing device; non-transitory memory storing programmatic code that when executed by the at least one processing device, cause the system to: receive an upload of a first video from a first user terminal; provide a user interface to the first user terminal enabling a first user to define multiple segments in the first video, including at least a starting point of a first segment and a starting point of a second segment; provide a user interface to the first user terminal enabling the first user to specify a first navigation image corresponding to the first segment and second navigation image corresponding the first segment; provide a user interface to the first user terminal enabling the first user to specify at least a searchable first tag to be associated with the first segment and a searchable second tag to be associated with the second segment; provide a video player for display on a second user terminal of a second user; cause at least the second navigation image to be displayed over a side of the first segment of the first video while the video player is playing the first segment of the first video, wherein in response to detecting that the second navigation image, displayed over the side of the first segment of the first video, has been selected prior to completion of playing the first video segment, the video player causes the second segment of the first video to be played without completing playing the first segment of the first video; provide a share control via the video player, wherein in response to detecting activation of the share control, a link to content of the first video is shared with a first recipient.

An aspect of the disclosure relates to a method comprising: receiving an upload of a first video from a first user terminal at a first system; providing by the first system a user interface to the first user terminal enabling a first user to define multiple segments in the first video, including at least a starting point of a first segment and a starting point of a second segment; providing by the first system a user interface to the user terminal enabling the first user to specify a first navigation image corresponding to the first segment and second navigation image corresponding the first segment; providing by the first system a user interface to the user terminal enabling the first user to specify at least a searchable first tag to be associated with the first segment and a searchable second tag to be associated with the second segment; providing by the first system a video player for display on a second user terminal of a second user; causing at least the second navigation image to be displayed over a side of the first segment of the first video while the video player is playing the first segment of the first video, wherein in response to detecting that the second navigation image, displayed over the side of the first segment of the first video, has been selected prior to completion of playing the first video segment, the video player causes the second segment of the first video to be played without completing playing the first segment of the first video; providing by the first system a share control via the video player, wherein in response to detecting activation of the share control, a link to content of the first video is shared with a first recipient

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION

Figure 1A:
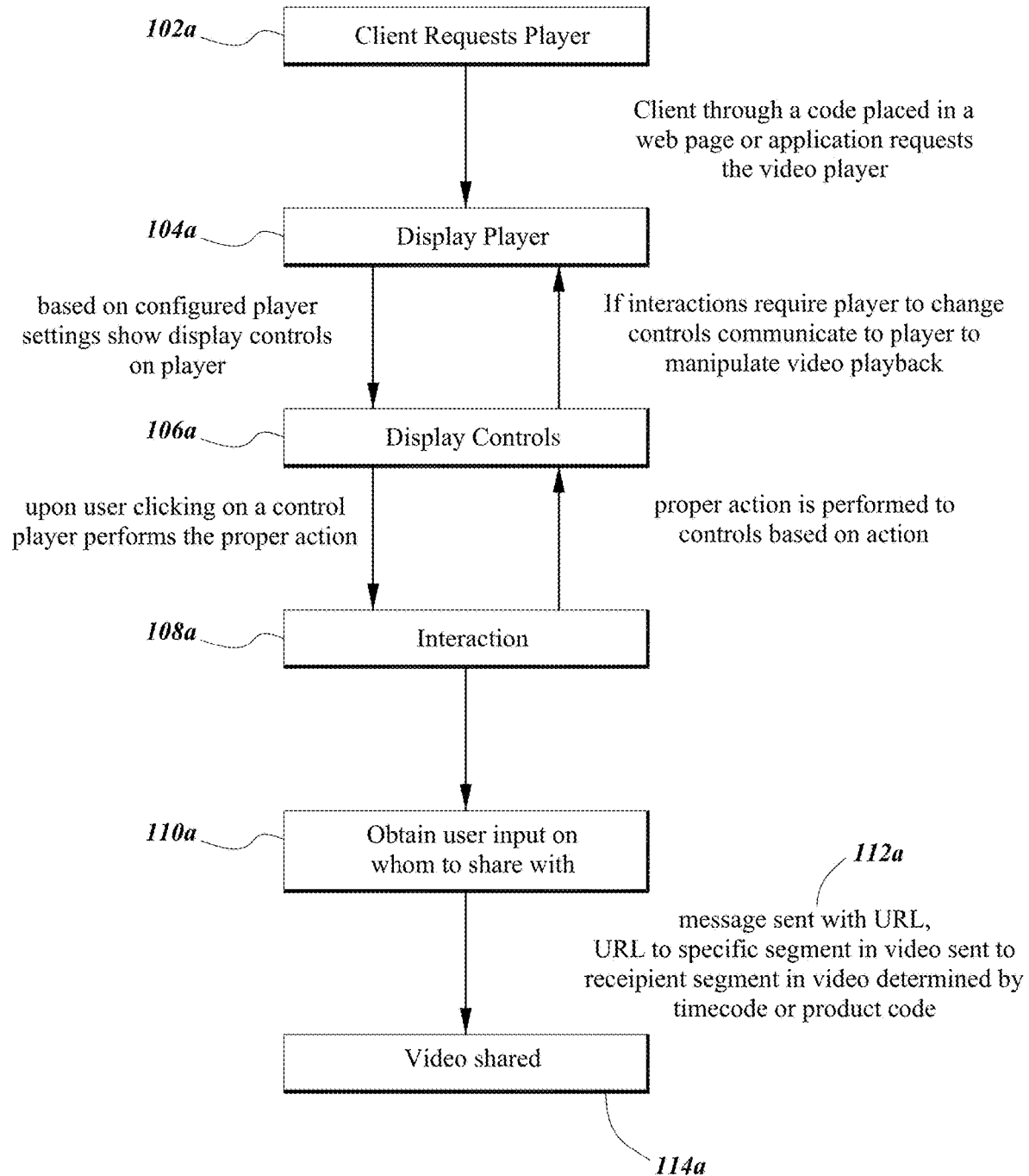
FIG. 1A illustrates an example media player data flow.

Methods and systems are described for distributing video content and for playing back such distributed video content. The video content may be streamed from a server over a network to client terminal to a media player. As described herein, navigation images may be accessed by and displayed by the media player. The navigation images may enable a user to navigate directly to a video segment corresponding to a selected navigation image, without having to manipulate a scrubber control and without having to fast forward to the segment. Further, controls and communication protocols are provided that enable a user to share a segment of video content so that the recipient does not have to view content preceding the shared segment and does not have to manipulate a scrubber control to navigate to the video segment. As described elsewhere herein, such a media player may thereby provide an enhanced video navigation user interface and may reduce network bandwidth usage by reducing the amount of streaming video that may otherwise be accessed.

In an example, if a viewer clicks on a navigation image corresponding to a segment, the media player will generate or access a resource locator, and transmit the resource locator, such as a URL, to a destination specified by the user. The resource locator may point to the video content and may include a timecode corresponding to a starting point of the video segment being shared. The timecode (or other segment pointer) may be contained within the URL itself, or it may be appended to the end of the URL in a query string or a URL anchor. Following are examples of resource locators with references to a video segment.

The example below includes a timecode ("tp=32" in this example) pointing to a segment in a referenced video file ("acme-haul" in this example):

http://player.videosite.domain/video/acme-haul?tp=32

The following example refers to a particular item in the video file (a midnight black crop shirt) that corresponds to the shared segment:

http://player.videosite.domain/video/acme+Haul #Midnight+Black+Crop+Shirt

Optionally, the resource locator may include one or more metatags. For example, the metatags may optionally include some or all of the following data: video name, a description of the video and/or video segment, a thumbnail image for the video segment (or an item, such as a product, that is the subject of the video), etc.

By way of example, the media player may share a video segment by transmitting the corresponding segment resource locator via one or more communication channels, optionally including one or more of the following: messaging service (e.g., a short messaging service, such as SMS, or MMS, iMessage, etc.), email, a social networking page, microblog, or otherwise.

Optionally, when a recipient of the resource locator selects (e.g., clicks on) the locator when displayed on the recipient's terminal (e.g., when displayed within a messaging service message, an email, or on a social networking page), the recipient's browser may launch (if not already open), or a new browser tab may be opened. The browser will request the resource (the video segment) and media player, and the video segment will displayed via the media player presented by the user browser without the media player having to decode and display earlier portions of the video. The media player may automatically begin playing the video segment or a still image may be presented by the media player and the recipient may need to activate a "play" control to begin playing the video segment. The video segment may be streamed from the remote server to the recipient's terminal for display by the media player.

Optionally, when sharing a video segment within a social network via a social networking site and server system, a resource locator, such as that discussed, is shared. The social network may request the video segment using the resource locator, and may optionally access and download descriptive information included in the resource locator metatags. For example, as similarly described above, the metatags may optionally include a name of the video, a description of the video and/or video segment associated with the time code, a thumbnail image for the video segment (or an item that is the subject of the video), etc. Some or all of the metatag data may be presented by the media player to provide a more informative and/or graphic representation to the recipient.

Referring now to FIG. 1A, an example data and control flow is illustrated. At 102A, a client browser requests a media player. The request may be in the form of a code placed within a webpage being displayed by the client browser. By way of further example, an application may request the media player. The request may be transmitted by the client browser or application over a network to a server hosting the media player.

At 104A, the media player is displayed by the browser (or other application). At 106A, the media player controls are displayed based on the configured media player settings. The controls may include the navigation images. As will be described in greater detail elsewhere herein, a plurality of navigation images may be displayed by the media player, wherein a given navigation image corresponds to a segment of the video. For example, the navigation image may be a thumbnail version of a frame from the corresponding video segment, or the navigation image may be an image of an item that is the subject of the video segment, but the item image may not be from the video or from the video segment. Instead the navigation image may have been separately provided. Other controls may include a share control that enables a user to instruct that the video, or one or more selected video segments (where a video segment is a subset of the video content), are to be shared with one or more specified recipients. Other controls may include pause, fast forward, rewind, play, skip segment, and/or scrubber controls. Other example controls are described herein.

At 108A, the media player detects that the user has activated a control. At 110A, the media player responds according to the user control activation. For example, if the user activates a share control, the user may be prompted by the video player via a user interface to specify the communication channel and/or the recipients. If the user has activated a video navigation control (e.g., rewind, fast forward, pause, etc.), the media player may manipulate the media playback accordingly. At 112A, the URL is generated by the media player, including the pointer (e.g., time code or an item/product code), for the segment being shared. At 114A, the URL is transmitted via the specified communication channel to the specified recipient(s).

Figure 1B:
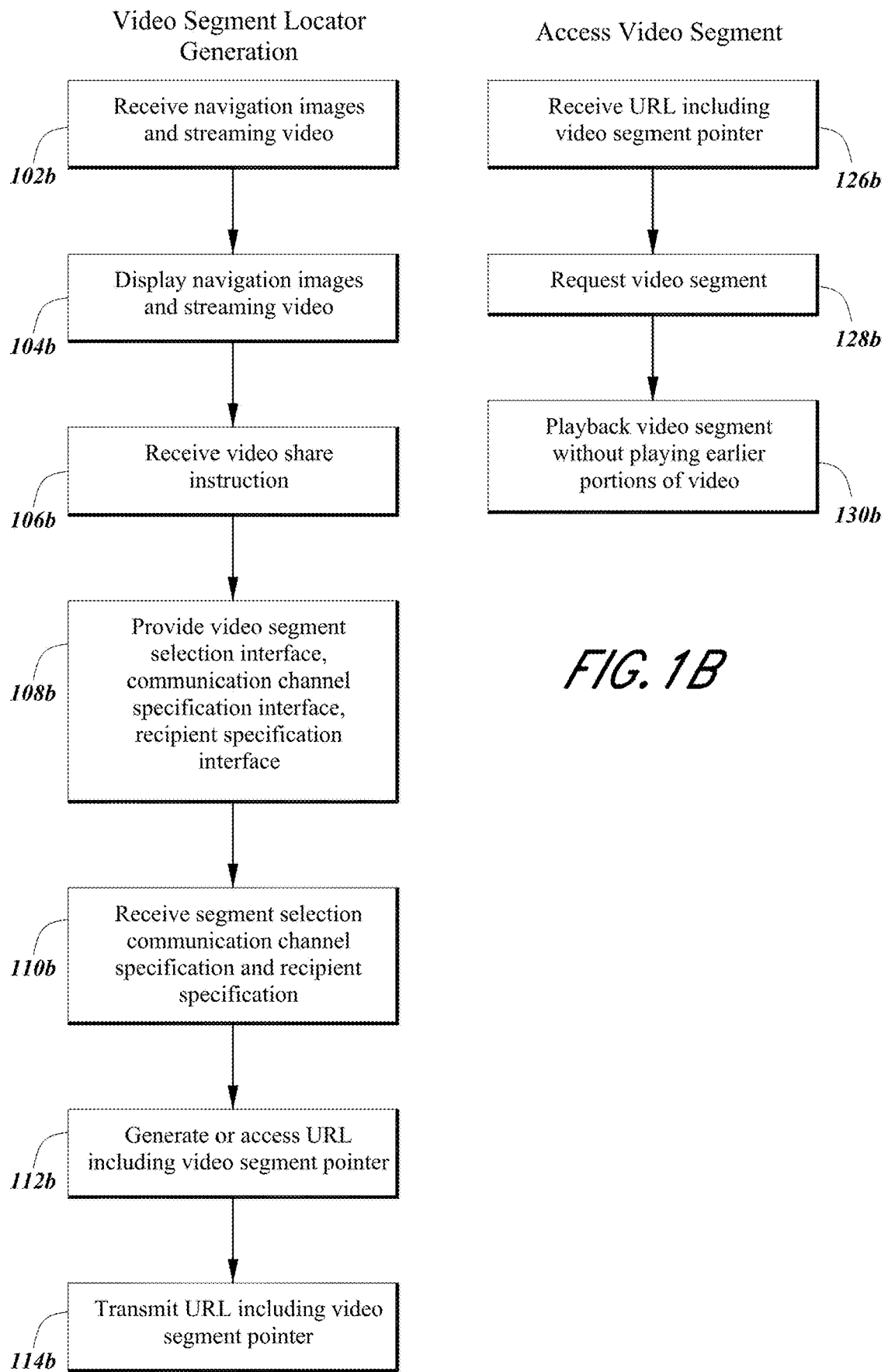
FIG. 1B illustrates an example video segment sharing process.

FIG. 1B illustrates an example video segment sharing process (although an entire video may be shared rather than just a given video segment). It is understood that the term "sharing" may refer to the transmission of a link or other locator of a video or video segment, rather than a transmission of an actual video file.

At block 102B, a video segment access or generation process begins. A media player receives a streaming video and associated navigation images from a remote system, such as a video hosting system comprising one or more servers. Optionally, the navigation images may be received before the video begins streaming and may be received from a separate source (e.g., a third party navigation image hosting system). The navigation images may be associated with time codes associated with respective video segments (e.g., video reviews of items) and may act as hot spots.

For example, in response to detecting that a user has selected a given navigation image (e.g., by clicking on the navigation image), the media player may begin playing the corresponding segment of the video, without requiring that the user manipulate a scrubber control or a fast forward control, and without the user having to view portions of the video prior to the desired video segment. Because the user does not have to view portions of the video prior to the desired video segment, network bandwidth usage and video server resource usage may be advantageously reduced as the amount of video content that needs to be streamed from the video hosting system is reduced. Furthermore, the media player may consume less of the user terminal's computational and memory resources as less video content needs to be decoded. As described below, the navigation images may be displayed adjacent to a scrubber bar and other navigational controls and/or elsewhere (e.g., overlaying the video playback area).

At block 104B, the navigation images and optionally the streaming video are displayed by the media player. At block 106B, the process detects that the user has activated a video share control or otherwise provide a video share instruction. For example, the video share control may be displayed by the media player.

At block 108B, a variety of user interfaces are presented to the user that are related to video sharing. For example, a control may be provided via which the user can indicate that the entire video is to be shared. In addition or instead, video segment selection controls may be provided enabling the user to specify which segments are to be shared. By way of example, a given segment may be graphically represented by the corresponding navigation image and/or by descriptive text. By way of illustration, if the segments are reviews of items, a given segment may be graphically represented by an image of the respective item being review in the segment and/or by a textual name/description of the item.

In addition, a communication channel specification user interface may be presented, enabling the user to specify the communication channel(s) that are to be used to share the video or video segment(s). For example, the communication channel specification user interface may enable the user to specify that one or more messaging services, social network sites, microblog sites, email services, and/or other communication channels are to be used to share video or selected video segment(s). A recipient specification interface may be provided enabling the user to specify specific recipients or classes recipients the video segment(s) is to be shared with. For example, the user interface may enable the user to specify that the video is to be shared publicly via the user's social network page or only with specific friends of the user. The recipient specification interface may list contacts from the user's contact data store.

At block 110B, the segment selection (or entire video selection), communication channel specification, and recipient selection from the user are received via the interfaces described above. At block 112B, the process dynamically generates a URL that includes a pointer to the segment(s) selected by the user. Optionally, the URL may be been pre-generated and accessed by the process. For example, the video hosting system or a third party system (different than the video hosting system, such as a system that provided the navigation images) may have generated a URL for each video segment and transmitted the segment URLs to the media player with the video (e.g., just before the video is streamed to the video player or while the video is streamed to the video player), and may have been stored by the video player in user terminal memory for later access. By way of example, a timecode or other segment pointer, such as an item identifier associated with an item depicted in the video segment, may be included within the URL itself, or it may be appended to the end of the URL in a query string or in a URL anchor. At block 114B, the generated or accessed URL is transmitted to the designated recipients.

The process performed by a recipient media player will be described with reference to FIG. 1B. The recipient media player may be hosted by or accessed by a recipient terminal and may be displayed via a browser or other application. At block 126B, the URL, including the video segment pointer, is received. For example, the URL may have been received in a messaging service message, an email, or via a social network microblog webpage or application. The URL may have been then selected (e.g., clicked on) by the recipient. At block 128B, the media player requests the video segment pointed to by the URL. The request may be transmitted by the browser (or other application) in which the media player is displayed to the video hosting system. At block 130B, the recipient media player receives and plays the video segment without having to play earlier portions of the video and without the recipient having to manually navigate to the segment.

As referred to herein, the term "product" refers to an item sold to and used by a consumer. Embodiments described herein may be utilized with respect to services sold to a consumer, and it is to be understood that for all instances of the term "product," whether or not the term "service" appears with such instances of the term "product," the description below applies to products and services, and may be referred to collectively as "consumable items." One or more embodiments described herein provide for a user generated video review platform. In certain example embodiments, methods are embodied in software and distributed among various devices in the client-server relationship existing between a website server that handles multiple clients using various client devices. In an example aspect, certain embodiments provide a method for obtaining and publishing user generated video product reviews by receiving a user generated video review, where the user generated video review comprises audio and video data featuring a reviewed product.

A video review (which may be in the form of a single item of video content, such as a single video file) may optionally include reviews of multiple items. The item reviews may be sequentially included in the video review file. For example, if a user goes on a shopping trip, the user may then review each item purchased (or a subset thereof) in a single video. A given item review within the video review file may be time stamped by the user via a user interface, the time stamp indicating at what point in time in the video review file the review of the given item begins/occurs. Other techniques may be used to identify the location/position of a given item review within a video review. For example, a frame number may be identified as the point at which the item review for the given item begins. A control may be provided to the user at the same time the video review is displayed, where the user can activate the control to indicate the start of an item review and/or to add tags associated with the item review. Optionally, the user is provided the option of uploading an image of the product before or after they have tagged the item. This image may optionally then be displayed in a scrubber area when the review is displayed to a user. Optionally, the tag and/or a user interface is provided via which the user can indicate which frame within the item review is to be used to represent the item review in future search results or the like.

An image from a given item review may be displayed in a scrubber area (e.g., an area including a scrubber bar or other control that a user can utilize (e.g., by dragging a scrubber control in a scrubber timeline) to indicate where the user wants the video playback to begin or to browse frames in the video, and optionally including an area adjacent to the scrubber bar). Thus, for example, the scrubber area may display images of items being reviewed in the video review file, where a given item image is displayed in the scrubber timeline at a location corresponding to where the review of the respective item begins. The item image may be a frame from the review of the item, such as, by way of example, the first frame from the review of the item. Optionally, other frames from a given item review are not presented in the timeline when the scrubber is static, in that the scrubber control is not being manipulated by the user or otherwise in motion.

An item tag associated with the reviewed item may be received from the user posting the video review or a user viewing the video review. The item tag may be descriptive of the reviewed item (e.g., the tag may be an item name, a brand name associated with the item, a functional/descriptive name, etc.). One or more user-assigned or other tags may be associated with the start of an item review. Optionally, an interface may be provided via which the user can upload still images in association with the review, such as a still image of the item being reviewed. Optionally, the still image of the item image may be a photograph of the item, optionally uploaded separately from the corresponding video review. Optionally, the interface may enable users to provide one or more links to photographs or other images of the item from other sites (e.g., other websites) to provide the image.

Optionally, the user generated video review is approved (e.g., automatically by a posting system and/or manually by an administrator) if a set of criteria is met. The user generated video review is published (e.g., on an online video sharing networked site, an on line media property, a blog, a social networking site, in an advertisement, etc.). An incentive is optionally distributed to the user associated with the user generated video review.

A rich source of content for products and services reviews may be aggregated from users having adding to the collective of reviews, optionally motivated by an incentive, such as a payment, credit, discount, etc. Storage of the user generated video review can be facilitated through central or distributed databases, or by use of removable recording media or transmission to a user's client device, such as a laptop or smart phone or any device capable of receiving and storing audio and video items received from a connected network or a localized transmitter in the case of removable media. Product reviews may be generated in stores and other public places, some without connectivity to a network so a user may manage his or her product review from a portable client device as the user moves between locations where the subjects of video reviews are found.

Certain embodiments optionally provide a polling feature enabling a user seeking product information to poll/ask members of a group selected by the user (e.g., friends or contacts from a social networking site, contacts from a contact database, etc.) their opinions about the product or service reviewed in a video review (where the review may have been generated by the user or a third party). For example, the group may be polled by asking the group members one or more questions to determine the groups' views on the product or service, and the polling results are communicated to a user. For example, as the members of the group watch the video review sent to them or referenced by the user, the individual members may submit ratings, submit textual, audio and or video feedback or select opinions about different aspects of the subject of the review, to indicate their opinions regarding the item.

Certain embodiments provide an interface between a user and computer, wherein a user seeking product information is provided a control via which the user can submit a review. The control may be provided in conjunction with a display control showing a camera view as seen from a client-side camera, such as found on client devices such as a laptop, smart phone, or other suitable client device, such as a camera equipped kiosk. By showing the user what a device camera is capturing (and optionally playing audio captured by a device microphone), and providing the "submit a review" control (e.g., a displayed button, sometimes referred to as a "record a review" control), the user is informed that a product review recording session controlled by him or her is about to start once they select the control. By selecting the control, the user begins execution of a set of computer instructions that record a user-submitted review as directed by the user's interaction. While recording the review, a similar control in appearance, having an indication to stop recording video and audio, thus terminating the recording of the user generated review, is presented to the user during recording of the review. When the user selects the stop control, the recorded review is presented to the user for review, and the user then may re-record the product review or submit it as a user-submitted review. The user-submitted review may also be handled as other product reviews, and either transmitted across a computer network to a database, or stored locally on a client device. Once the review is uploaded to a video sharing system (or before the video is uploaded), the user is presented with an interface via which the use can tag each item reviewed, optionally in association with an indication as to where the product review begins. Optionally, a control may be provided enabling the user to upload the video to a third party site, such as a social networking site or video sharing site, with some or all of the user's tags. For example, the video may be uploaded via an application programming interface (API) of the third party site, or otherwise.

Thus, certain embodiments enable a user to record, upload, and/or link to a review video that pertains to the item that was being viewed by the user, another item reviewed in the video review, and/or create a new review video of items unrelated to what was reviewed in the video the user viewed.

Some or all of the functionality described herein may be provided via a video player which may be installed on or linked to a variety of documents, such as webpages hosted on different web servers. For example, the player may be linked to, accessed via an application programming interface (API), and/or displayed embedded within editorial content (e.g., third party editorial content), within advertisements (e.g., optionally including banner advertisements, pre and/or post roll in a video), or elsewhere.

An example aspect provides a system for distribution of video reviews, comprising: at least one processing device; non-transitory memory storing programmatic code that when executed by the at least one processing device, cause the system to perform operations comprising: providing for display on a terminal of a first user a document including an advertisement, the advertisement including at least text and an adjacent static image; at least partly in response to the first user activating a playback control associated with the static image included in the advertisement, causing at least in part a video player to play back a first consumer provided video review of at least a first item associated with the static image; providing, in association with the first consumer provided video review, one or more controls enabling the first user to: purchase the first item; indicate to other users that the user wants the first item and/or store an indication in association with a profile of the user an indication that the user wants the first item; record a second video review for at least the first item; and/or poll others to obtain feedback regarding the first item. Optionally, at least partly in response to an indication from the first user that the user wants to record a second video review for at least the first item, enabling the first user to record the second video review for the first item, enabling the first user to provide textual descriptive information regarding the second video review for the first item and/or automatically identifying textual descriptive information regarding the second video review based at least in part image recognition performed with respect to at least a portion of one image associated with or included in the second video review, storing the textual descriptive information regarding the second video review for the first item in association with the second video review.

Optionally, a third user may be enabled to access the second video review for the first item via at least one advertisement. Optionally, the first user may be enabled to record a review regarding a second item different than the first item via a control provided in association with the video player. Optionally, at least one user is enabled to record a video review regarding a second item different than the first item via a control provided in association with the video player, a user interface is being provided for display on the terminal of the at least one user, the user interface including one or more fields configured to receive item detail information regarding the second item and/or automatically identifying textual descriptive information regarding the second item based at least in part image recognition performed with respect to at least a portion of one image associated with or included in the second item video review, the item detail information regarding the second item in association with the video review regarding the second item is stored, and the video review regarding the second item and at least a portion of the item detail information regarding the second item is provided to display to a plurality of users.

Optionally, the operations further comprise accessing metadata associated with the first consumer provided review, and associating at least a portion of the accessed metadata with the second video review. Optionally, the video player is configured to display in a scrubber area a plurality of representative images selected by a given reviewer, the plurality of representative images corresponding to respective item reviews included in a given video review. Optionally, the video player is configured to display in a scrubber area a plurality of representative images selected by a respective plurality of reviewers, the plurality of representative images corresponding to respective item reviews included in a given video review.

Optionally, the operations further comprise: receiving information scanned from an optical code or a radio frequency tag associated with at least one item included in a corresponding video review; populating one or more detail information fields associated with the corresponding video review based at least in part on the received information scanned from the optical code or the radio frequency tag.

Optionally, the operations further comprise: receiving an indication that a third user is at a first physical location based at least in part on information provided by a mobile device of the third user; identifying one or more merchants in a vicinity of the third user's first physical location; identifying one or more video reviews for one or more items offered by the identified one or more merchants in a vicinity of the third user's first physical location; providing the third user with access to one or more of the identified video reviews for the one or more items offered by the identified one or more merchants in the vicinity of the user's first physical location; and transmitting information regarding one or more of the identified merchants to the mobile device of the third user. Optionally, identifying one or more video reviews for one or more items offered by the identified one or more merchants in the vicinity of the third user's first physical location is based at least in part on an interest expressed by the third user in at least one item and/or demographic information associated with the third user.

Optionally, the operations further comprise enabling, via an application hosted on the mobile device, the third user to record and tag a review of at least one item in a merchant establishment.

Optionally, the operations further comprise: providing for display on a user terminal of a third user a user interface configured to enable the third user to provide a first video review for upload to the system or a link to the first video review; enabling the third user to specify a representative image corresponding to the first video review; enabling the third user to provide a title for the first video review; enabling the third user to identify representative frames for a plurality of respective item reviews included in the first video review; enabling the third user to provide textual detail information for respective item reviews in the first video review; storing: the first video review; the specification of the representative image corresponding to the first video review; the title for the first video review; the identification of the respective representative frames for the respective plurality of item reviews included in the first video review; the textual detail information for the respective item reviews in the first video review; and enabling the first video review to be viewed via at least one video player, the at least one video player configured to display: the representative image corresponding to the first video review; the title for the first video review; the respective representative frames for the respective plurality of item reviews in a scrubber area; and the textual detail information for the respective item reviews in the first video review.

Optionally, the video player is configured to: detect when a first video review includes a first plurality of item reviews; access comments provided by users with respect to the first plurality of item reviews included in the first video review; determine which item review in the first plurality of item reviews in the first video review is currently being provided for display via the video player; cause the respective comments, for the item review determined to being currently provided for display via the video player, to be displayed in a comments area, wherein comments for the items reviews in the first video review not currently provided for display via the video player are not displayed.

Optionally, the operations further comprise: selecting an advertisement to be displayed as an interstitial advertisement between two item reviews; causing at least in part the selected advertisement to be displayed as an interstitial advertisement between two item reviews. Optionally, the operations further comprise: receiving a video review search query from a second user; identifying, from a plurality of video reviews, a subset of video reviews, including the second video review, corresponding to the search query based at least in part on respective textual detail information associated with item reviews included in the subset of video reviews; providing for display on a terminal of the second user search results including entries corresponding to at least a portion of the subset of video reviews, the portion including at least the second video review, wherein the search result entry for the second video review includes at least a first representative image for an item review included in the first video review that corresponds to the search query; at least partly in response to receiving a selection by the second user of the second video review entry in the search results, causing the item review, in the second video review, that corresponds to the search query to be played back to the second user via a video player without first playing back an initial item review in the second video review that does not correspond to the search query.

An example aspect provides non-transitory memory storing programmatic code that when executed by a computing system including at least one processing device, causes the computing system to perform operations comprising: providing for display on a terminal of a first user a document including an advertisement, the advertisement including at least text and an adjacent static image; at least partly in response to the first user activating a playback control associated with the static image included in the advertisement, causing at least in part a video player to play back a first consumer provided video review of at least a first item associated with the static image; providing, in association with the first consumer provided video review, one or more controls enabling the first user to: purchase the first item; indicate to other users that the user wants the first item and/or store an indication in association with a profile of the user an indication that the user wants the first item; record a second video review for at least the first item; and/or poll others to obtain feedback regarding the first item. The operations may further comprise, at least partly in response to an indication from the first user that the user wants to record a second video review for at least the first item, enabling the first user to record the second video review for the first item, enabling the first user to provide textual descriptive information regarding the second video review for the first item and/or automatically identifying textual descriptive information regarding the second video review based at least in part image recognition performed with respect to at least a portion of one image associated with or included in the second video review; and/or storing the textual descriptive information regarding the second video review for the first item in association with the second video review.

An example aspect provides a method, comprising: providing, via a content distribution system, for display on a terminal of a first user a document including an advertisement, the advertisement including at least text and an adjacent static image; at least partly in response to the first user activating a playback control associated with the static image included in the advertisement, causing at least in part a video player to play back a first consumer provided video review of at least a first item associated with the static image; providing, in association with the first consumer provided video review, one or more controls enabling the first user to: purchase the first item; indicate to other users that the user wants the first item and/or store an indication in association with a profile of the user an indication that the user wants the first item; record a second video review for at least the first item; and/or poll others to obtain feedback regarding the first item. At least partly in response to an indication from the first user that the user wants to record a second video review for at least the first item, enabling by the content distribution system: the first user to record the second video review for the first item; the first user to provide textual descriptive information regarding the second video review for the first item and/or automatically identifying textual descriptive information regarding the second video review based at least in part image recognition performed with respect to at least a portion of one image associated with or included in the second video review; storing the textual descriptive information regarding the second video review for the first item in association with the second video review.

An example aspect provides a system for distribution of video reviews, comprising: at least one processing device; non-transitory memory storing programmatic code that when executed by the at least one processing device, cause the system to perform operations comprising: providing for display on a user terminal of a first user a user interface configured to enable the first user to provide a first video review for upload to the system or a link to the first video review; enabling the user to specify a representative image corresponding to the first video review; enabling the user to provide a title for the first video review; enabling the user to identify initial frames for a plurality of respective item reviews included in the first video review; and/or enabling the user to provide textual detail information for respective item reviews in the first video review. The operations optionally further comprising storing the first video review, the specification of the representative image corresponding to the first video review, the title for the first video review, the identification of the respective initial frames for the respective plurality of item reviews included in the first video review, and/or the textual detail information for the respective item reviews in the first video review. The operations optionally further comprise receiving a video review search query from a second user, identifying, from a plurality of video reviews, a subset of video reviews, including the first video review, corresponding to the search query based at least in part on respective textual detail information associated with item reviews included in the subset of video reviews, providing for display on a terminal of the second user search results including entries corresponding to at least a portion of the subset of video reviews, the portion including at least the first video review, wherein the search result entry for the first video review includes at least a first representative image for an item review included in the first video review that corresponds to the search query. The operations further optionally comprise at least partly in response to receiving a selection by the second user of the first video review entry in the search results, causing the item review, in the first video review, that corresponds to the search query to be played back to the second user via a video player without first playing back an initial item review in the first video review that does not correspond to the search query.

An example aspect provides a system for distribution of video reviews, comprising: at least one processing device; non-transitory memory storing programmatic code that when executed by the at least one processing device, cause the system to perform operations comprising: providing for display on a user terminal of a first user a user interface configured to enable the first user to provide a first video review for upload to the system or a link to the first video review; enabling the user to specify a representative image corresponding to the first video review; enabling the user to provide a title for the first video review; enabling the user to identify initial frames for a plurality of respective item reviews included in the first video review; and/or enabling the user to provide textual detail information for respective item reviews in the first video review. The operations optionally further comprising storing the first video review, the specification of the representative image corresponding to the first video review, the title for the first video review, the identification of the respective initial frames for the respective plurality of item reviews included in the first video review, and/or the textual detail information for the respective item reviews in the first video review. Optionally, the video player is configured to display in a scrubber area a plurality of representative images selected by a given reviewer, the plurality of representative images corresponding to item reviews included in a given video review, wherein at least partly in response to a selection of a given image displayed in the scrubber area by second user, the video player plays back the corresponding item review.

An example system and method perform acts and operations comprising: receiving an indication that a user is at a first physical location based at least in part on information provided by a mobile device of the user; identifying one or more merchants in a vicinity of the user's first physical location; identifying one or more video reviews for one or more items offered by the identified one or more merchants in a vicinity of the user's first physical location; providing the user with access to one or more of the identified video reviews for the one or more items offered by the identified one or more merchants in the vicinity of the user's first physical location; and transmitting information regarding one or more of the identified merchants to the mobile device of the user. Optionally, identifying one or more video reviews for one or more items offered by the identified one or more merchants in the vicinity of the third user's first physical location is based at least in part on an interest expressed by the third user in at least one item and/or demographic information associated with the third user.

An example aspect provides a system for distribution of video reviews, comprising: at least one processing device; non-transitory memory storing programmatic code that when executed by the at least one processing device, cause the system to perform operations comprising: receiving, from a first user, a first video comprising a first review for a first item and a second review for a second item; receiving, in association with the first video, a plurality of user submitted tags including at least a first tag corresponding to the first review of the first item and a second tag corresponding to the second review of the second item; selecting, based at least in part on the user submitted tags, a first media file, wherein the first media file is not present in the first video as submitted by the first user and the first media file comprises at least an image of a third item; enabling the first video to be displayed in a video player on the terminal of a second user; wherein the video player is configured to: display in a scrubber area a representative image corresponding to the first review at a first location and a representative image corresponding to the second review at a second location; detect a selection by the user of the first representative image or the second representative image, and in response to a detection of a user selection of the first representative image or the second representative image cause at least a portion of the corresponding review to be displayed by the video player; optionally providing, in association with the first video and while at least a portion of first review of the first item is displayed in the video player, one or more controls enabling the second user to: purchase the first item; causing, at least in part, the first media file to be played by the video player between the first review of the first item, included in the first video, and the second review of the second item, included in the first video; providing, in association with the first media file and while at least the image of the third item is displayed, at least one control enabling the second user to purchase the third item; and at least partly in response to the second user activating the at least one control enabling the second user to purchase the third item, enabling a purchase process for the third item to be initiated.

Optionally, the operations further comprise enabling a third user to access the second video review for the first item via an advertisement comprising a static, non-video, image; and/or receiving information scanned from an optical code or a radio frequency tag associated with at least one item included in a corresponding video review, populating one or more detail information fields associated with the corresponding video review based at least in part on the received information scanned from the optical code or the radio frequency tag; and/or receiving an indication that a third user is at a first physical location based at least in part on information provided by a mobile device of the third user, and identifying a first set of merchant facilities in a vicinity of the third user's first physical location, wherein the third user's first physical location is not in the merchant facilities included in the first set of merchant facilities, identifying one or more video reviews for one or more items offered by the identified first set of merchant facilities, providing the third user with access to one or more of the identified video reviews for the one or more items offered by the identified first set of merchant facilities in the vicinity of the user's first physical location, and transmitting location information regarding one or more of the merchant facilities to the mobile device of the third user; and/or providing for display on a user terminal of a third user a user interface configured to enable the third user to provide a second video comprising respective reviews of respective items, enabling the third user to provide a title for the second video, enabling the third user to identify representative frames for a plurality of respective item reviews included in the second video, enabling the third user to provide textual detail information for respective item reviews in the third video, storing: the second video; the title for the second video; the identification of the respective representative frames for the respective plurality of item reviews included in the second video; the textual detail information for the respective item reviews in the second video; and enabling the second video to be viewed via at least one video player, the at least one video player configured to display: the representative image corresponding to the second video, the title for the second video, the respective representative frames for the respective plurality of item reviews in a scrubber area, and the textual detail information for the respective item reviews in the second video; and/or receiving a video review search query from a third user, identifying, from a plurality of videos, a subset of video corresponding to the search query from the third user based at least in part on respective textual detail information associated with item reviews included in the subset of video reviews, providing for display on a terminal of the third user search results including entries corresponding to at least a portion of the subset of video reviews, the entries comprising at least a second video, the second video comprising a third review of a fourth item and a fourth review of fifth item wherein the third review precedes the fourth review, and the second video is identified based at least in part on textual detail information associated with the fourth review, wherein the search result entry for the second video includes at least a first representative image for the fourth review, at least partly in response to receiving a selection by the third user of the second video entry in the search results, causing the fourth item review, in the second video, to be played back to the third user without first playing back the third review in the second video review; and/or receiving a video review search query from a third user, identifying, from a plurality of videos, a subset of video corresponding to the search query from the third user based at least in part on respective textual detail information associated with item reviews included in the subset of video reviews, providing for display on a terminal of the third user search results including entries corresponding to at least a portion of the subset of video reviews, the entries comprising at least a second video, the second video comprising a third review of a fourth item and a fourth review of fifth item wherein the third review precedes the fourth review, and the second video is identified based at least in part on textual detail information associated with the fourth review, wherein the search result entry for the second video includes at least a first representative image for the fourth review, at least partly in response to receiving a selection by the third user of the second video entry in the search results, causing the fourth item review, in the second video, to be played back to the third user without first playing back the third review in the second video review; and/or receiving at least one tag from a third party for the first review and storing the at least one tag from the third party in association with the first review. Optionally, the first set of merchant facilities comprises at least two merchant facilities; optionally identifying one or more video reviews for one or more items offered by the identified first set of merchant facilities in the vicinity of the third user's first physical location is based at least in part on an interest expressed by the third user in at least one item and/or demographic information associated with the third user; optionally the video player is configured to: detect that the first video includes more than one item review, access comments provided by users with respect to the first item review and the second item review included in the first video, determine which item review in the first video is currently being provided for display via the video player, and cause the respective comments, for the item review determined to being currently provided for display via the video player, to be displayed in a comments area, wherein comments for the items review in the first video review not currently provided for display via the video player are not displayed; optionally the first media file comprises a video advertisement, the video advertisement comprising the image of the third item; optionally the one or more controls enable the user to indicate to other users that the user wants the first item and/or store an indication in association with a profile of the second user an indication that the second user wants the first item.

An example aspect provides a system for distribution of video reviews, comprising: at least one processing device; non-transitory memory storing programmatic code that when executed by the at least one processing device, cause the system to perform operations comprising: receiving, in association with a first video comprising a first review of first item and a second review of a second item, a plurality of tags including at least a first tag corresponding to the first review of the first item and a second tag corresponding to the second review of the second item; selecting, based at least in part on one or more of the tags associated with the first video, a first media file, wherein the first media file is not present in the first video as submitted by the first user and the first media file comprises at least an image of a third item; enabling the first video to be displayed in a video player on the terminal of a second user, wherein the video player is configured to display in a scrubber area a representative image corresponding to the first review and a representative image corresponding to the second review; causing, at least in part, the first media file to be played by the video player between the first review of the first item, included in the first video, and the second review of the second item, included in the first video.

An example aspect provides a method comprising: receiving at at least one computer system comprising hardware, in association with a first video comprising a first review of first item and a second review of a second item, a plurality of tags including at least a first tag corresponding to the first review of the first item and a second tag corresponding to the second review of the second item; selecting by at least one computer system comprising hardware, based at least in part on one or more of the tags associated with the first video, a first media file, wherein the first media file is not present in the first video as submitted by the first user and the first media file comprises at least an image of a third item; enabling, by at least one computer system comprising hardware, the first video to be displayed in a video player on the terminal of a second user, wherein the video player is configured to display in a scrubber area a representative image corresponding to the first review and a representative image corresponding to the second review; causing, at least in part by at least one computer system comprising hardware, the first media file to be played by the video player between the first review of the first item, included in the first video, and the second review of the second item, included in the first video.

An aspect of the disclosure is a system for distribution of video reviews, comprising: at least one processing device; non-transitory memory storing programmatic code that when executed by the at least one processing device, cause the system to perform operations comprising: receiving locator information associated with a first item review of a first item, the first item review comprising a video hosted on a third party video content hosting site; receiving a first plurality of tags associated with the first item review from a source different than the third party video content hosting site; storing, remote from the third party video content hosting site, the first plurality of tags in association with the locator associated with the first item review; providing a user interface for display on a user terminal, the user interface configured to enable the user to access the first item review; at least partly in response to the first user requesting the first item review, accessing at least a portion of the first plurality of tags and causing one or more of the first plurality of tags to be displayed on the user terminal in association with the first item review; providing for display, adjacent to, but not overlaying the first item review, and while at least a portion of first item review is displayed in a video player on the user terminal, one or more controls enabling the user to: purchase the first item; and/or indicate to other users that the user wants the first item; and/or ask other users to indicate their opinion of the first item; wherein the first item review is streamed from a source different than a source of the video player.

An aspect of the disclosure is a method for distribution of video reviews, the method comprising: receiving at a computer system comprising hardware locator information associated with a first item review of a first item, the first item review comprising a video hosted on a third party video content hosting site; receiving at the computer system a first plurality of tags associated with the first item review from a source different than the third party video content hosting site; storing by the computer system, remote from the third party video content hosting site, the first plurality of tags in association with the locator associated with the first item review; providing a user interface for display on a user terminal, the user interface configured to enable the user to access the first item review; at least partly in response to the first user requesting the first item review, accessing by the computer system at least a portion of the first plurality of tags and causing one or more of the first plurality of tags to be displayed on the user terminal in association with the first item review; providing for display, adjacent to, but not overlaying the first item review, and while at least a portion of first item review is displayed in a video player on the user terminal, one or more controls enabling the user to: purchase the first item; and/or indicate to other users that the user wants the first item; and/or ask other users to indicate their opinion of the first item; wherein the first item review is streamed from a source different than a source of the video player.

An aspect of the disclosure is a non-transitory memory storing programmatic code that when executed by a processing device comprising hardware, cause the processing device to perform operations comprising: receiving locator information associated with a first item review of a first item, the first item review comprising a video hosted on a third party video content hosting site; receiving a first plurality of tags associated with the first item review from a source different than the third party video content hosting site; storing, remote from the third party video content hosting site, the first plurality of tags in association with the locator associated with the first item review; providing a user interface for display on a user terminal, the user interface configured to enable the user to access the first item review; at least partly in response to the first user requesting the first item review, accessing at least a portion of the first plurality of tags and causing one or more of the first plurality of tags to be displayed on the user terminal in association with the first item review; providing for display, adjacent to, but not overlaying the first item review, and while at least a portion of first item review is displayed in a video player on the user terminal, one or more controls enabling the user to: purchase the first item; and/or indicate to other users that the user wants the first item; and/or ask other users to indicate their opinion of the first item; wherein the first item review is streamed from a source different than a source of the video player.

A review platform for consumable items such as products and services (sometimes generally referred to as "items") will now be described. In the following exemplary description numerous specific details are set forth in order to provide a more thorough understanding of example embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention.

Figure 1C:
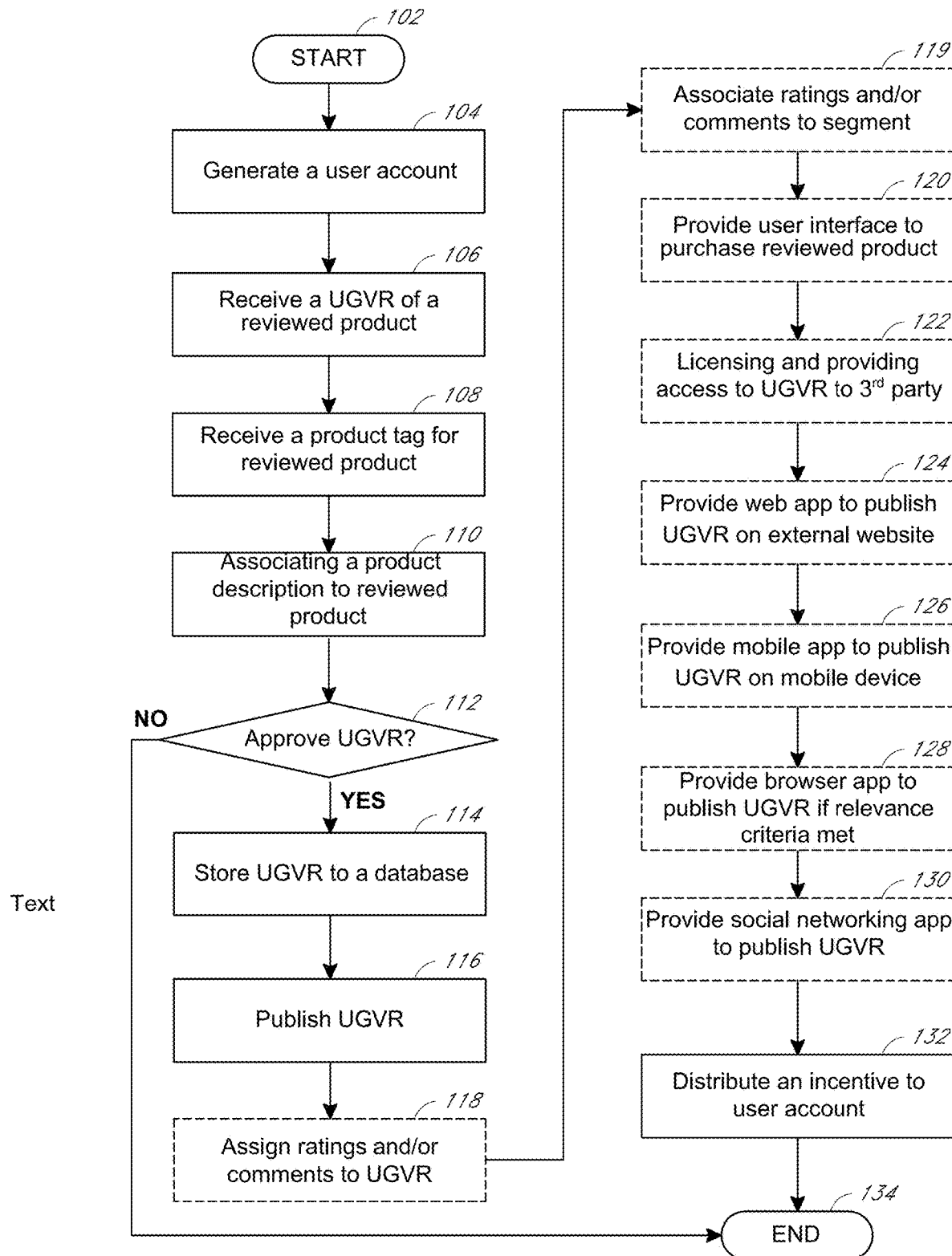
FIG. 1C illustrates a flowchart of an exemplary method in accordance with the system and methods for providing user generated user reviews described herein.

FIG. 1C illustrates a flowchart of an exemplary method in accordance with the system and methods for providing user generated user reviews described herein. A user account is generated at step 104. The user account may be generated for use on a host networked location (e.g., a website) by a registered user. The host networked location (which in this example is in the form of a website) may be addressed to a unique domain name or other network resource locator, and be publically accessible by desktop computers, mobile computers, tablet computers, and mobile phones with a wired or wireless internet network connection. The host website may provide an interface to a registered user of the host website for generating a user account associated with the registered user. The registered user may be requested to provide to the host website a set of user account information. In some embodiments, the set of user account information comprises name, screen name, password, residential address, email address, phone number, age, sex, and other information. The user account may be one of thousands or millions of user accounts generated for use on the host website. To confirm the identity of the registered user for subsequent access of the host website, the registered user is prompted to log-in by entering the registered user's screen name and password. If the registered user's entered screen name and password matches the previously provided screen name and password, then the registered user is given reviewer access to the host website and is identified and tracked by the user account. Compared to someone without a successful log-in into a user account, the registered user may be granted additional access to the host website after a successful log-in into the user account or log-in via other authentication methods such as Open Authentication (OAuth) or any other suitable authentication method.

Figure 3:
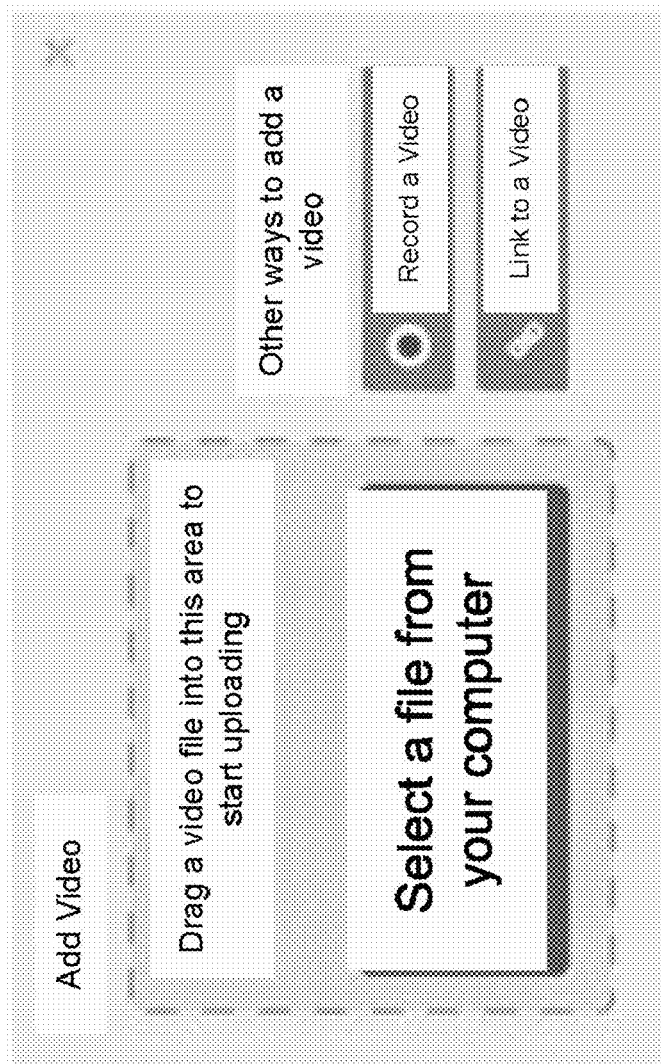
FIG. 3 illustrates an exemplary screenshot of sending or uploading a user generated video review in accordance with the system and methods for providing user generated user reviews described herein.
Figure 4:
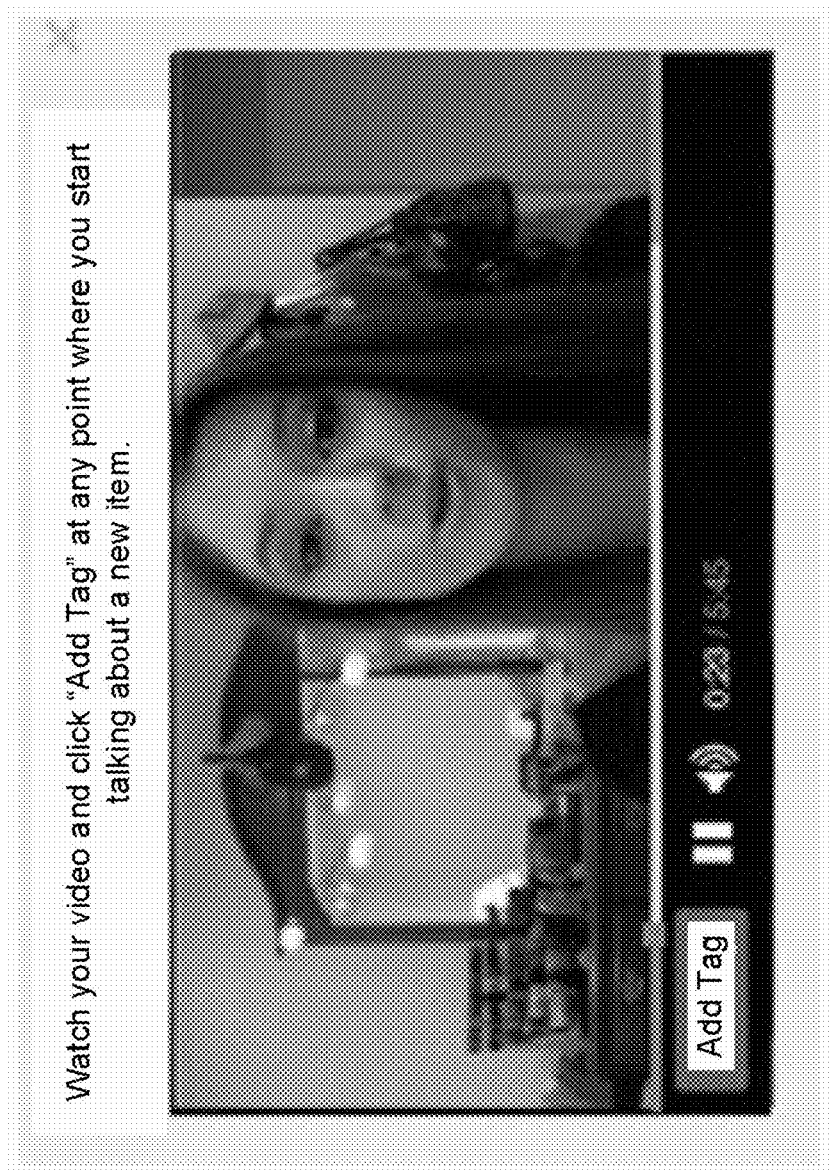
FIG. 4 illustrates an exemplary screenshot of creating a product tag in accordance with the system and methods for providing user generated user reviews described herein.
Figure 5:
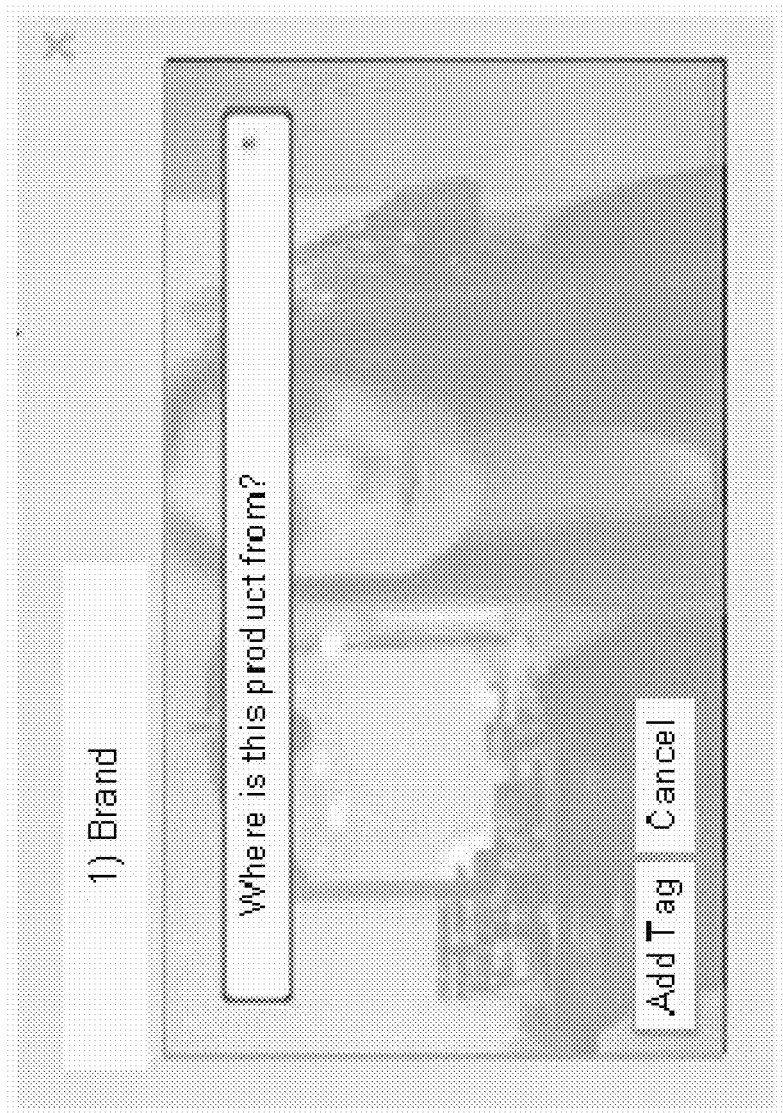
FIG. 5 illustrates an exemplary screenshot of creating a product tag in accordance with the system and methods for providing user generated user reviews described herein.
Figure 6:
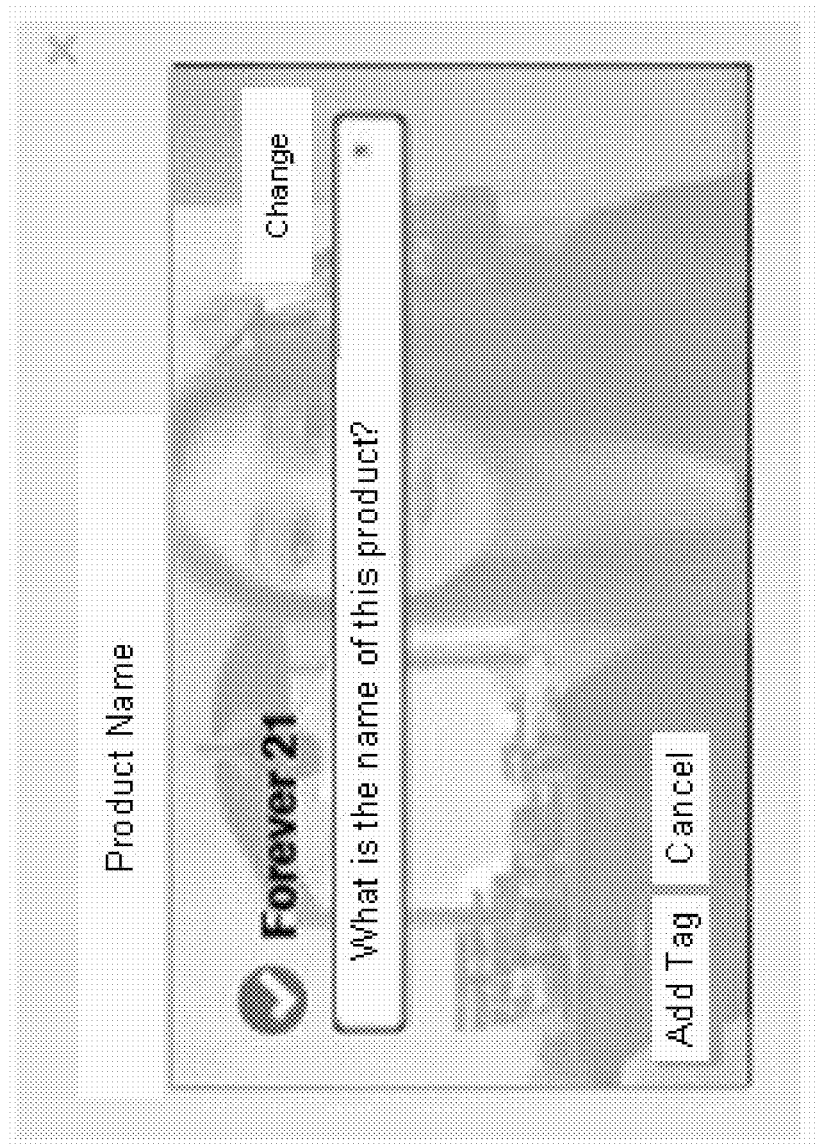
FIG. 6 illustrates an exemplary screenshot of creating a product tag in accordance with the system and methods for providing user generated user reviews described herein.
Figure 7:
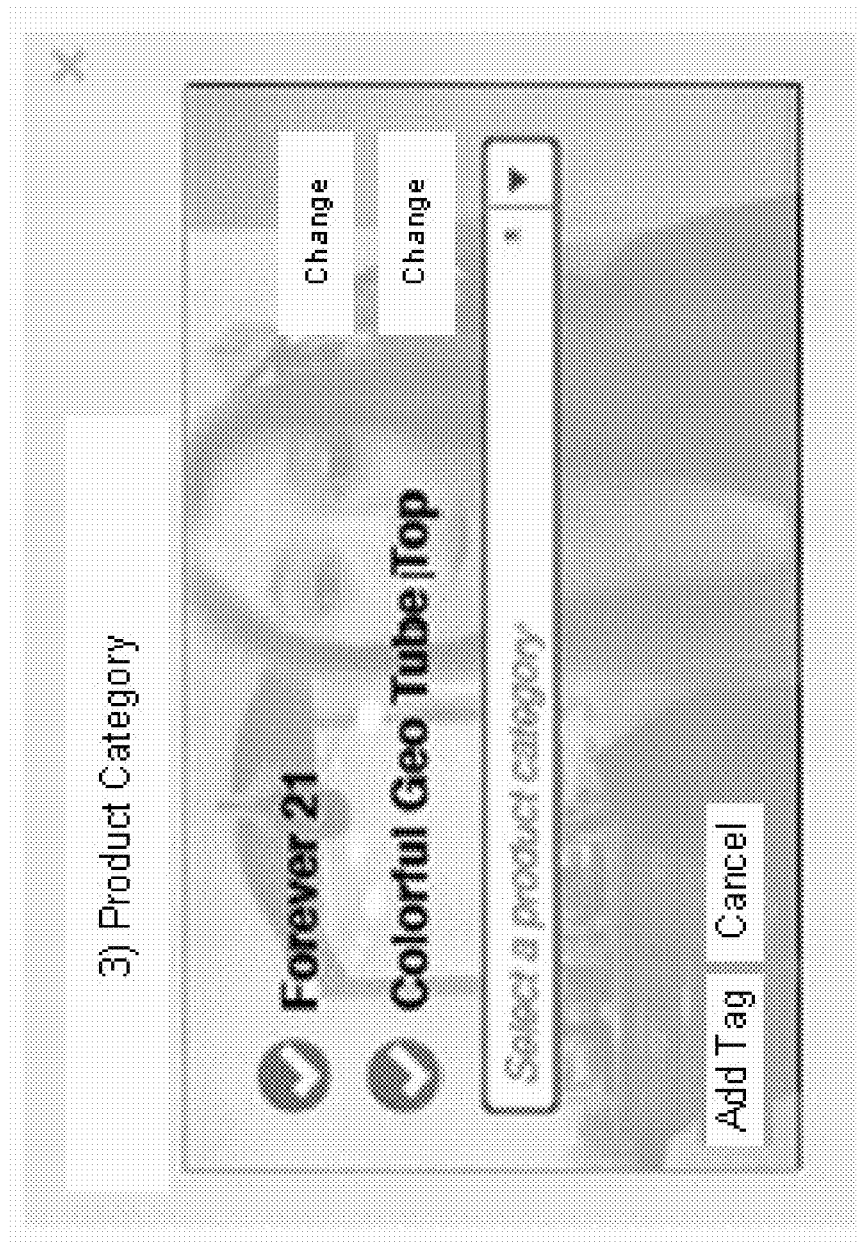
FIG. 7 illustrates an exemplary screenshot of creating a product tag in accordance with the system and methods for providing user generated user reviews described herein.
Figure 8:
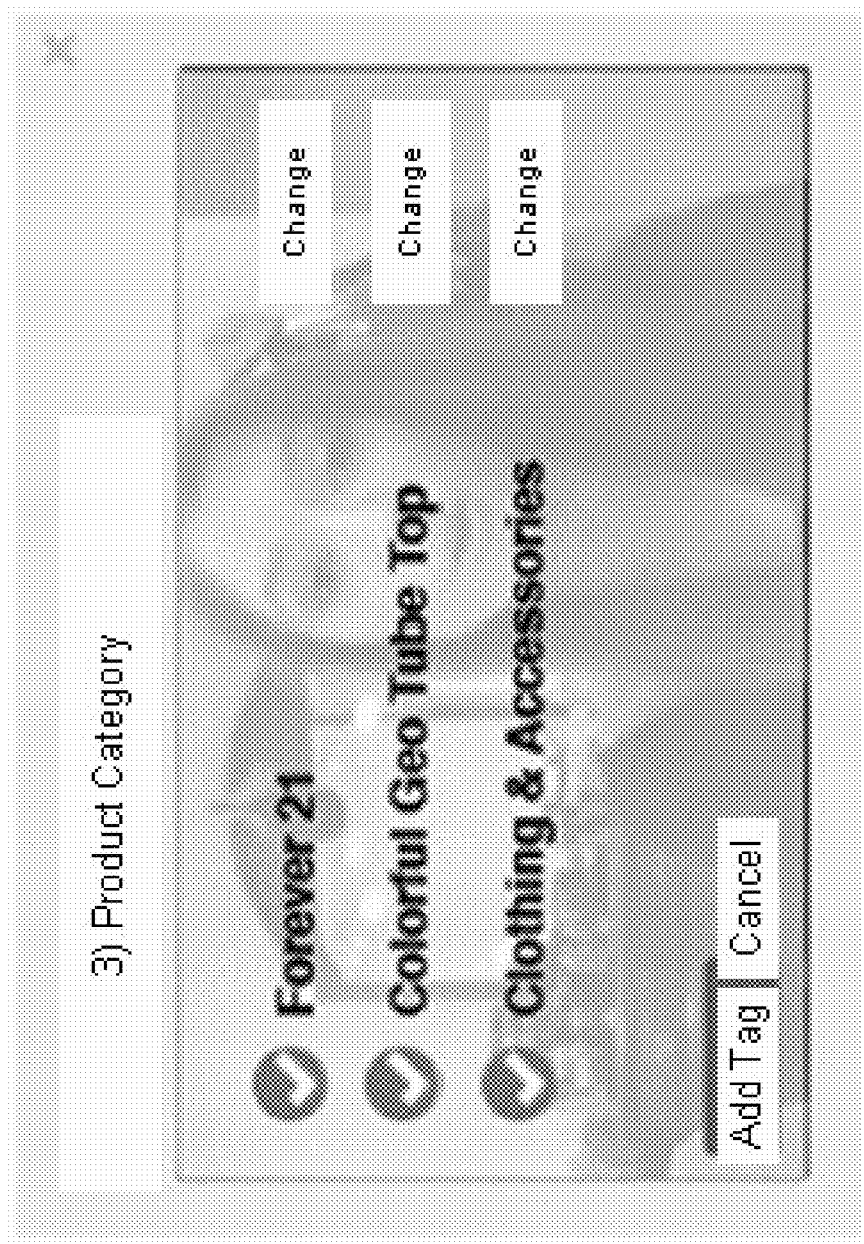
FIG. 8 illustrates an exemplary screenshot of creating a product tag in accordance with the system and methods for providing user generated user reviews described herein.

In some embodiments, once the registered user has a successful log-in into the user account, the registered user may send a user generated video review (UGVR) to be received by the host website at step 106. FIG. 3 illustrates an exemplary user interface enabling a user to select a user generated video review to upload (e.g., by dragging a video file to the user interface, by selecting a file via browse control, or otherwise), to record a user generated video review, or to link to a user generated video review or to otherwise provide a user generated video review in accordance with the system and methods for providing user generated user reviews described herein. The user generated video review comprises audio and video data which may be sent from a terminal, such as a desktop computer or a mobile device. The mobile device may be a notebook computer, tablet computer, mobile phone, or any portable electronic device able to communicate with the host website. The user generated video review may provide useful information about a reviewed product to a viewer of the user generated video review. The viewer of the user generated video review may be a potential costumer for the reviewed product featured in the user generated video review.

A user generated video review that features a reviewed product may include useful information to a potential costumer such as a demonstration of the unpacking of the product, visual views of the product from different angles and distances, visual and audio demonstrations of uses or functionality, and spoken descriptions of the reviewed product. As an example, the user generated video review featuring a new mobile phone may begin with the registered user unboxing a newly purchased mobile phone, assembling the mobile phone, turning the mobile phone around in the hands, turning the mobile phone on, and using a few of the mobile phone's functions. At the same time, the registered user may speak of facts and opinions on the packaging, visual appearance, and usefulness of the features of the mobile phone.

As noted above, the registered user may choose to upload a video file, record a video, or link a video of the user generated video review to be received by the host website using, for example, the interface illustrated in FIG. 3. Uploading a video may be accomplished by having a preexisting video file ready and sending the preexisting video file to the host website. In some embodiments, the preexisting video file may have been created by a video recorder such as a digital camera, digital camcorder, a webcam, a tablet, a mobile phone, or some other video recording hardware. The preexisting video file may be in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. The preexisting video file may be stored on a solid state disk drive, hard disk drive, random access memory, or some other digital storage medium. An upper and lower limit may be placed to on the preexisting video file to restrict the file size or the length of video.

The registered user may also choose to record a new video instead of uploading a preexisting video file. The registered user may record the user generated video review with a digital camera, digital camcorder, a webcam, a tablet, a mobile phone, or some other video recording hardware. Video data may be sent live and piecemeal as a stream by the registered user and received by the host website. The streamed video data may be in a raw or compressed format.

The registered user may link a video as another option. The registered user may specify a network-accessible location of a preexisting video of the user generated video review. The preexisting video may be located on any network-accessible location such as an external website, an ftp server, or an online database. The host website finds the user generated video review based on the network-accessible location specified by the registered user.

In some embodiments, the user generated video review is recorded at and/or received from an interactive kiosk. The interactive kiosk may be located in a shopping center or retail store. The interactive kiosk may be a station equipped with a video camera and/or recorder, a user interface configured to receive user inputs (e.g., tag information, a review title, a still image, and/or other information discussed herein), and a network connection (e.g., to the Internet). Optionally, a scanner is provided (e.g., an optical and/or RF scanner) configured to scan information encoded on an item tag (e.g., a 2D or 3D barcode, or an RFID tag). Some or all of the scanned information (e.g., a product name, brand, module identifier, color, price, etc.) may be used to automatically populate tags associated with a review. A shopper may carry a store item to the kiosk in a shopping center or retail store and substantially immediately create and send a user generated video review of the item obtained at the store or shopping center. In addition or instead, the user generated video review may be created and submitted via a mobile device of the user.

The host website receives and stores a product tag associated with the reviewed product at step 108. The product tag may be stored in association with the corresponding video review. The product tag may be created by the registered user as words or phrases which describer (e.g., accurately describe) the reviewed product and/or their feelings regarding the reviewed product. FIGS. 4-8 illustrate exemplary user interfaces utilized in creating a product tag in accordance with the system and methods for providing user generated user reviews described herein. The product tag may include words or phrases identifying brand, model, size, color, visual traits, functional specifications, uses, and other descriptive text. The user may upload photos or find links to pictures of the tagged product. These product images are optionally associated with the aforementioned tags and in turn displayed during video playback. The product images can be displayed as part of the video playback scrubber and/or embedded into the video itself. For example, the product images can appear as part of the video playback scrubber as the video proceeds, and change during playback as different products are discussed, or entirely new/different product images can be shown as needed to support the review.

In some embodiments, the product tag may be received by obtaining labeling data, such as barcode data scanned from a barcode or RFID data scanned from an RIFD tag, and executing a product tag search to identify a product tag based, at least in part, on the labeling data. The barcode data may be extracted by scanning a barcode label affixed to a product, a product package, or a shelf on which the product is stored. Scanning refers to any method of extracting encoded data such as RFID data from a RFID tag using a RFID reader, or barcode data from a barcode label, including but not limited to using a pen-type reader, laser scanner, or a camera from a mobile device. Barcode data may be a partial or full image, number or other identifying data. The product tag search may be executed by a mobile device or by the host website.

The product tag is used to associate a product description to the reviewed product at step 110. In some embodiments, the product description contains text describing brand, model, size, color, visual traits, functional specifications, uses, and other descriptive information. The text may be obtained from the registered user, individuals experienced with the reviewed product, viewers of the user's review, manufacturer or seller of the reviewed product, encyclopedia, journal, magazine, or product description database. In some embodiments, a product description search is executed to identify the product description. The product description search may search a description database or other digital sources using the product tag to identify an appropriate product description for the reviewed product.

In some embodiments, the user generated video review features at least one additional reviewed product, where each reviewed product associates with a different video segment in the user generated video review. In these embodiments, the user generated video review includes a plurality of video segments. Each video segment individually associates with a reviewed product which is associated with a product tag. The registered user individually creates a product tag and defines a video segment to associate with each reviewed product.

In some embodiments, each reviewed product in the user generated user review is additionally associated with a tagged portion of a display area of the user generated video review. The display area of the user generated video review is an area of a user interface containing dimensions of the video of the video generated video review. The tagged portion of the display area contains dimensions of the visual representation of each reviewed product. The tagged portion of the display area associated with the reviewed product may change in size and location during the video segment associated with the reviewed product.

In one or more embodiments, the user generated video review may be edited by the registered user on the host website. Editing refers to any method of altering the user generated video review, including but not limited to shortening the length of the user generated video review by removing selected segments or altering the brightness, contrast, or colors of the user generated video review. Editing also includes amending or changing tags associated with the video review.

Optionally, the user generated video needs to be automatically and/or manually approved prior to posting. For example, the user generated video review is approved if a set of criteria are met at step 112. The set of criteria may help ensure that the user generated video review is sufficiently useful to a viewer. Criterion may include suitability of product tags, length, visual quality, audio quality, clarity of speech, usefulness of review, identity of said reviewed product, or identity of said user account. For example, the preexisting video file may be limited to a file size of 5 megabytes to 500 megabytes and the length of video may be limited to 15 seconds to 15 minutes in order for the video to be posted. Limiting the size and length of the user generated video review has a useful effect of eliminating preexisting video files which likely do not contain enough desirable content or contains too much undesirable content. In another example, visual quality may be enforced by not approving videos with a resolution below a specified level, such as below 640×480 pixels or 480p. The approval process for the user generated video review may be manual or may be partially or fully automated by a software algorithm. A user generated review that is not approved will not be published on the host website at step 134.

The user generated video review is stored to a database comprising a plurality of user generated video reviews at step 114. The user generated video review is stored as a video file in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. In some embodiments, the database includes at least one computer storage medium with a network connection to the host website. The user generated video review may be stored on database for an indefinite period of time until a decision is made to delete the user generated video review. In some cases, the user generated user review will be deleted from the database based on date of creation, the existence of newer user generated video reviews featuring the same reviewed product, video rating, or user account rating. As an example, a user generated video review that is over a year old, have fewer than 10 views in 6 months, or have a video rating below a certain threshold. The database may store multiple copies of the user generated video review in multiple computer storage mediums. This forms a backup enabled system so that the user generated video review will not be lost in the event a computer storage medium fails.

The user generated video review is published at step 116. In some embodiments, the user generated video review is made available to all viewers of the host website and the user generated video review may be found and viewed by any viewer without a log-in process. This enables the host website to provide a plurality of user generated video reviews as a free service to the public. In another embodiment, the user generated video review is made available to only a set of viewers and may only be viewed by viewers who have completed a log-in process.

The host website may implement an interface to enable a viewer to find user generated video reviews pertaining to the viewer's interest from the plurality of user generated video reviews available on the database. One such interface may be a search tool which enables a viewer to enter a word or phrase describing a brand, model, size, color, visual traits, functional specifications, uses, or another characteristic of a reviewed product. With a software algorithm, the search tool attempts to find at least one user generated video review that features a relevant reviewed product based on the word or phrase entered (e.g., by matching one or more query terms with video review tags). If the software algorithm finds more than one relevant user generated video review result, the software algorithm may sort the results according to a relevance criterion such as date of creation of the user generated video review result. In the embodiments where the user generated video review features a plurality of reviewed products and each reviewed product associates with a different video segment, the search tool will additionally find the relevant video segment.

Another interface enables the viewer to find a user generated video review by selecting a main category of reviewed products then navigating through at least one subcategory. A user generated video review, or a video segment in a user generated video reviews which feature a plurality of reviewed products, may be organized into categories and subcategories based on brand, model, size, color, visual traits, functional specifications, uses, or another characteristic of the reviewed product.

In some embodiments, a video rating may be associated with the user generated video review based on a collection of input from viewers of the user generated video review at step 118. A user account rating may then be assigned to the user account based on the video ratings of each of the user generated video reviews received from the user account. In some embodiments, the video rating or the user account rating have an effect on the incentive distributed to the user account.

In some embodiments, a segment rating may be individually associated with each video segment featuring each reviewed product in the user generated video review at step 119. The segment rating is based on a collection of input from viewers of the video segment. User generated comments may also be individually associated with each video segment featuring each reviewed product in the user generated video review at step 119. In embodiments, the number of comments made during a particular review is shown to a viewer of the review. As discussed in greater detail elsewhere herein, comments may be segmented by respective items presented within a video review.

In some embodiments, a user interface is provided to enable a viewer of a user generated video review to purchase the reviewed product featured in the user generated video review at step 120. The user interface may be a hypertext transfer protocol link that enables the viewer to quickly navigate a browser to an external website to purchase the reviewed product. The user interface may enable the viewer to directly purchase the reviewed product from the host website using common tools of online shopping known in art. The user interface may also provide instructions on methods that the viewer may apply to purchase the reviewed product. In some embodiments, the interface enables the viewer to select the tagged portion of a display area associated with the reviewed product to purchase the reviewed product. A display area of the user generated video review is an area of a display screen containing dimensions of the video of the video generated video review.

In some embodiments, the user generated video review may be licensed to a third party to provide access to the user generated review to the third party at step 122. Licensing access to the user generated video reviews is an effective method of monetizing the value of the plurality of user generated video reviews stored on the database. Third parties include suppliers, retailers, online shopping websites, online informational websites, external databases, mobile device manufacturers, software developers, and other such entities. In some embodiments, the third party may be monetarily charged for each user generated video review accessed. In some other embodiments with a subscription system, the third party may be charged a monthly or yearly fee for access to the video player, related technology and/or a large set of user generated video reviews and/or the third party may share revenues, related to the use of the video player, related technology and/or the user generated reviews, with the subscription system operator. In some embodiments, the video player is an intelligent gathering mechanism for analytics of consumer information, and tracks user behavior, such as what products are purchased on what days and at what time, cart size, products purchased, comments made per product, ratings per product, polling results conducted by the video player, demo information, and the like. The video player may be linked to and/or displayed embedded within editorial content (e.g., third party editorial content), within advertisements (e.g., optionally including banner advertisements, pre and/or post roll in a video), or elsewhere. The video player and/or content may be licensed to third parties, optionally on a revenue sharing basis (e.g., where the provider of the video player and/or content receives revenue from licensee as a result of purchases or advertising revenues received as a result of a user utilizing the video player and/or content) or on a flat fee basis.

Figure 9:
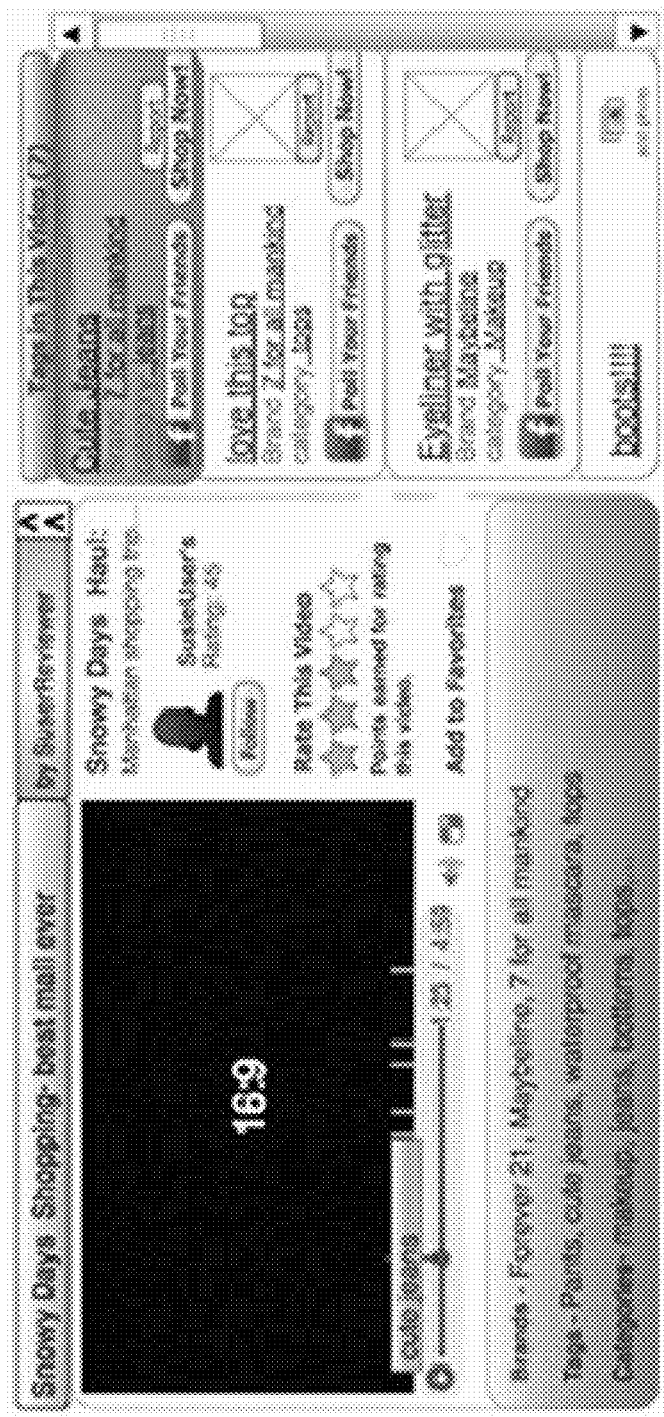
FIG. 9 illustrates an exemplary screenshot of a web application for publishing a user generated video review.

In some embodiments, a web application is provided to publish the user generated video review on an external website at step 124. FIG. 9 illustrates an exemplary user interface of a web application for publishing a user generated video review in accordance with the system and methods for providing user generated user reviews described herein. The web application may be a software program for a video player to be embedded on the external website. An external website containing a web content may use the web application to embed the video player to play a user generated video review featuring a reviewed product that is related to the web content. A user of the external website may view a user generated video review with the web application on the external website.

In some embodiments, a mobile application is provided to publish the user generated video review on a mobile device at step 126.

A user of the mobile device may view a user generated video review embedded within an advertisement or within the webpage itself in-line with website content with the mobile application on the mobile device.

In some embodiments, a browser application is provided to a browser, where the browser application publishes the user generated video review on the browser if a set of relevance criteria are met at step 128. The relevance criteria compares the reviewed product featured in the user generated video review with a content displayed on the browser. An example implementation of this embodiment enables a user performing a search on a search engine in the browser to view a user generated video review featuring a reviewed product related to the search on the search engine.

In some embodiments, a social networking application is provided or accessed, where the social networking application publishes the user generated video review on a social networking website at step 130. A viewer of the user generated video review may use the social networking application to display the user generated video review on a social networking website. Users of the social networking website may then view the user generated video review on the social networking website. In some embodiments, the users of the social networking website may specify whether they "like" or "dislike" the product and/or service reviewed in the user generated video review, or purchase the reviewed product featured in the user generated video review. In an embodiment, the users may specify that they want or own the product or service reviewed. The number of users indicating this desire can also be displayed to the user.

An incentive is optionally distributed to the user account associated with the user generated video review at step 132. The incentive acts as a reward to the registered user for creating an approved user generated review and as a motivation to create more user generated video reviews in the future. Incentives may be distributed based on criteria such as, but not limited to the number of approved user generated reviews received from the user account, the quality of the registered user's user generated video reviews, the number of views for the user generated video review, the ratings given by viewers of the user generated video review, and/or the number of people who "like" the user generated video review on a social networking website. Incentives may be distributed based on advertising revenue the host website received in connection with the user generated video review. Incentives may be distributed based on sales revenue received in connection with purchases of the reviewed product featured in the user generated video review. Incentives may be distributed based on licensing fees from third parties for access to the user generated review. In some embodiments, the incentive may include monetary sums and be distributed to the registered user by check, electronic wire transfer, store gift card, or online shopping credit. The incentive may include a visually distinguishable and prestigious design which highlights the registered user's reviewing abilities or the registered user's quality of video reviews. The incentive may include points which may be used for discounts on new products that are affiliated with the host website.

Figure 2:
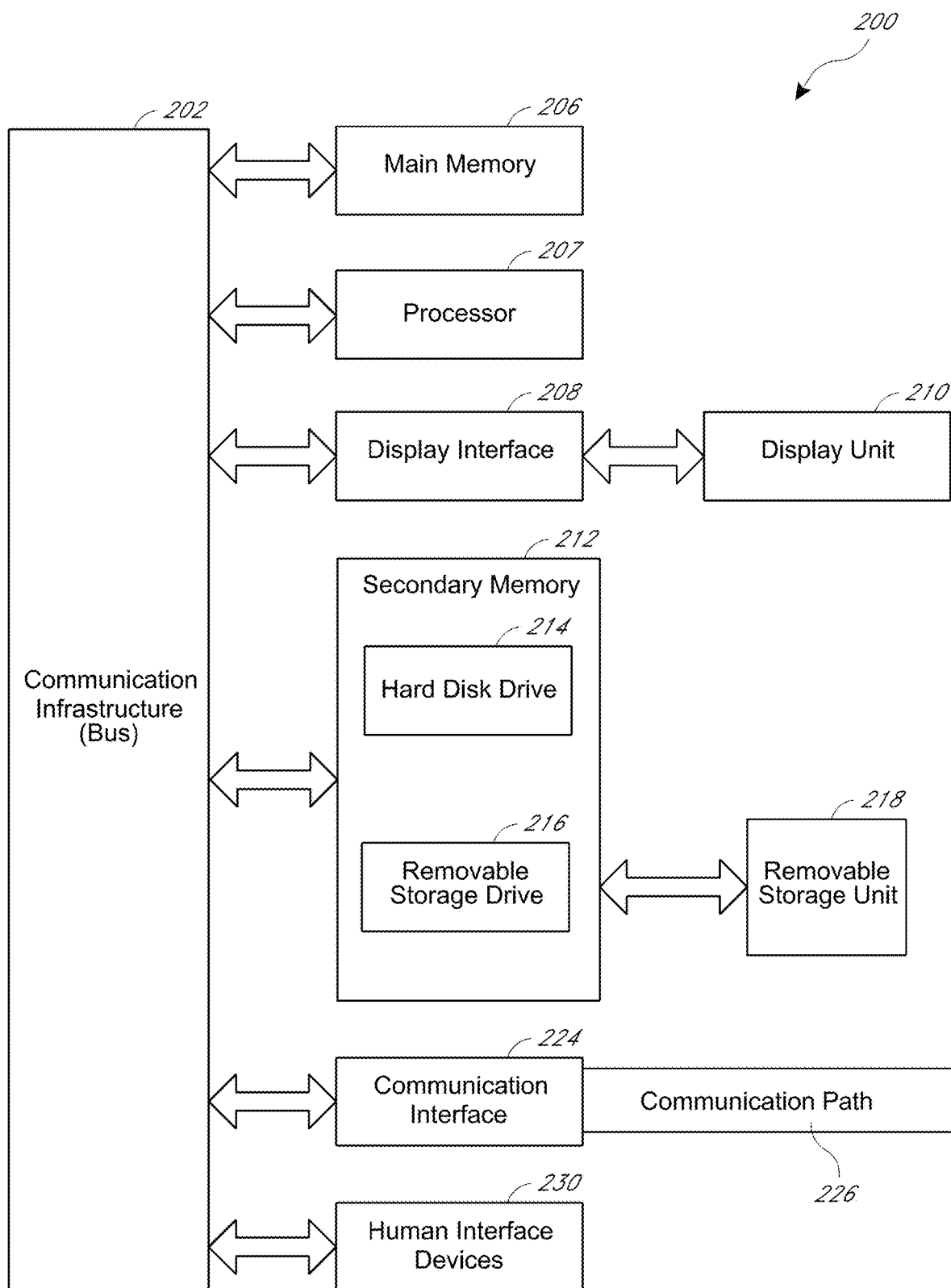
FIG. 2 illustrates a computer system in accordance with the system and methods for providing user generated user reviews described herein.

FIG. 2 illustrates a computer system in accordance with the system and methods for providing user generated user reviews described herein. A general-purpose computer and peripherals, when programmed as described herein, may operate as a specially programmed computer 200 capable of implementing one or more methods, apparatus and/or systems of the solution described in this disclosure. A processor 207 may be coupled to a bi-directional communication infrastructure 202 such as communication infrastructure system 202. The communication infrastructure 202 may generally be a system bus that provides an interface to the other components in the general-purpose computer system such as the processor 207, a main memory 206, a display interface 208, a secondary memory 212, and/or a communication interface 224.

The main memory 206 may provide a computer-readable medium for accessing and executing stored data and applications. The display interface 208 may communicate with a display unit 210 that may be utilized to display outputs to a user of the specially programmed computer 200. The display unit 210 may comprise one or more monitors that may visually depict aspects of the computer program to the user. The main memory 206 and the display interface 108 may be coupled to the communication infrastructure 202, which may serve as the interface point to the secondary memory 212 and the communication interface 224. The secondary memory 212 may provide additional computer-readable medium resources beyond the main memory 206, and may generally function as a storage location for computer-readable instructions to be executed by processor 207. Either fixed or removable computer-readable media may serve as the secondary memory 212. The secondary memory 212 may comprise, for example, a hard disk 214 and a removable storage drive 216 that may have an associated removable storage unit 218. There may be multiple sources of the secondary memory 212 and systems implementing the solutions described in this disclosure may be configured as needed to support the data storage requirements of the user and the methods described herein. Numerous types of data storage devices may serve as repositories for data utilized by the specially programmed computer 200. For example, random access memory, read-only memory, solid-state storage, magnetic storage, optical or magnetic-optical storage, or any other available mass storage technology that provides a repository for digital information may be used.

The communication interface 224 may be coupled to the communication infrastructure 202 and may serve as a conduit for data destined for or received from a communication path 226. A network interface card (NIC) is an example of the type of device that once coupled to the communication infrastructure 202 may provide a mechanism for transporting data to the communication path 226. Computer networks such Local Area Networks (LAN), Wide Area Networks (WAN), Wireless networks, optical networks, distributed networks, the Internet or any combination thereof are some examples of the type of communication paths that may be utilized by the specially programmed computer 200. The communication path 226 may comprise any type of telecommunication network or interconnection fabric that can transport data to and from communication interface 224.

To facilitate user interaction with the specially programmed computer 200, one or more human interface devices (HID) 230 may be provided. Some examples of HIDs that enable users to input commands or data to the specially programmed computer 200 may comprise a keyboard, mouse, touch screen devices, microphones or other audio interface devices, motion sensors or the like, as well as any other device able to accept any kind of human input and in turn communicate that input to processor 207 to trigger one or more responses from the specially programmed computer 200 are within the scope of the system disclosed herein.

While FIG. 2 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 2.

The non-transitory computer-readable medium may store computer-readable instructions. The processor 207 executes the computer-readable instructions to accept a plurality of licensees. Each licensee may be an individual person, a group of persons, or business entities. Licensees may be recruited in-person, over the telephone, or on an Internet website. Licensees may be self-recruited or may be recruited by another entity. Self-recruitment may be accomplished by submitting information on an Internet website. Preferably, licensees will be entities with sales expertise, with knowledge of customer needs, with knowledge of consumer trends, with skill in business development, or with any other similarly desirable quality.

The processor 207 executes the computer-readable instructions to generate a user account. The user account may be generated for use on a host website by a registered user. The host website may be addressed to an unique domain name and be publically accessible by desktop computers, mobile computers, tablets, and mobile phones with a wired or wireless internet network connection. The host website may provide an interface to a registered user of the host website for generating a user account associated with the registered user. The registered user may be requested to provide to the host website a set of user account information. In some embodiments, the set of user account information comprises name, screen name, password, residential address, email address, phone number, age, sex, and/or other information. The user account may be one of thousands or millions of user accounts generated for use on the host website. To confirm the identity of the registered user for subsequent access of the host website, the registered user is optionally prompted to log-in by entering the registered user's screen name and password. If the registered user's entered screen name and password matches the previously provided screen name and password, then the registered user is given reviewer access to the host website and is identified and tracked by the user account. Compared to someone without a successful log-in into a user account, the registered user may be granted additional access to the host website after a successful log-in into the user account.

The processor 207 executes the computer-readable instructions to receive a user generated video review associated with the user account, where the user generated video review features at least one reviewed product. The user generated video review comprises audio and video data which may be sent from a desktop computer or a mobile device. The mobile device may be a notebook computer, tablet computer, mobile phone, or any portable electronic device able to communicate with the host website. The user generated video review should ideally provide useful information about a reviewed product to a viewer of the user generated video review. The viewer of the user generated video review will most typically be a potential costumer for the reviewed product featured in the user generated video review. A user generated video review that features a reviewed product may include useful information to a potential customer such as a demonstration of the unpacking of the product, visual views of the product from different angles and distances, visual and audio demonstrations of uses or functionality, and spoken descriptions of the reviewed product.

The registered user may choose to upload a video file, record a video, or link a video of the user generated video review to be received by a review server supporting the host website. Uploading a video may be accomplished by having a preexisting video file ready and sending the preexisting video file to the host website. In some embodiments, the preexisting video file may have been created by a video recorder such as a digital camera, digital camcorder, a webcam, a tablet, a mobile phone, or some other video recording hardware. The preexisting video file may be in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. The preexisting video file may be stored on a solid state disk drive, hard disk drive, random access memory, or some other digital storage medium. An upper and lower limit may be placed to on the preexisting video file to restrict the file size or the length of video.

The registered user may also choose to record a video "live" instead of uploading a preexisting video file. The registered user may record the user generated video review with a digital camera, digital camcorder, a webcam, a tablet, a mobile phone, or some other video recording hardware. Video data may be sent live and piecemeal as a stream by the registered user and received by the host website. The streamed video data may be raw or compressed format.

The processor 207 executes the computer-readable instructions to receive a product tag associated with a reviewed product selected from the at least one reviewed product. The product tag may be created by the registered user as words or phrases which accurately describe the reviewed product. The product tag may include words or phrases identifying brand, model, size, color, visual traits, functional specifications, uses, and other descriptive text.

The processor 207 executes the computer-readable instructions to associate a product description to the reviewed product based on the product tag. In some embodiments, the product description contains text describing brand, model, size, color, visual traits, functional specifications, uses, and other descriptive information. The text may be obtained from the registered user, individuals experienced with the reviewed product, manufacturer or seller of the reviewed product, encyclopedia, journal, magazine, or product description database. In some embodiments, a product description search is executed to identify the product description. The product description search may search a description database or other digital sources using the product tag to identify an appropriate product description for the reviewed product.

The processor 207 executes the computer-readable instructions to approve said user generated video review if a set of criteria are met. The set of criteria helps ensure that the user generated video review is sufficiently useful to a viewer. Criterion may include suitability of product tags, length, visual quality, audio quality, clarity of speech, usefulness of review, identity of said reviewed product, or identity of said user account. The approval process for the user generated video review may be manual or may be partially or fully automated by a software algorithm. A user generated review that is not approved will not be published on the host website.

The processor 207 executes the computer-readable instructions to store said user generated video review to a database comprising a plurality of user generated video reviews. The user generated video review is stored as a video file in a raw or compressed video and audio data format. The compressed video data may use the H.264, VP8, MPEG-4, MPEG-2, RealVideo, Theora, Dirac, or another suitable video compression format. The compressed audio data may use the mp3, AAC, Ogg, MPC, AC3, RA, or another suitable audio compression format. In some embodiments, the database includes at least one computer storage medium with a network connection to the host website.

The processor 207 executes the computer-readable instructions to publish the user generated video review. In some embodiments, the user generated video review is made available to all viewers of the host website and the user generated video review may be found and viewed by any viewer without a log-in process. In another embodiment, the user generated video review is made available to only a set of viewers and may only be viewed by viewers who have completed a log-in process.

The processor 207 executes the computer-readable instructions to provide an interface for a viewer of the user generated video review to purchase the reviewed product featured in the user generated video review. The user interface may be a hypertext transfer protocol link that enables the viewer to quickly navigate a browser to an external website to purchase the reviewed product. The user interface may enable the viewer to directly purchase the reviewed product from the host website using common tools of online shopping known in art. The user interface may also provide instructions on methods that the viewer may apply to purchase the reviewed product.

In some embodiments, the system includes a web application which publishes said user generated video review on an external website. The web application may be a software program for a video player to be embedded on the external website. It is contemplated that an external website containing a web content will use the web application to embed the video player to play a user generated video review featuring a reviewed product that is related to the web content. A user of the external website may view a user generated video review with the web application on the external website. In some embodiments, the system includes a mobile application which publishes said user generated video review on a mobile device. A user of the mobile device may view a user generated video review with the mobile application on the mobile device.

The processor 207 executes the computer-readable instructions to distribute an incentive to the user account associated with the user generated video review. Incentives may be distributed based on criteria such as but not limited to the number of approved user generated reviews received from the user account, the quality of the registered user's user generated video reviews, the number of views for the user generated video review, the ratings given by viewers of the user generated video review, or the number of people who "like" the user generated video review on a social networking website. Incentives may be distributed based on advertising revenue the host website received in connection with the user generated video review. Incentives may be distributed based on sales revenue received in connection with purchases of the reviewed product featured in the user generated video review. Incentives may be distributed based on licensing fees from third parties for access to the user generated review. In some embodiments, the incentive may include monetary sums and be distributed to the registered user by check, electronic wire transfer, store gift card, or online shopping credit. The incentive may include a visually distinguishable and prestigious design which highlights the registered user's reviewing abilities or the registered user's quality of video reviews. The incentive may include points which may be used for discounts on new products that are affiliated with the host website.

Figure 11:
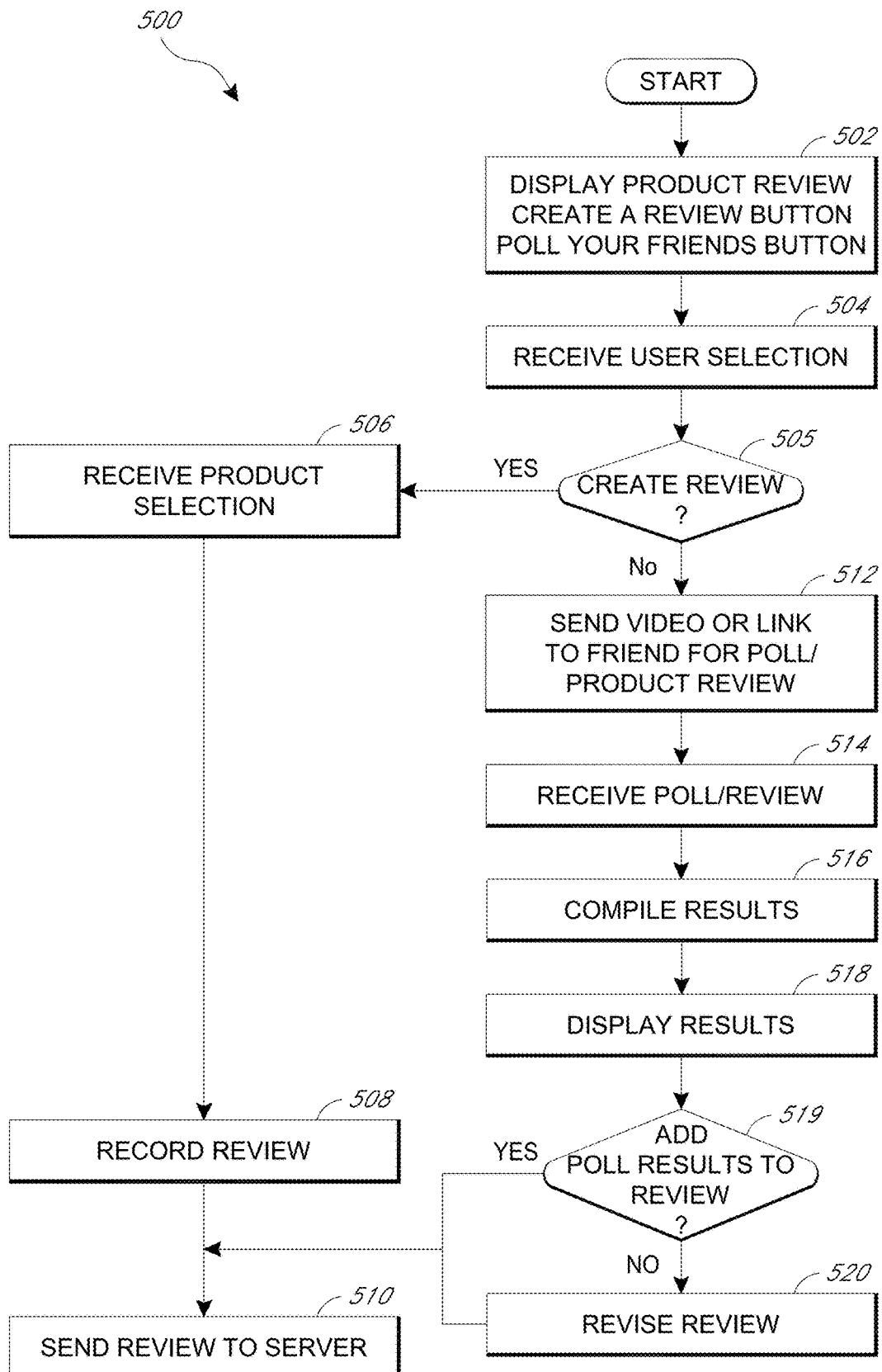
FIG. 11 illustrates an example process.

FIG. 11 displays an example process 500 from the perspective of a client device, such as used by an end user when operating in concert with a review server that manages databases as described above. Process 500 may be triggered when a product is displayed in an advertisement shown to the user on a third party content website that displays one or more advertisements, for example. In such advertisements, by selecting the product or product review selector choice, the user is able to initiate process 500. The client device (e.g., a portable device, such as a mobile phone) may be in communication with a public telecommunication network. At state 502, the client device displays a product review recording to a user and, while displaying the product review recording, optionally also displays a review product control to the user and a control to initiate the polling of others (e.g., the user's social network "friends"). Continuing to state 504, a user selection is received.

At decision state 505, if a user instruction to create a review is received, the process transitions to state 506. If a user polling instruction is received, the process transitions to state 512. In some embodiments, the instruction to create a review is to create a review of an item that has already been reviewed by another, and state 506 enables a user to provide their own opinion. Optionally, in addition or instead, the user may be presented with other products to review. Optionally, it is assumed that the same product is being reviewed in state 506 and gives the user a choice of what else the user desires to add. Optionally, in addition to creating a review, the user is also given the opportunity to purchase the product by a selectable option presented during the playback of the review. As control transitions to state 506, a user selection of a product to review is received. The selection may be made manually or the selection may be made by examining the product tag associated with a product review currently displayed to the user.

At state 508, a product review is recorded by the user. At state 510, the recorded preview is uploaded to a server of managed product reviews. Optionally, the user receives some level of reward or compensation for submitting a review. Returning to state 512, where the user has selected the polling control, optionally a link to a product review is sent to a list of recipients chosen by the user, such as members of a social network to which the user belongs, and/or the product review (or a link thereto) is published on a user's social profile.

Figure 12:
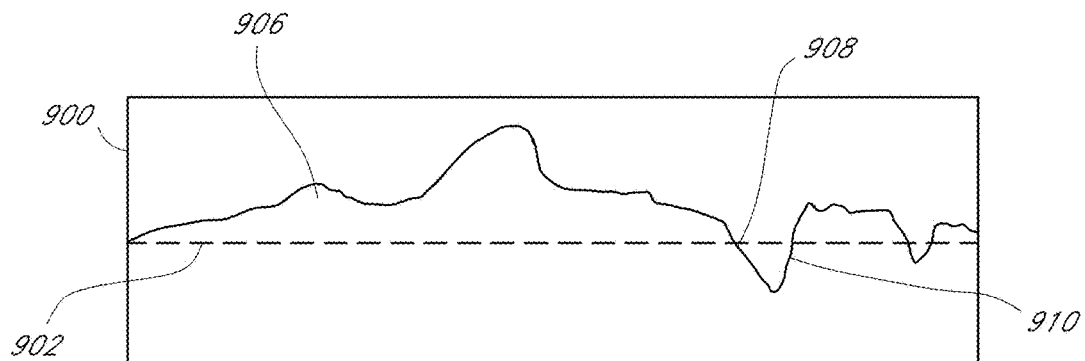
FIG. 12 illustrates an example dimensional graph used to display user feedback that maps user selection between a like state or a dislike state regarding a product review.
Figure 13:
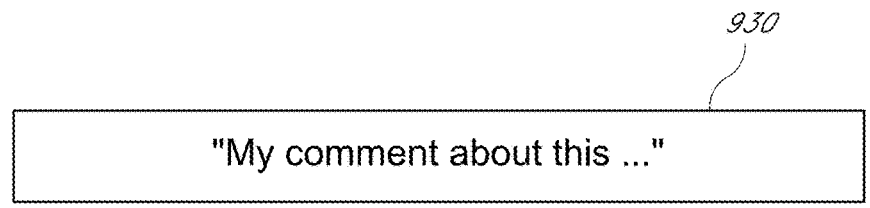
FIG. 13 illustrates an example dialogue box containing a written comment by a reviewer.

Polling of one's social network enables the user to monitor a smaller group of individuals, of whom the user has personal contact, or, a large online community of people including people with whom the user has not had personal contact, but has a communication path to such people. Referring to FIG. 12, there is shown graphically an example like/dislike representation that varies over time. Graph 900 includes a centerline that can be shown different ways, but herein is shown as dashed line 902. Good feeling of a polled individual while watching a review about a product and/or service can be recorded by the user by continually selecting a "like" control or a "dislike" control during the time a polled reviewer watches a review. Playback of the video about the reviewed product and/or service to the polled individual can be made contingent on the user pressing a like or dislike control, so that there is always a fresh opinion registered by a reviewer. Tracking of this opinion level is shown by line 906, which stays above dashed line 902 for most of the review, until there is a dislike spike at 908, followed by an immediate like spike 910, at a point in time during the review. Activating a like control repeatedly keeps a reviewer's like opinion high above dashed line 902; pressing a dislike control repeatedly keeps a reviewer's dislike opinion well below the dashed line 902, and inactivity brings the user's opinion close to dashed line 902; thus reviewers can reach their extreme expression points by rapidly pressing either a like or a dislike control, thus causing a peak or a valley to occur, making it easily seen by someone looking at polling results of individual reviewers to see where noteworthy feedback occurs. Thus, a viewer of the graph may quickly identify trends from the reactions of individuals in their social network. Slider tool 910 (also referred to as a scrubber herein) is provided in an embodiment to enable a user to select a portion of a review based on an upward or downward spike on line 906. Also, at these moments in time, members of a user's social group can add text, such as a text comment, which is displayed to a user during playback of a polled review in area 930, (see, e.g., FIG. 13).

Figure 21:
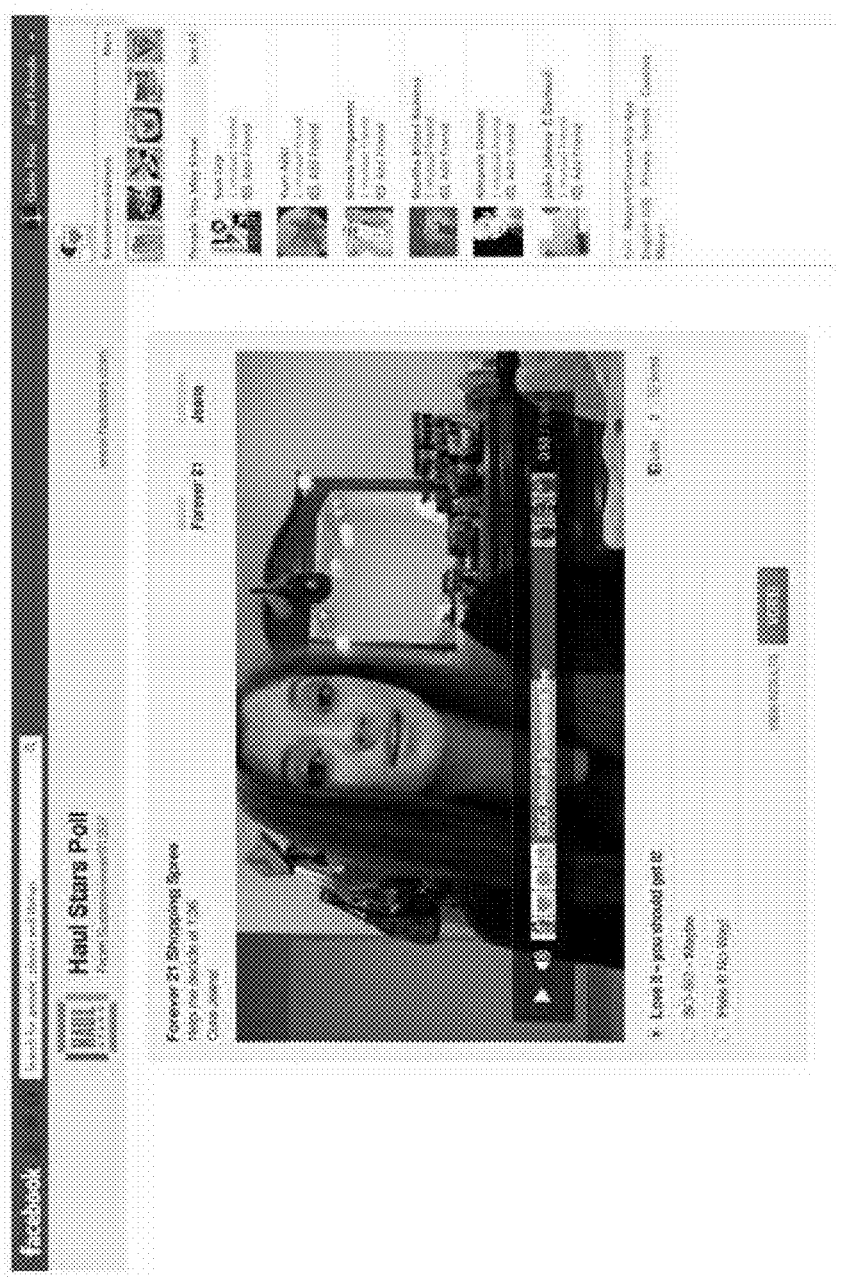
FIG. 21 illustrates an example polling interface.
Figure 26:
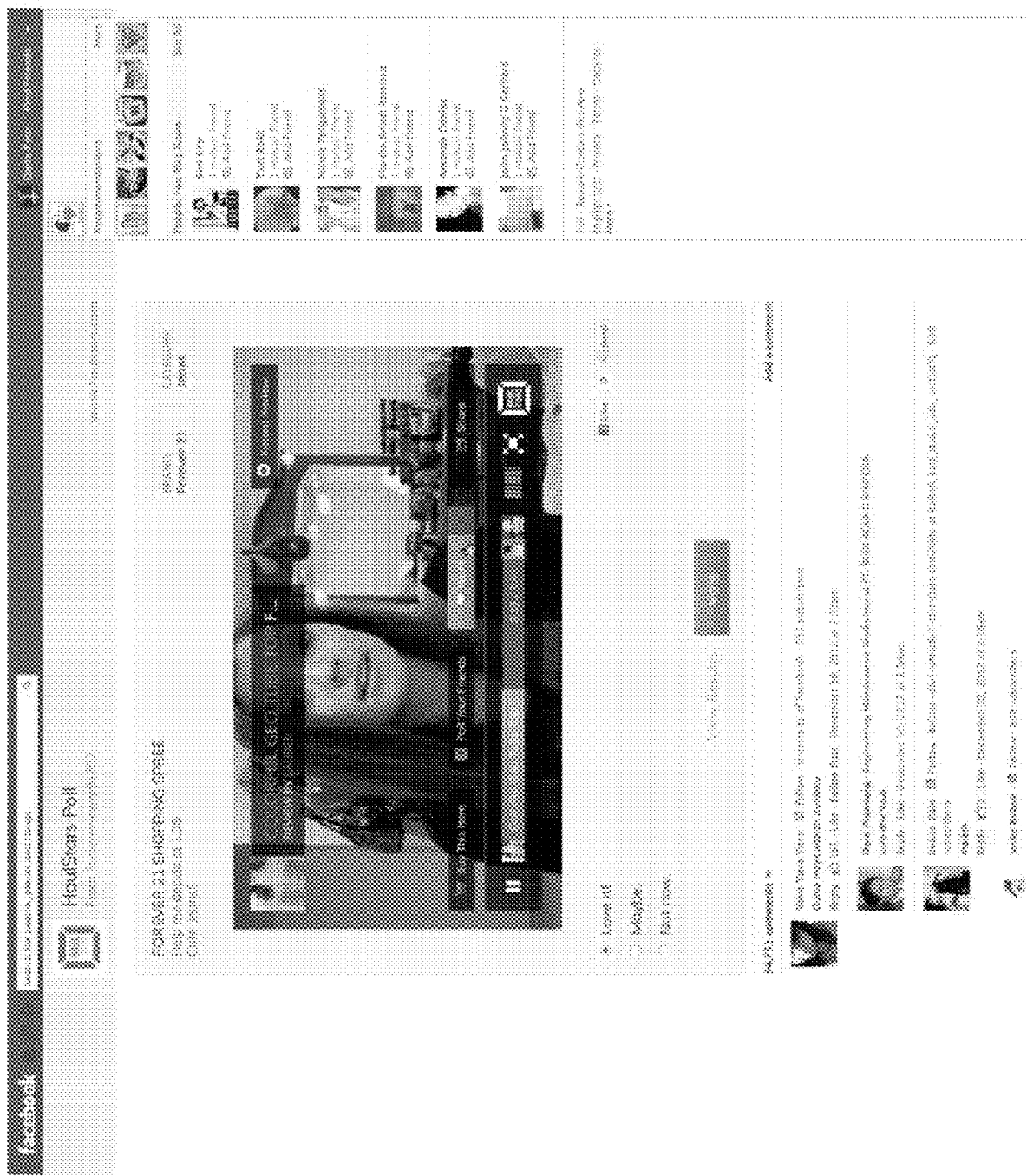
FIGS. 26-27 illustrate example user interfaces.

FIG. 21 illustrates an example polling request user interface, which may be presented to recipient, such as one or more contacts or social network members of a reviewer or a viewer of a review. In this example, the item video review is presented via the user interface in association with metadata, such as the name of the video review, the name of the item review, the item brand name, and/or the item category. The user interface requests that the recipient provide their opinion on the item being reviewed to aid the sender. In the illustrated example embodiment, several predefined poll responses are provided from which the recipient can select. For example, the predefined responses may be approval (e.g., "I love it—you should get it"), indifference/indecisive (e.g., "so-so, maybe"), or disapproval (e.g., "hate it! No way!"), and/or there may be a text field configured to receive a text input from the recipient. The recipient's response may be provided to the poll requester individually and/or in aggregation with poll responses from others (e.g., with a total for how many recipients voted approval, disapproval, and indifference). FIG. 26 illustrates another example polling user interface embedded on a social networking site page of a user/recipient, which includes user comments regarding the item being reviewed and that enables the recipient to add comments in addition to voting with respect to the item.

Figure 14:
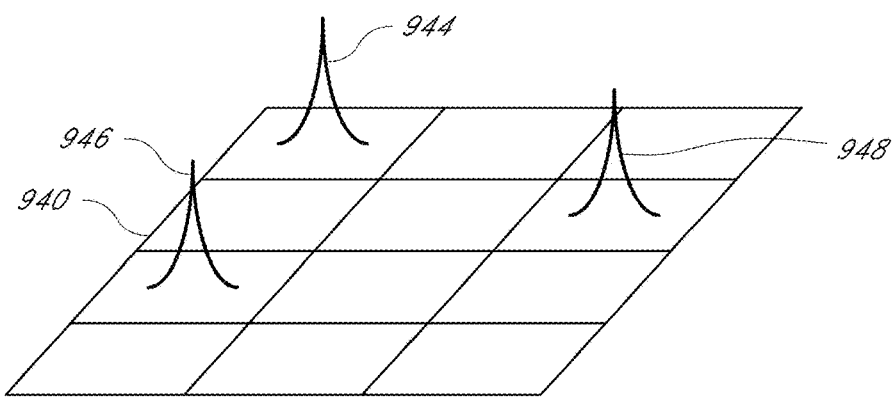
FIG. 14 illustrates an example three dimensional graph used to display user feedback that maps individuals in a three dimensional manner on a landscape plot having cells of color that indicate like/dislike states.

Referring to FIG. 14, in an example embodiment, the feedback gained from a user's social network can be represented in a three dimensional landscape plot that provides organization of a number of individuals from the user's social network. Considering a given cell of the graph 940 as a static location in a representation of friends polled by a user, manipulation of slider tool 910 during playback of a polled review enables a user to move forward or backward through a polled review and see what members of his or her social network are expressing through their selection of like or dislike during the review.

As a like control or dislike control is activated by the user during a review, the reviewer graph 940 can utilize color in the background of individual squares that show like or dislike, for example by illuminating a cell 942 assigned to a social network member as green for like or red for dislike, and also by using dynamic icons for social network members. These icons could appear on graph 940 as three-dimensional images of photographed person or computer-generated animation, or any other representation people would create for themselves. As referred to herein, dynamic icons are representations of individual social network members who have different actions or expressions over time are shown on graph 940 and are dependent on the user's like or dislike state.

For example, a user could populate a like/dislike span of images leading from one extreme to the other extreme. A user can monitor the social network by skimming through a review to see if there is seen activity on graph 940, and view groups of reviewers simultaneously during a product and/or service review that is being shown to them. Activity would be observed as, for example, at cells 944, 946, 948, where images of individual members of a social network may include an icon jumping up and down for a prolonged like state, or kneeling and sobbing, or sleeping for a prolonged dislike state.

Creativity in groups of users such as social networks is a function of the will of the individual members themselves, and adds an entertainment aspect to the observation of one's reviews by others, so different members of a social network may have their own set of pantomimes, by their own creation or by selection from a set of illustrated pantomimes in a database representation. Individual members of a social network may have a set of pantomimes stored for their icon that is used as explained above, to represent individual values along the range of like and dislike. Toolbar 910 and graph 940 as used herein enable a user to visually scan reviews quickly and select them based on like or dislike levels observed visually in his or her social network. If the icons on a user's graph are expressing pantomimes of extreme like (or dislike), or if the background colors of the cells on graph 940 are illuminated to indicate a strong like state, a user can stop, and watch that product or service review based on the expectations received from observing his or her social network as they are polled for like/dislike values.

While the review poll has been described in terms of a user's social network, in another embodiment, the system in addition or instead enables the user to select a fantasy social network, wherein the user selects reviewers who have been polled in many reviews, and places them manually on graph 940. This enables a user to build a unique set of reviews that can be scanned quickly by moving the space bar 910 across reviews that would intersect on a database of recorded reviews, providing the user a new ability of scanning combinations of reviewers that the user assembles by his or her selection of reviewers from a database of reviewers. A selection bar 960 may be included to enable a list of reviewers to be displayed from left to right, or they can be directly placed on graph 940.

Thus, various combinations of features described herein enable product reviews to be utilized not only for consumers of products and services, but optionally also for merchandisers looking to assemble merchandise lines for online stores as well as traditional vending methods. By assembling groups of reviewers that show particular insight to specific products and markets, vendors can more accurately select merchandise based on product reviews uploaded to a product review server. For example, a merchandiser having good connectivity with a particular market demographic, can assemble panel of product reviewers matching that demographic, and watch product reviews by members of the demographic.

Certain embodiments optionally provide in-edit distribution and/or in-ad distribution of user generated video reviews. For example, a review of a consumable item such as at least one of a product or a service in the form of audio and video information may be provided for display to a viewer. These reviews may be displayed on a web page (or other document accessed over or via a network) in-line (e.g., in-edit) with the content of the webpage (or other document) itself or accessed through a link on the web page to the content itself. For example, in an editorial article that mentions or refers to a particular product, the video review or a link to the video review may be placed in line with (e.g., embedded within) the content of the article. This presents readers with the option to easily access consumer generated product or service reviews directly from mentions of the product or service itself on the webpage. In other instances, the review is accessible from an advertisement such as a banner ad on the webpage or other document. The review may be embedded into the advertisement (in-ad) or a link to the review can be provided within the advertisement via a control or other such functionality that when selected is able to playback a user review relevant to the advertisement. Some or all of the foregoing functionality (e.g., the ability to record or upload video reviews, poll friends, index item reviews within the video review, provide tags, etc.), may be provided via a video player or otherwise when embedded in an advertisement, editorial content, or elsewhere, as discussed in greater detail elsewhere herein (e.g., see FIG. 25 and the corresponding discussion).

When the reader of a web page selects the review or a link to the review, a video playback window is provided for displaying the video. The video playback window provides a scrubber, such as a user-controllable playback slider bar, proximate to the displayed consumable item review. The playback slider bar indicates the progress of video playback during a time period in which the review is displayed.

The user-controllable playback slider bar comprises an option for accepting a user indication of a point on the slider bar, and advancing the video playback to a portion of the video corresponding to the user indication. Within the playback slider, at least one product image is displayed at a location within the slider that corresponds to a period of time during the review in which the consumable item associated with the image is reviewed. The user may indicate where an item review within the product review is located by placing a corresponding tag. Similarly, the user may indicate where an item photograph is to be presented within the scrubber area using a respective tag (where such photograph or graphic may be referred to herein as a navigation image). Thus, by viewing product images in the scrubber area, a user viewing the video review can identify what portion of the video is relevant to the product they are interested in and skip forward to that portion of the video.

The slider may contain more than one product images. For example, in one or more embodiments a second image is contained within (or adjacent to) the playback slider when the content of the video transitions from a first consumable item to a second consumable item. Images within (or adjacent to) the slider may also correlate to different aspects of a same product. If the review is an unboxing review, for example, a first image might be of the outside of the box, a second image could show the box opened, a third image could show the product itself out of the box, a fourth image could show accessories associated with the product and a fifth image might show the reviewer using the product. Images within (or adjacent to) the slider are correlated to a time code or frame within the video and content of the video review near that time code or frame. Optionally, images displayed in the slider area may be of different people providing respective reviews of the same item or of different items.

Within (or adjacent to) the video playback window, controls are provided via which users are able to select an option to create their own reviews relevant to the product review they are watching or relevant to a related product or an unrelated product. Thus, a mechanism may be provided for displaying selectable options to a viewer related to the consumable item. The user may be provided the option to create a review of the consumable item or a related consumable item. The selectable option includes recording a review of the consumable item or a related item. Upon selection by a user, a review of the consumable item is generated. The review of the consumable item is optionally associated with the image in the video playback slider. The user review of the consumable item may also be unrelated to the consumable item currently being played back by the user.

Various selectable options may be provided to the user. The selectable options may also include displaying a polling option, the selection of which comprises polling individuals in the user's social network to determine opinions of the individuals with respect to the consumable item. Another selectable option includes a purchase option, the selection of which executes a purchase transaction of the consumable item by the user. Optionally, selection of the purchase option directs the user to an affiliate partner for purchase from a third party with a commission paid for a referral. The selectable options may also include a show image option, the selection of which executes display of additional images of the consumable item. Thus users can view alternative images of the consumable item reviewed in the video review. The selectable option may also include a comment option, the selection of which records a comment made by a user. When comments are entered, the system may provide for display the quantity of comments about the video review have been recorded. The selectable options may also include a like/dislike control, the selection of which records a user selection of one of a like selection and a dislike selection. In addition the selectable options may also include a want option, the selection of which records a user selection indicating that the user wants displayed consumable item (e.g., in the user's profile, which may be displayed to others as a user wish list).

The selectable options within the video review may also include a share option, the selection of which sends a message to an individual selected by a user. The share message may contain a link to the video review, an embedded copy of the review, or a copy of the review itself. In one or more embodiments, selection of the share option publishes a link to the consumable item on the viewing user's social profile on a social network. The interfaces for playback of the video review may also contain a "want" option, when the user selects the "want" option the user's desire for the item is stored in a want list and optionally shared to the user's social network or web in accordance with the user's privacy settings. The interface may also contain am "I own this" option which indicates the user owns a product in the video review. On selection of the "I own this" option, that information is stored and may be shared via a social network or through the Internet.

The interface displaying the video review may contain a number indicating how many users have indicated that they want the consumable item. Thus, the popularity of a consumable item may be determined through the display of the video review or via an associated graphic or indication. The display of the review may also display a number indicating how many users have viewed the review. The video reviews may be presented for playback in various contexts. For example, optionally video reviews are embedded within a downloadable, executable software program such an "app" for a mobile device or computer. In other cases, video reviews are associated with content on a web page.

For example, when a web page (or other network accessible document) has written content related to a product that has been reviewed, a link to the video review or the video review itself may be embedded into the web page with the written content. On selection, the video review is presented to the reader for playback along with the selectable options discussed herein. The video review or a link to the video review may also be part of or associated with an advertisement for the consumable product or service being advertised. Thus, the video review may also become an advertisement on a web page. The video reviews may be displayed, for example, on a television, laptop, phone, table, or other display device. Because certain embodiments provide various ways for viewers to interact with, create, and share video reviews analytics about these actions are obtained and stored. Information such as, how many times a particular video review is watched, how many people like the video review, who likes the video review, who indicates they "want" the product reviewed, ratings about the product, what demographics view and interact with the video review most, and who creates new reviews after evaluating an existing product review. Analytics such as, what products are purchased on a web site or affiliate web site after a user views the review and details about the purchase may also be obtained and stored.

A consumable item review method will now be described. The method may include providing a video review of a consumable item, such as a product or service, for display to a user. The video review is presented in various contexts (e.g., by selecting a link on a web page, a link in an advertisement, or in a mobile app). One or more selectable options are associated with display of the video review. These selectable options enable the viewer to take the actions specified in other parts of this specification. One example, of a selectable option is a control that when selected enables the user to create their own review of the product, an associated product or any other product. Users may also indicate whether they want, own, like or viewed the video review. If the user selects the option to review a consumable item such as a product or service, the user identifies the consumable item to be reviewed and records a video review of the identified item. The video review is then sent to server configured to store the consumable item reviews via a network connection.

As noted above, optionally incentives are awarded to the user for recording and submitting a review. The video review conducted by the user may in some cases be done subsequent to the user polling others in a social network to which the user belongs and in such cases the video review may be displayed to members of a social media associated with the user for feedback or further interaction. Members of the user's social network may, for example, create their own product reviews or provide comments about the review. Feedback from other users or video reviews about the consumable item may also be displayed. Users who view the video review may give it a rating and the system may collect and store rating information derived from individual ratings collected from multiple viewers of the recorded consumable item review.

As discussed above, a video review (e.g., a single video file) may optionally include reviews of multiple products. The product reviews may be sequentially included in the video review file. For example, if a user goes on a shopping trip, the user may then review each item purchased (or a subset thereof) in a single video (rather than multiple video files, where each file includes a single review). A given product review within the video review file may be time stamped, indicating at what point in time in the video review file the review of the given product begins/occurs. The time stamp, which may be in the form of a "start" tag automatically generated by the user indicating where the start of the product review is, may be recorded in metadata associated with the video review. Other techniques may be used to identify the location/position of a given product review within a video review. For example, a frame number may be identified as that point at which the product review for the given product begins. The frame number may be recorded in metadata associated with the video review. Optionally, a user interface is provided via which the user can indicate which frame within the item review is to be used to represent the item review in future search results or the like.

As noted above, an image from a given product review may be displayed in a scrubber area (e.g., a scrubber bar that a user can utilize (e.g., by dragging a scrubber control in the scrubber timeline) to indicate where the user wants the video playback to begin or to browse frames in the video). Thus, for example, the scrubber area may display images of products being reviewed in the scrubber area, where a given product image is displayed in the scrubber timeline at a location corresponding to where the review of the respective product begins. The product image may be a frame from the review of the product, such as, by way of example, the first frame from the review of the product.

A product tag associated with the reviewed product may be received from the user posting the video review or a user viewing the video review. As similarly discussed above, the product tag may be descriptive of the reviewed product (e.g., the tag may be a product name, a brand name associated with the product, a functional name, etc.). A product description is associated with the reviewed product based at least in part on the product tag.

When a video review is posted, optionally viewers of the review may be enabled, via a user interface provided by the posting system, to provide comments regarding a given product review within the video review. For example, the comments may be regarding the product being reviewed, the review itself and/or regarding comments from other viewers. The comments may be specifically linked to the corresponding product review within the video review so that when a viewer is viewing the video review file and the comments, the set of comments provided for display by the posting system will dynamically change depending on the product review in the video review file is currently being displayed (see., e.g., FIG. 17).

For example, if the video review includes three product reviews, when a viewer is viewing the video review, first the product review video for the first product will be displayed. Optionally, at substantially the same time, comments previously provided by other users for that first product review video will be displayed in a comments area, while comments for the product reviews for the second and third product will not be displayed. Then, when the product review video for the second product review is displayed in the comments area, corresponding comments previously provided by other users for that second product review video will be displayed, while comments for the product reviews for the first and third products will not be displayed. Then, when the product review video for the third product review is displayed in the comments area, corresponding comments previously provided by other users for that third product review video will be displayed, while comments for the product reviews for the first and second products will not be displayed. If a user (or the system) selects a particular product review to be displayed first (even if earlier product reviews are skipped over), the system may cause the corresponding comments to be displayed.

Figure 10:
FIG. 10 illustrates an example user interface application for publishing a user generated video review.

An example review playback interface will now be described. With reference to FIG. 10, in an example embodiment, while a still of the video review is being displayed and/or while the video review 1020 is being played for a viewer, various items of information 1018 may overlay the video review (or may be provide adjacent to the video review 1020) in one or more information areas. For example, information such as the name and/or brand of the item being reviewed, a relatively small still image of the item being reviewed, and/or the name of the reviewer may be provided for display. User accessible controls 1004, 1006, 1008, 1002 may be provided via which a viewer of the video review can purchase the item being reviewed, poll their friends regarding the item being reviewed (as similarly described elsewhere herein), record their own review (of the item in the viewed review or of a different item), indicate that the viewer wants the item being reviewed, and share the review (e.g., via instant message, email, posting on a social network page, or otherwise).

If the viewer activates the want control 1008, an indication that the viewer wants the item may be published at one or more networked locations, such as the viewer's social network page, other viewer profile, a blog, via email or instant messaging to one or more contacts of the viewer, or otherwise. Friends and family of the viewer (and optionally other users) can then see what the viewer wants, and can purchase the item for the viewer as a gift. Optionally, the number of likes received for the item and/or item review, and poll results may be displayed as well via the user interface.

Optionally, if the viewer indicates (e.g., by activating the appropriate record review or upload review control) that the viewer wants to record (or has recorded) a review for the same item as in the review item, at least some of the viewer's review tags (e.g., excluding the name of the reviewer, the merchant at which the item was purchased, etc.) are automatically prepopulated with the tags from the item review just viewed. For example, a brand name tag and a product name tag may be prepopulated with corresponding tags from the just viewed review. Optionally, the viewer can modify, delete, or add to the tags.

Controls may be provided via which the user can pause, fast forward, rewind, and play the video review, skip to the next item being reviewed in the video review, select a specific item review in the video review to view, etc. In addition, a time and/or frame indication may be provided (e.g., in the scrubber area 1002) indicating the current point in the video being viewed (e.g., 4 minutes, frame 2100) and/or the location of the beginning of each item review in the video review. The total length of the video review and/or of the item review, and/or time remaining may also be displayed.

As similarly discussed above, an image and one or more associated tags (e.g., a review name and/or the name of the item being reviewed) 1003 from the current item review being viewed, and one or more images and/or tags 1016 of other item reviews, may be displayed in the scrubber area 1002. In certain embodiments, a viewer may click on or otherwise select a given product image (sometimes referred to herein as a navigation image) and/or tag in the scrubber area 104, and the video player will jump to the corresponding item review.

Other controls may be provided as well. For example, a control may be provided via which a viewer of an item review can indicate that they own the item being reviewed or that they do not own the item being reviewed. Optionally, if the viewer indicates that the viewer owns the item being reviewed, the viewer is prompted to provide a video review.

By way of further example and as described elsewhere herein, a control may be provided that enables a viewer to share an item review or other segment included in a video file. Thus, for example, a view can share the third review in a video file. Optionally, a video sharing control may be persistently displayed. Optionally, a video sharing control may be provided in response to the user hovering over a navigation image with a pointer (e.g., a cursor, finger, or otherwise), right-clicking a navigation image, or otherwise.

As described elsewhere herein, an example video sharing control may comprise a sharing menu that enables a user to select a communication channel, video segments to be shared, and to specify video segment recipients. For example, the sharing menu may include one or more of a text message sharing control, an email sharing control, social networking sharing control, and/or sharing controls for other communication channels. Thus, a viewer can share a given video segment (which may not begin at the beginning of the video file) via the viewer's social network profile page, via a microblog, via email, and/or via a messaging platform. As discussed elsewhere herein, in response to a viewer providing a video segment share instruction, a resource locator, such as a URL, may be generated that includes a pointer (e.g., a time code, a product code, etc.) to the video segment. The resource locator may be transmitted to the designated recipients, and may be accessed by media players on the designated recipients' terminals. A given media player may then utilize the resource locator to request the video segment, and the video may be streamed from the hosting server to the requesting media player, beginning at the specified time code corresponding to the video segment. The media player may display the video segment.

Optionally, the system may also identify other video reviews and/or particular item reviews a viewer may be interested in and provide a list of such recommended item reviews to the viewer. The list of recommended item reviews may include, for a given entry, a frame from the recommended item review, a playback control, a number of views, a number of indications of approval from viewers, and/or a number of comments from viewers.

For example, the system may identify other item reviews with one or more tags that are substantially the same as or generally correspond to one or more tags of the item review being viewed by the user. For example, the system may identify one or more item reviews that include the same brand name or the same product name (e.g., as determined from tag information) as the item review currently being viewed. By way of similar example, the system may identify other items reviewers by the author of the item review currently being viewed. The viewer can then select a given recommended item review (e.g., by clicking on a corresponding playback control or otherwise), and the selected item review is played back to the viewer (see, e.g., FIG. 17, 1706).

Figure 17:
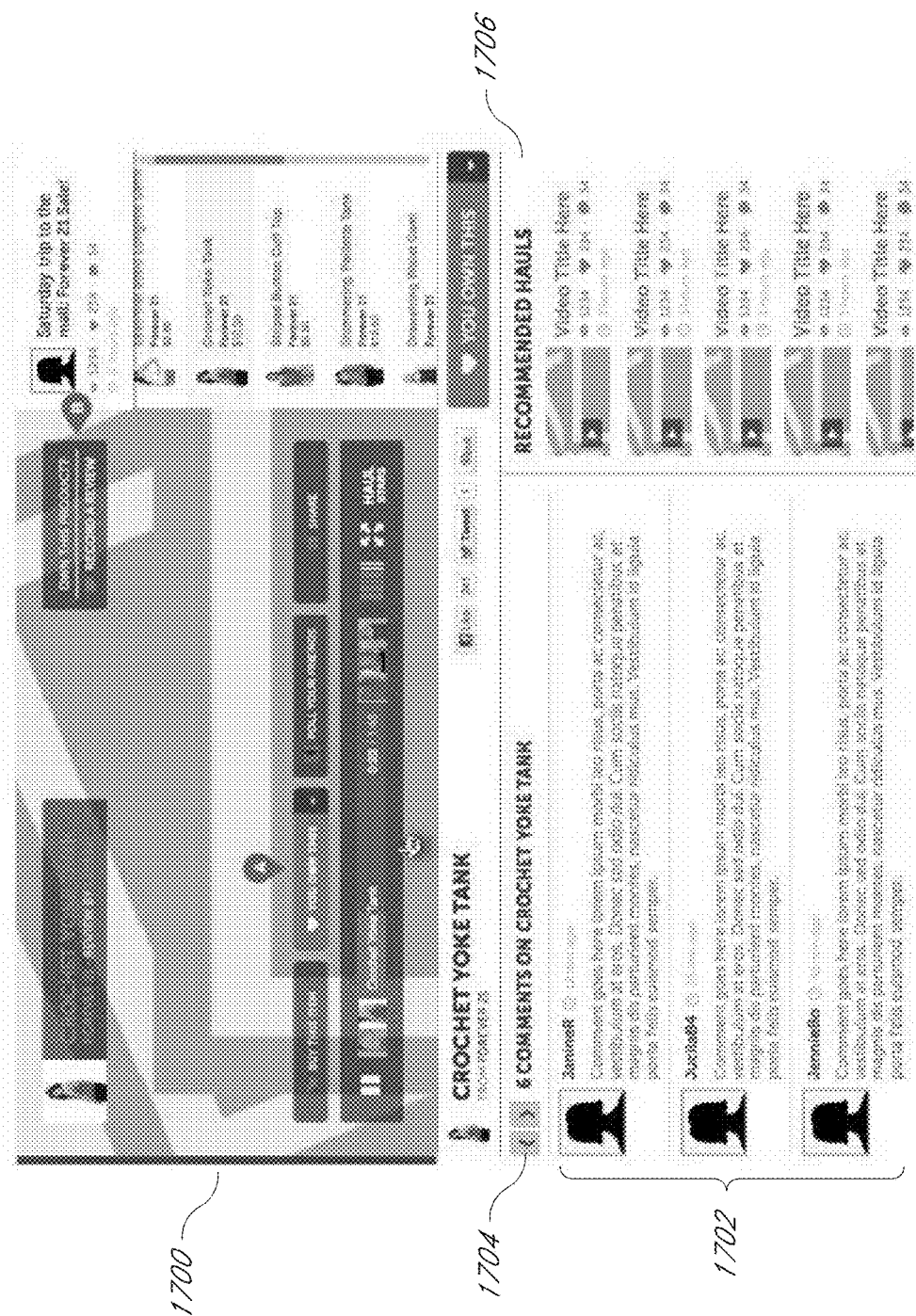
FIGS. 17, 18A-J, 19A-B illustrate example user interfaces.

With reference to FIG. 17, a comments area 1702 is presented beneath video review 1700, including a plurality of item reviews. The comments presented in comments area 1702 correspond to the item review being presented. As the video review playback proceeds and a next item review is presented, the comments presented in the comments area 1702 are cycled to present the comments corresponding to the next item review. A control 1704 is provided, which, when activated by the viewer, causes the comments to be cycled to display the comments for the next item review (if the viewer selects the forward control), or the comments for the previous item review (if the review selects the backward control). Optionally, the item review presented to the viewer will automatically cycle synchronous with the comments in the comments area 1702. As similarly discussed above, a recommend review area 1706 may list recommended reviews to the viewer.

Figure 22:
FIGS. 22, 23A, 23B, 23C illustrate additional example user interfaces.

After a given video or item review (or between two video or items reviews), an interstitial ad (see, e.g., FIG. 22) may be presented to upsell or cross sell other products/service that have associated viewable video reviews (e.g., user generated video reviews). The interstitial ad may be selected by the system based at least in part on the brand and/or product included in the most recently item review viewed by the user, in other item reviews viewed by the user, and/or other indications of interest from the user (e.g., as similarly discussed elsewhere herein).

As noted above, a search engine may be provided (e.g., hosted on the system on which the video reviews are posted are on another system) wherein a user may submit a search query (e.g., including one or more search terms (e.g., jeans, boot cut jeans, blue jeans), which may be textual and/or graphical in nature) for a product review. For example, the search query may be submitted via a search field presented via a web page, a phone application, a browser plug-in, or otherwise. The search engine may identify video reviews to the user that include a product review relevant to the search query. For example, the search engine may identify video reviews (each of which or some of which may include reviews of multiple products) that include a product review relevant to the search query by comparing some or all terms in the search query against tags (or other descriptive matter) associated with video reviews. The videos included in the search results may be played back via a video playback device.

Optionally, some or all of the search results may include a timeline in a scrubber area or a representation of a scrubber area (which may be non-functional), or independent of a scrubber area. The search results may present and emphasize a frame (e.g., in the timeline) from identified reviews that correspond to the product. Thus, optionally, a timeline indicates at which point in an identified video review the product review corresponding to the search results substantially begins. The user can click on the emphasized frame and/or other portions of an identified video review, and the video review may begin playing at substantially the beginning of the product review, automatically skipping prior product reviews (if any) in the video review. Thus, the user does not have to sit through and view reviews of other products in an identified video review that user is not interested in, while waiting for the desired product review to begin. Further, optionally the user does not have to actually select the emphasized frame, and can instead, click on any point of the corresponding search result item to cause the item review to begin playing and/or click on or otherwise select a playback control. Optionally, the video playback device will automatically (or in response to a user instruction) cause the item review to be played back in full screen mode, or in a relatively expanded mode.

Figure 15:
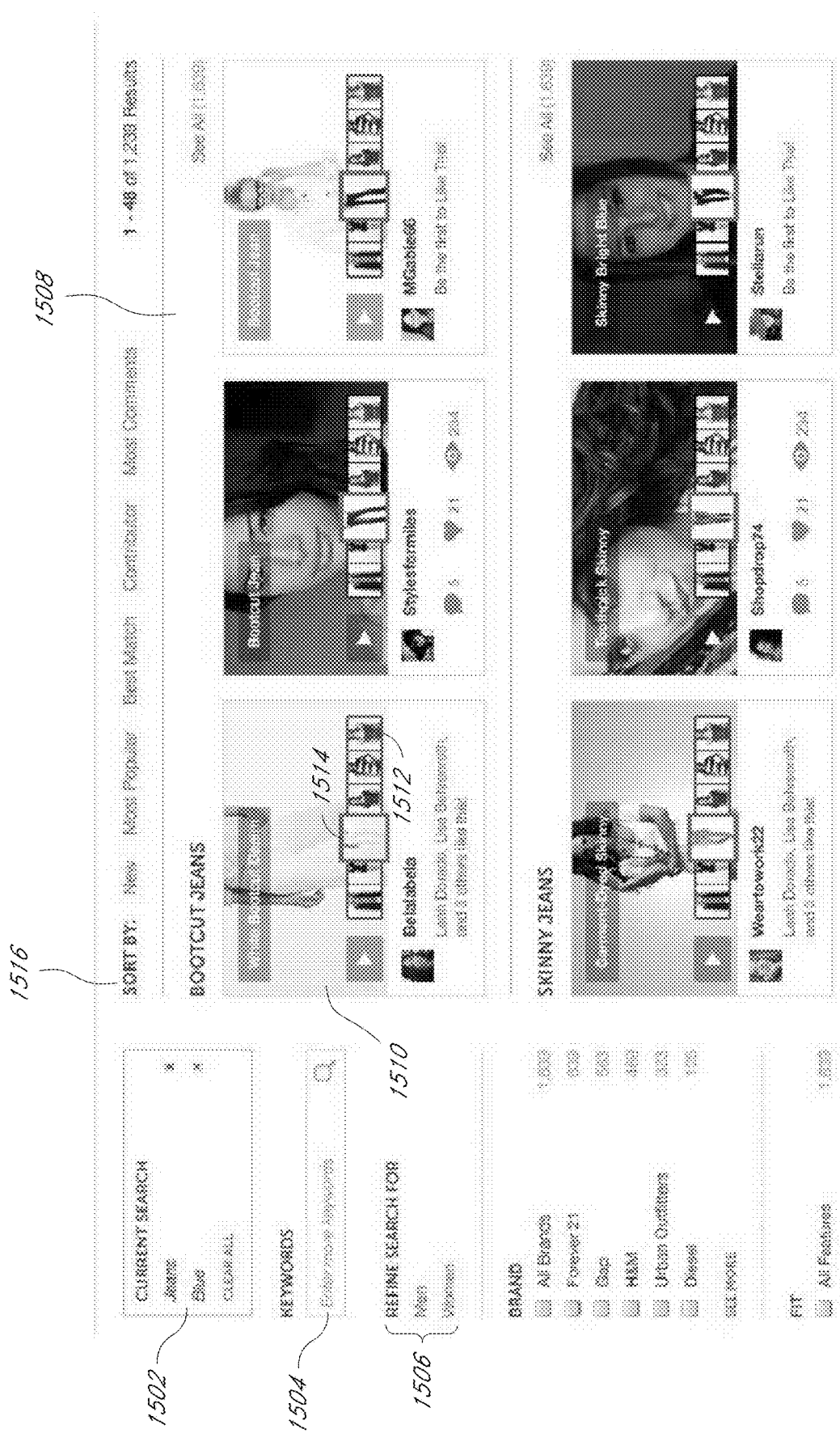
FIG. 15 illustrates an example search results user interface.

FIG. 15 illustrates an example user interface presenting search results. A "current search" area presents the user search terms corresponding to the search results. The user can broaden the search by deleting a search term (e.g., by activating a delete "x" control). A keywords field is provided via which the user can add search terms to further focus the search. In this example, predefined user selectable categories/search terms are provided (e.g., "men", "women"; brand; fit, etc.) in a refine search area 1506 to further refine the search. The search engine will then refresh the search results based at least in part on the user deletions of search terms and/or user selected categories/search terms. Optionally, the total number of search results and/or the number of item review search results associated with a given search results category is provided for display in association with the category. A results area 1508 displays the video/item review search results.

A given video review in the results area may be represented by a frame from the video review 1510 (e.g., above the scrubber area), a title (optionally provided by the user that recorded and uploaded the review), one or more tags, the name (or other identifier) of the reviewer, the names (or other identifiers) of other users that liked the review, etc., may be displayed in association (e.g., overlaying, above, and/or beneath) a given search result item. The frame representing the video review may be a frame (e.g., a substantially initial frame) of the item review within the video review corresponding to the search results. In addition, a timeline 1510 of frames may be included, where a representative frame (e.g., a substantially initial frame of an item review) for a given item review is included in the timeline in a time ordered manner. A frame 1514 from the item review corresponding to the user's search query may be emphasized. For example, the frame from the item review corresponding to the user's search query may be substantially centered in the timeline, presented as larger than other frames in the timeline, presented with a border that is different than that of other item review frames (e.g., bolder, of a different color, etc.) presented in the timeline, presented with no other frames in the scrubber area, and/or otherwise emphasized.

Referring again to FIG. 15, the search results may include subcategories corresponding to the search query. For example, if the search query is "blue jeans", the categories may be "boot cut jeans", "skinny jeans", "easy fit jeans", etc. A given item review presented in the search results may include one or more controls via which a viewer can add a comment, indicate that they like the item, play the item video review. A count may be provided indicating how many views the review has received. Optionally, a viewer's comments and/or indication that they like the item or the review, and/or that they viewed the review may appear on one or more documents associated with the viewer (e.g., a social networking site page/user interface associated with the viewer, a blog, etc.). Optionally, the viewer's comments, indicating that they like the item and/or review, and/or indication that the viewer viewed the review, may appear on such documents (e.g., social networking pate of the viewer), optionally in conjunction with a link to the video item review and/or including the video item review.

Sort controls 1516 may be provided via which the viewer can instruct to the system to sort the search results presented to the viewer using different criteria (e.g., sort in order of recentness, popularity, relevancy/closest match, contributor name/identifier, number comments, etc.), where optionally a user interface is provided via which the viewer can select the sort criteria. The search results are then sorted and presented to the viewer accordingly.

Figure 20:
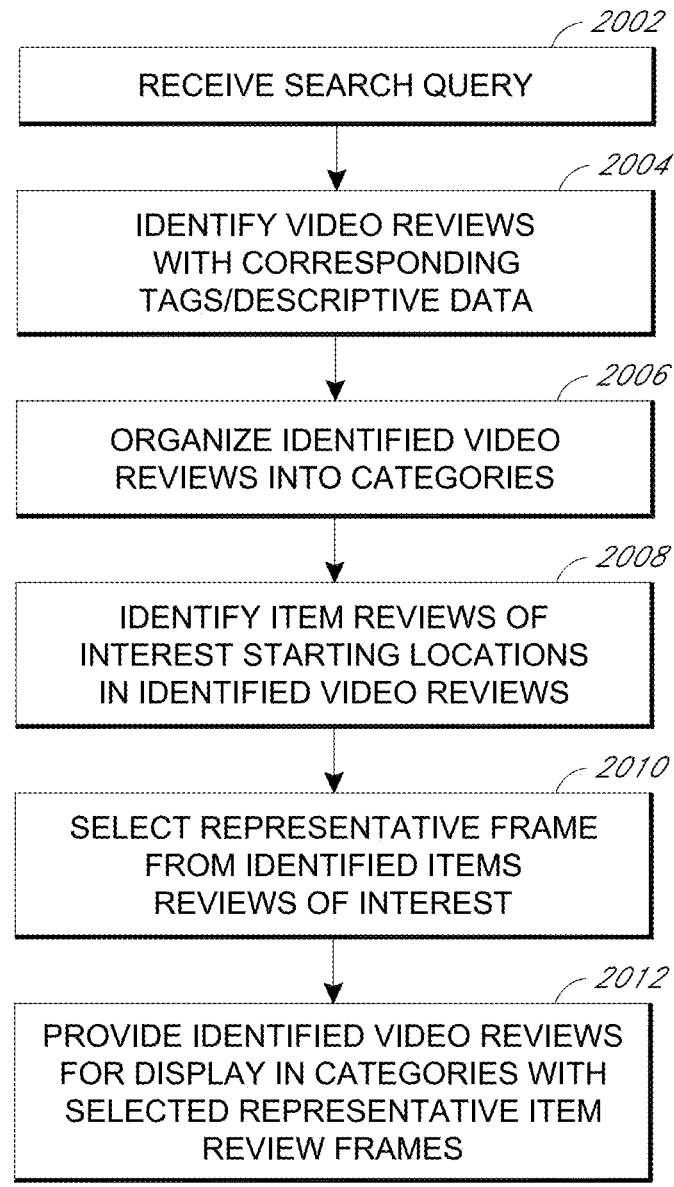
FIG. 20 illustrates an example review search process.

FIG. 20 illustrates an example search process. At state 2002, a search system, which may be included in a review posting system or which may interface to the system providing/hosting the video reviews, receives a user search query. At state 2004, video reviews with corresponding tags/descriptive data or other similarity data are identified. The tags and/or other descriptive data may be associated with a relevant item review included in the video review. At state 2006, the identified video reviews are organized into categories relevant to the search query using tags associated with the item reviews. For example, if the search query is "jeans", the video reviews may be organized into groups of reviews for different types of jeans (e.g., categories for "boot cut jeans", "easy fit jeans", "skinny jeans", etc.).

At state 2008, the start locations for the relevant item reviews within the video reviews are identified. For example, a "start" tag or other metadata may have been associated with the beginning of each item review, and a descriptive tag may be associated with each item review. The process may identify the start of a relevant item review based at least in part on start tag and/or the descriptive tag.

At state 2010, a frame (e.g., a substantially initial frame) for a given relevant item review is selected as a representative frame for the item review. The frame may be selected based at least in part on a prior selection of the frame by the author of the review or may be automatically selected. At state 2012, the identified video reviews are provided for display on the user terminal, organized in categories, with selected representative item review frames displayed in the scrubber area (e.g., on the scrubber or adjacent to the scrubber). The entire scrubber area, or a subset thereof, including the representative frame, may be a hot spot, wherein if the user clicks anywhere in the hotspot, the corresponding item review is played back. Thus, optionally, the searching user does not have to manually manipulate the scrubber control to the desired item review start location.

An application (also referred to as an "app") may be provided for installation on a mobile device of a user (although optionally the application may be installed on a remote system, wherein a user can access the application via the user's mobile device). By way of example, the mobile device may include a camera (which may be used to record video reviews), a microphone (which may be used to record audio for the video reviews) display, and input interface, such as a mobile phone, a mobile computer, or other mobile device. The app may include some or all of the functionality described herein, such as recording one or more products reviews, assigning tags, names, and other descriptive materials to a given product review, time and/or frame stamping a product review within a video including a plurality of reviews, uploading the review to a review posting site, uploading the review to a social networking site, sending the review (e.g., via MMS or email) to one or more recipients, initiating a poll, indicating that the user wants an item in a review, etc.

As similarly discussed above, optionally, using the app, the viewer may photograph an optical code (e.g., a 1 dimensional or 2 dimensional barcode, such as a QR code) or the app, via the mobile device, may read a code from a radio frequency (RF) tag (e.g., an RFID tag) attached to or corresponding to the product being reviewed. The code (whether optical or RF) may include information regarding the product being reviewed and/or regarding the merchant selling the product and/or where the review is being recorded. For example, the code may include a brand name of the product, a model number of the product, a color of the product, a price of the product, a name of the merchant, etc. Some or all of this information may be used to automatically populate tags for the product review.

Optionally, based on some or all of the code information, the system may identify other reviews for the product, other merchants/vendors selling the product, the price for the product from other merchants, and/or other information (e.g., by matching the code information with corresponding information stored for other reviews or merchant inventory databases). Some or all of such identified information may then be presented to the user via the app or otherwise. Optionally, the user may use the app to scan the code (which may be transmitted to the posting system) even without providing a review, and some or all of the foregoing identified information may be presented to the user.

Optionally, a user may be provided an incentive (e.g., a fee, discount, points that may be applied to an item purchase, other incentives discussed herein, etc.) for tagging and/or scanning the items they review and/or for providing/uploading the video product review. Different incentives may be provided for different items of information/reviews provided by the user. Optionally, the review hosting site is paid a fee (e.g., an affiliate fee) if the user and/or a viewer of the user's product review, purchases the scanned and/or reviewed product.

Optionally, the posting system and/or other system may provide location based push notifications based at least in part on one or more inputs (e.g., an indication of user interest, merchant location information, merchant inventory information, etc.). For example, a notification may inform the user that a product they have indicated as having an interest in (e.g., by recording a review for the product, by viewing a product for the product, by uploading barcode data, by activating a like control for a review for the product provided by a third party, etc.) is available at a named merchant within a specified geographic distance of the user's current location (e.g., as determined by location information, such as GPS location information, obtained from the user's mobile device).

Optionally, the app may enable the user to purchase the product online via the app (e.g., by activating a buy control), without having to visit a physical, bricks and mortar merchant, although optionally, the merchant may be notified of the purchase and the user may be able to pick up the product at the merchant. Optionally, the operator of the posting system and/or the third party reviewer may be paid a fee and/or be provided with another benefit, if the user purchases the product via the app and/or the physical, bricks and mortar merchant.

As noted above, a control may be provided in association with an item review, another item in the video review, in a video review being viewed by a user enabling the user to record a review for the same item, for another item in the video review, or for another item not included in the video review. For example a user interface (e.g., of a native video player) may be provided via which the user can indicate that they want to submit (e.g., record or upload) a review of the item which is the subject of the currently viewed review (e.g., a "crochet yoke tank"), another item in the video review (e.g., "another item in this haul"), or for one or more other items not included in the video review (e.g., "create a new haul").

Figure 18A:
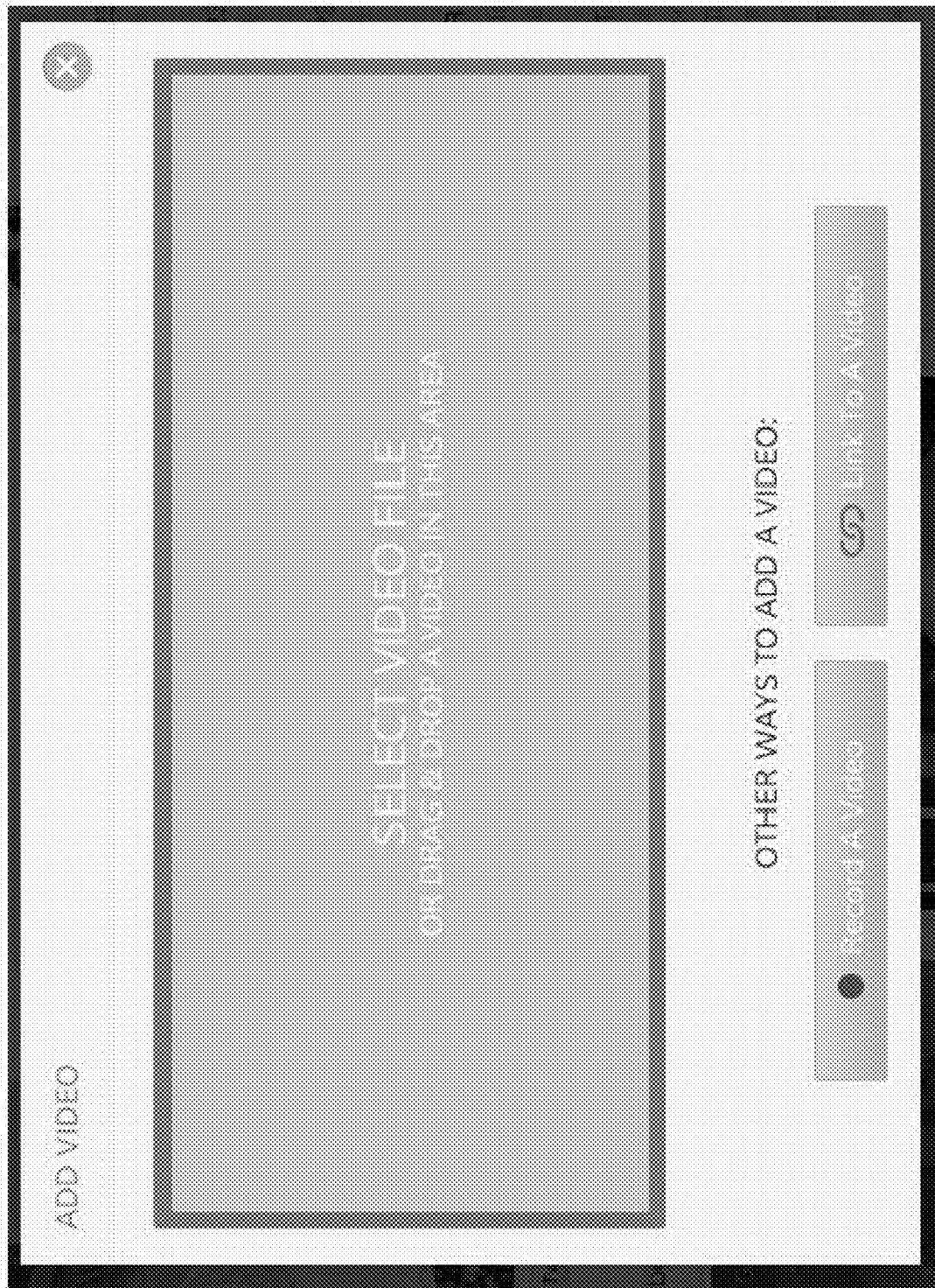
Figure 18B:
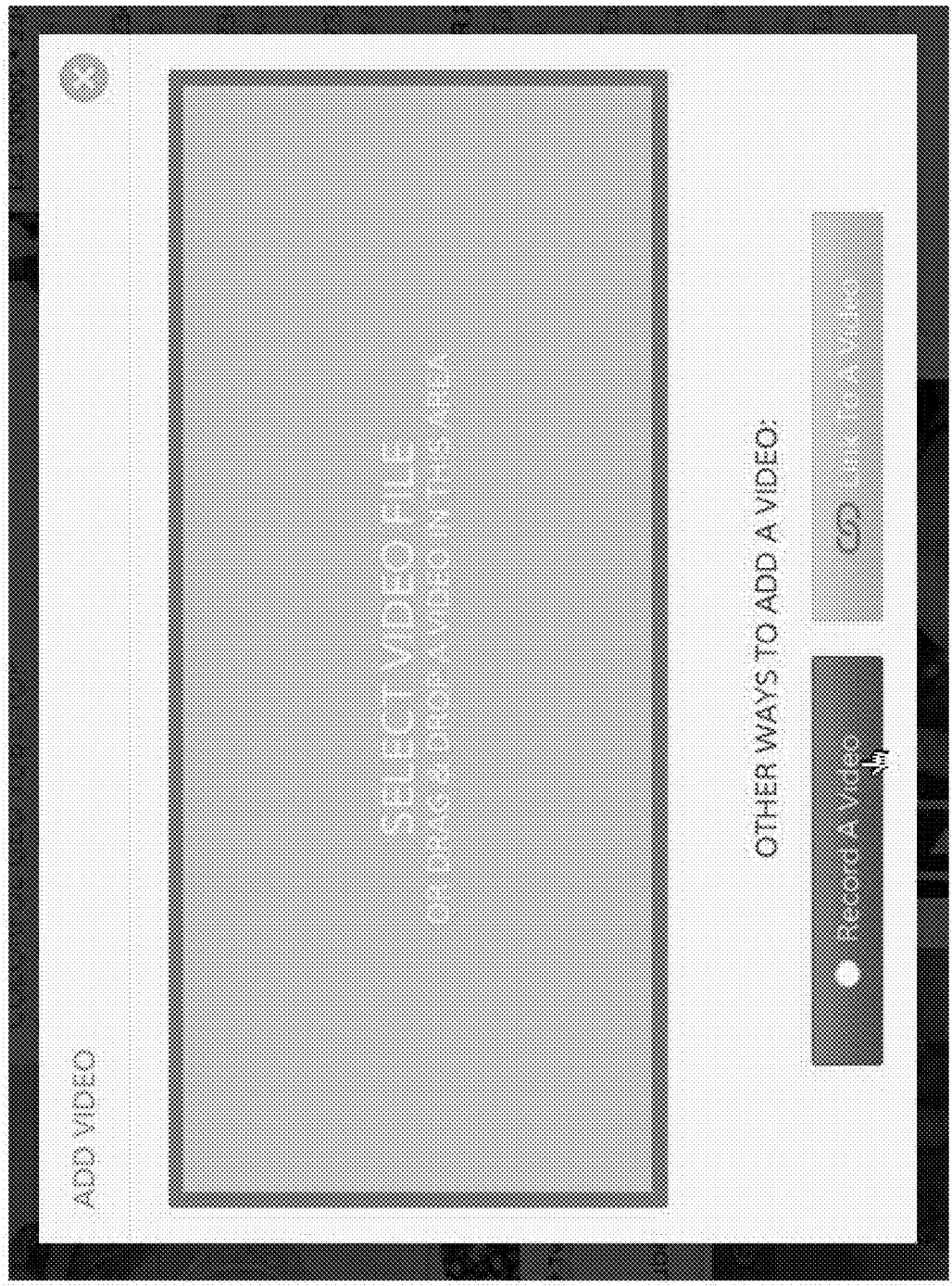
Figure 18C:
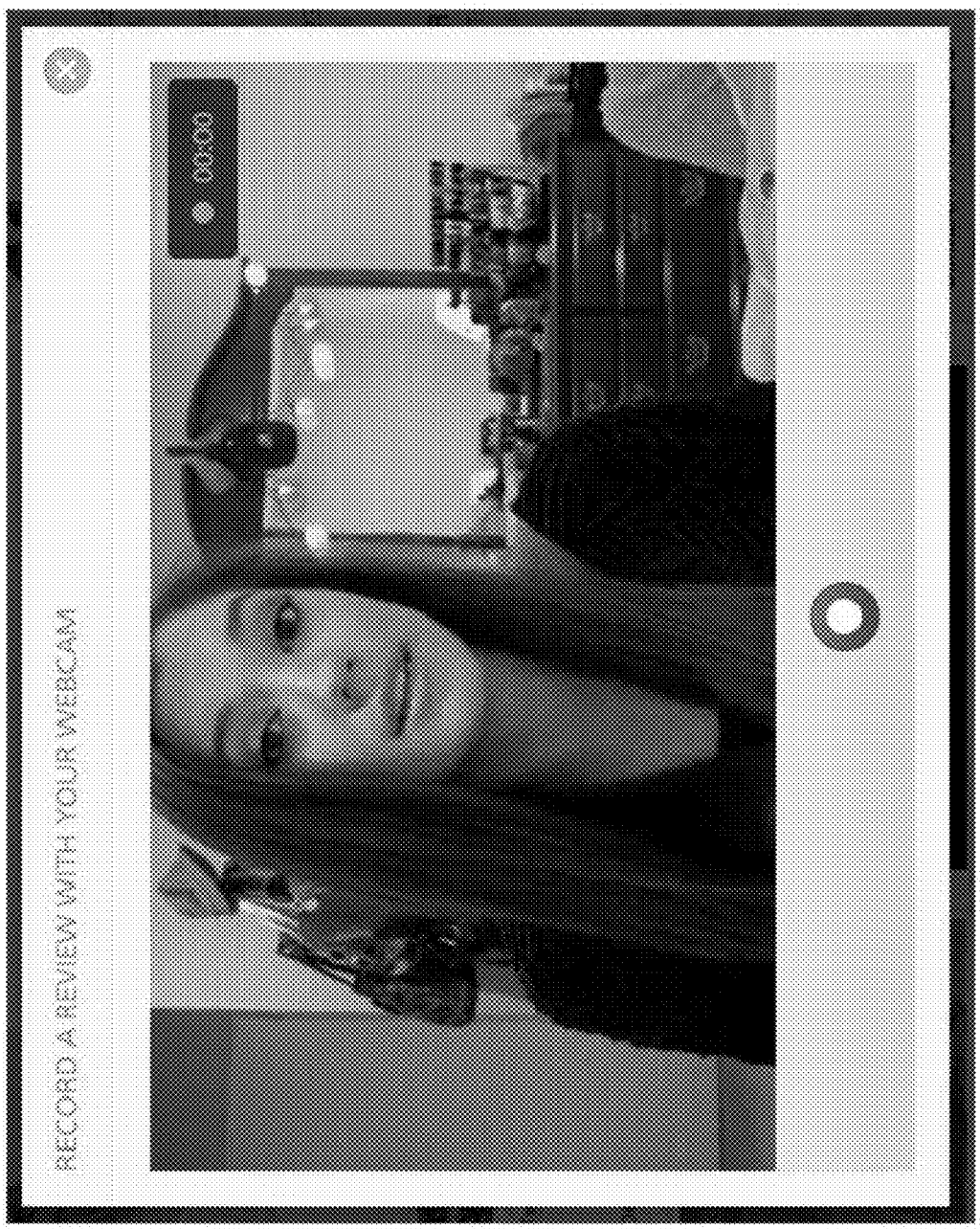
Figure 18D:
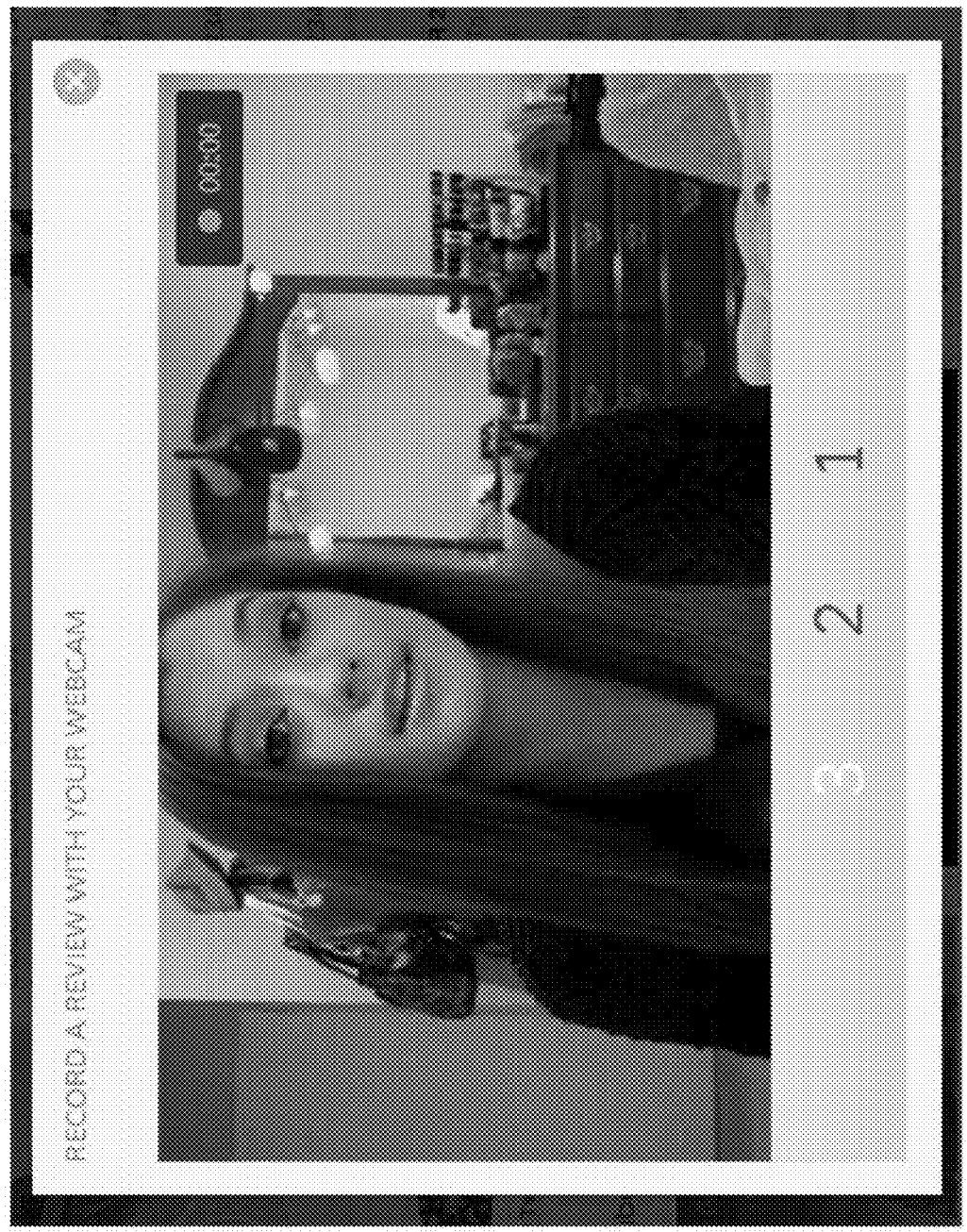
Figure 18E:
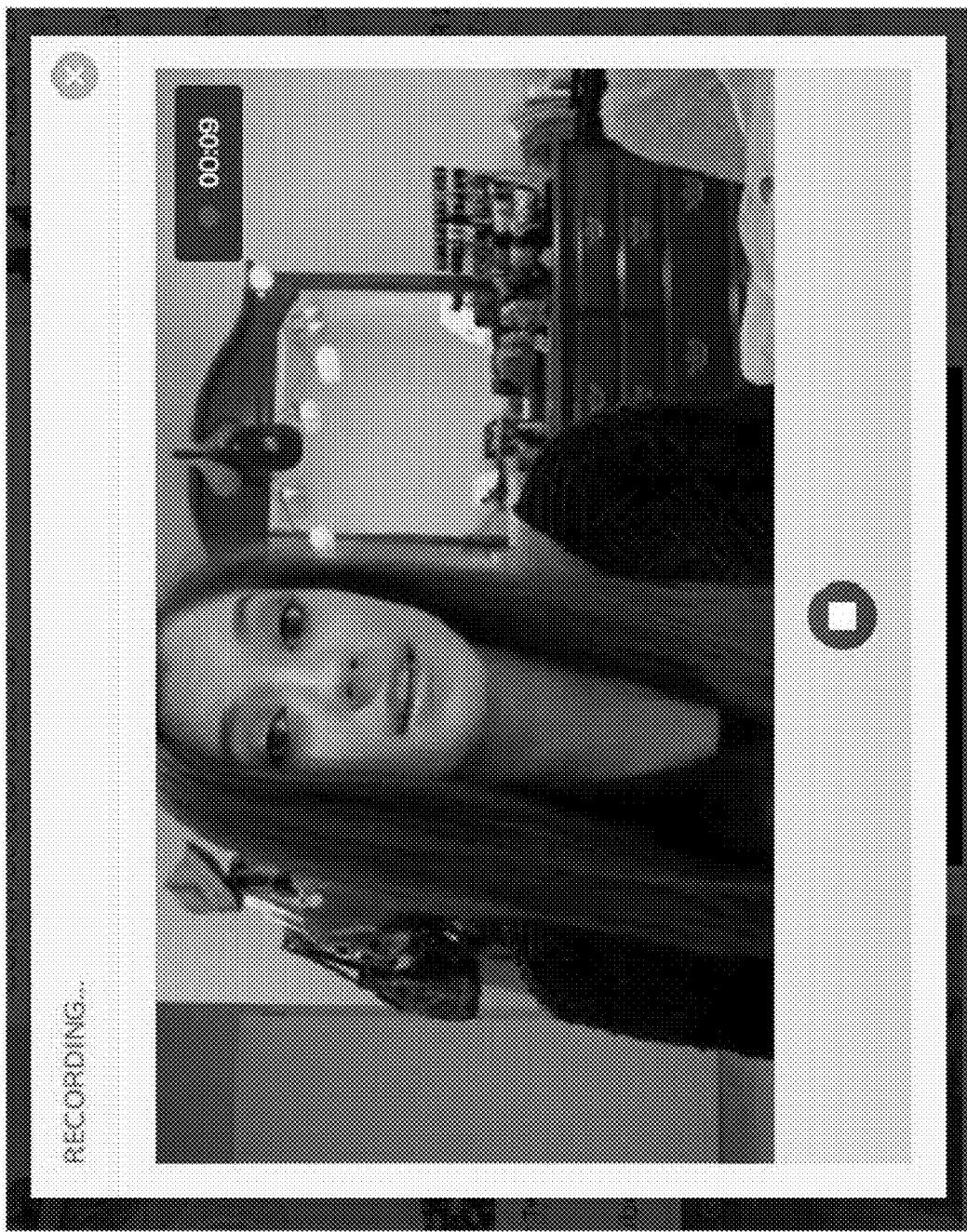

FIGS. 18A-J illustrate example user interfaces at various states of an example process of adding a video review (e.g., by uploading or recording a video review, or providing a link to a video review) to be viewed via networked terminals. Referring to FIG. 18A, a user interface is provided via which a user can provide a video file by browsing one or more storage areas to locate and selecting a desired video review, or by dragging a video review to a drop area, or by initiating a video review recording process (e.g., by activating a "record a review" control), or by providing a link to a video review stored on a network accessible site (e.g., by activating a "link to review" control). Referring to FIG. 18B, if a user selects the "record a video" control in this example, the user may begin recording a video through a webcam or camcorder connected to a user terminal. Referring to FIG. 18C, a live feed of the user is provided via the user interface, via which the user can view herself prior to and while recording the review. A record control may be provided, which when activated, causes the example interface presented in FIG. 18D to be presented. Referring to FIG. 18D, after the user activates the record control illustrated in FIG. 18C, a countdown timer (e.g., a three second counter or other type of countdown timer) is presented to the user visually and/or audibly indicating when the recording will begin. Referring to FIG. 18E, the system records the video, optionally in a memory system remote from the user terminal, and the user can view what is being recorded via the user interface. A stop recording control is provided, which when activated by the user, may halt or pause the recording. Optionally, a maximum video length may be specified by an administrator or otherwise, and the video recording may be automatically halted once the maximum video length (as specified in time) is reached.

Figure 18F:
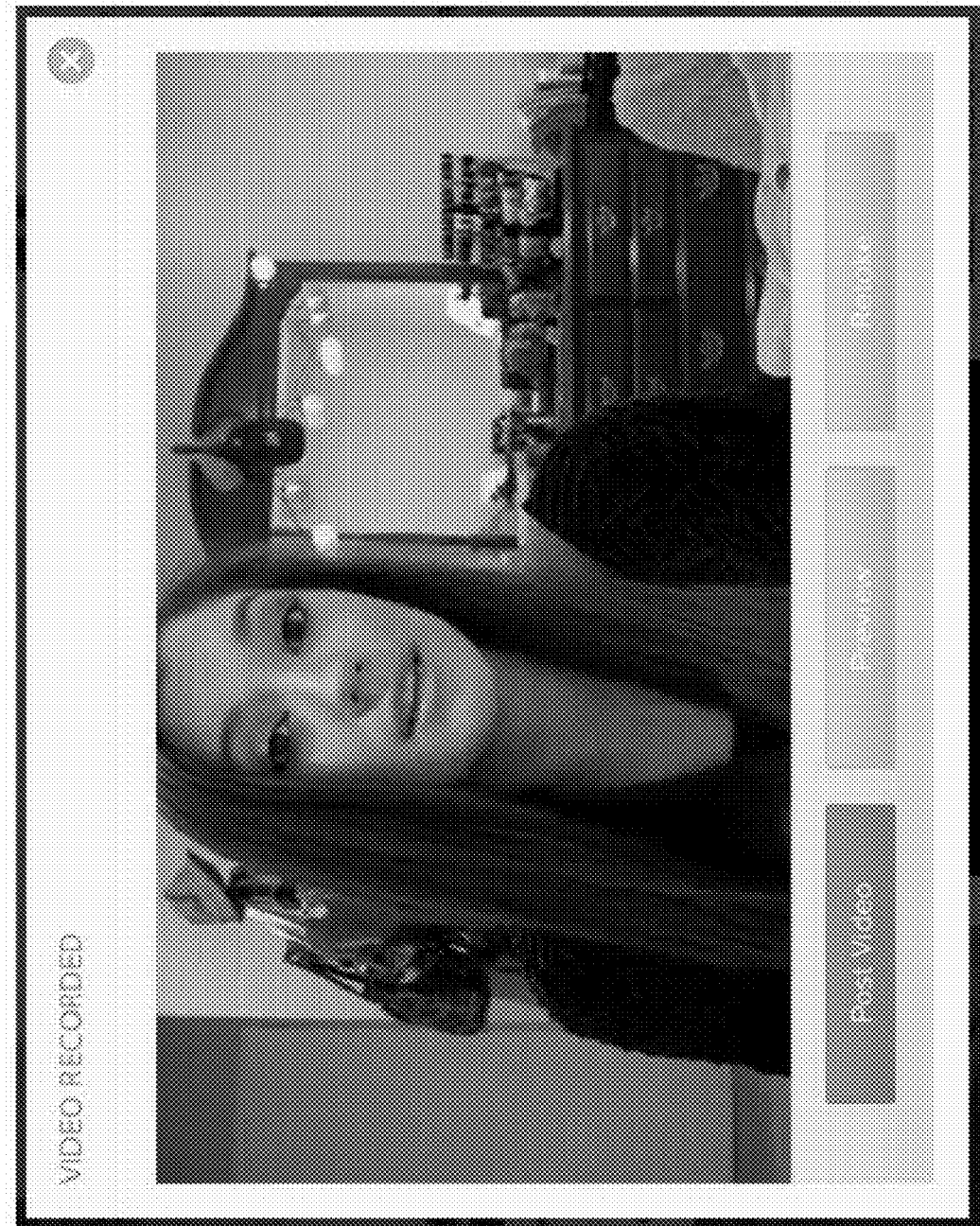

Referring to FIG. 18F, once the user has completed recording the video review (e.g., as indicated by the user activating the stop recording control), the user may activate a post control to post the recorded via, or review the video by activating a preview control, or retake the video by activating a retake control (which will optionally cause the previously recorded video to be deleted (e.g., functionally deleted) from memory).

Figure 18G:
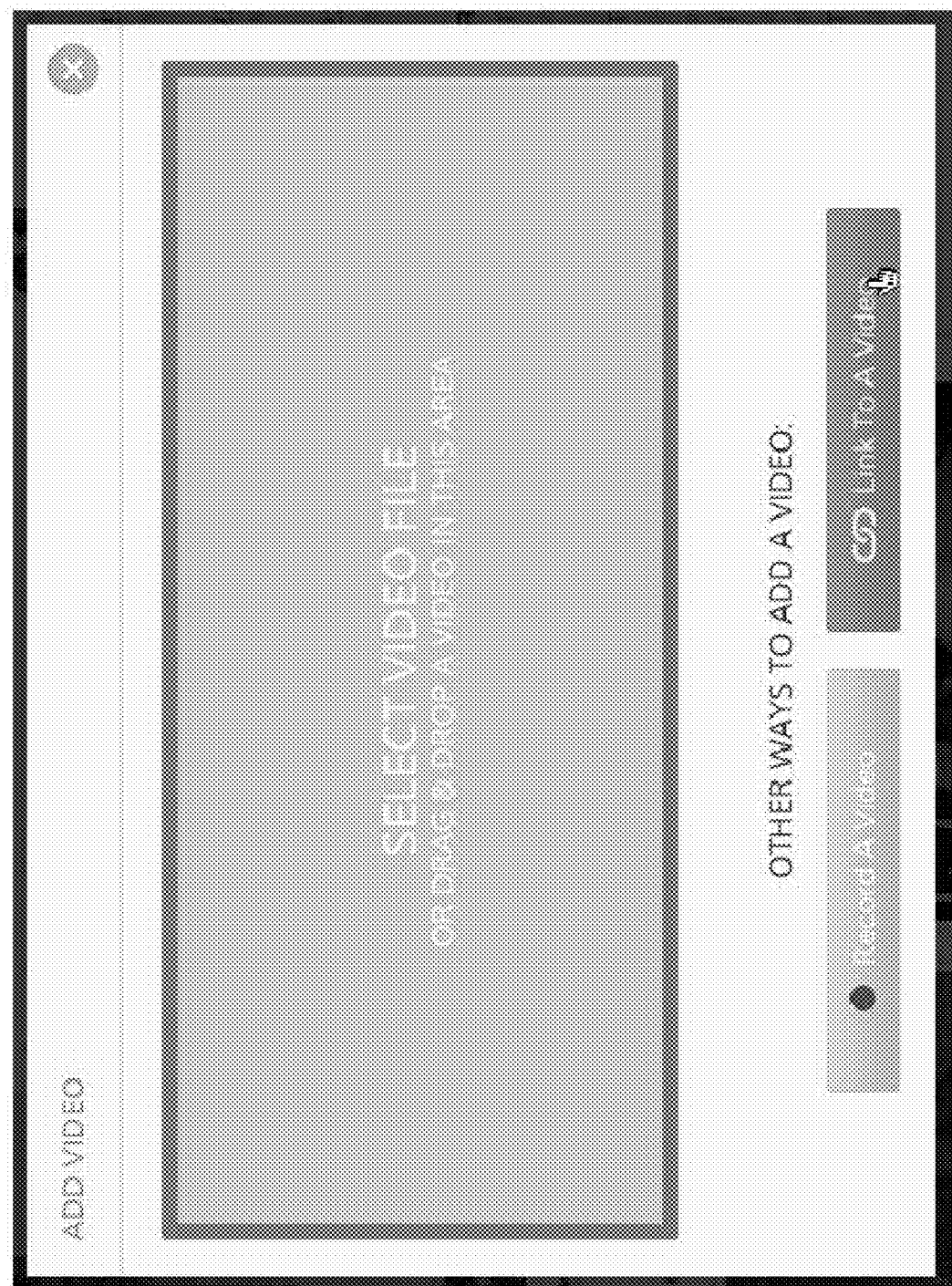
Figure 18H:
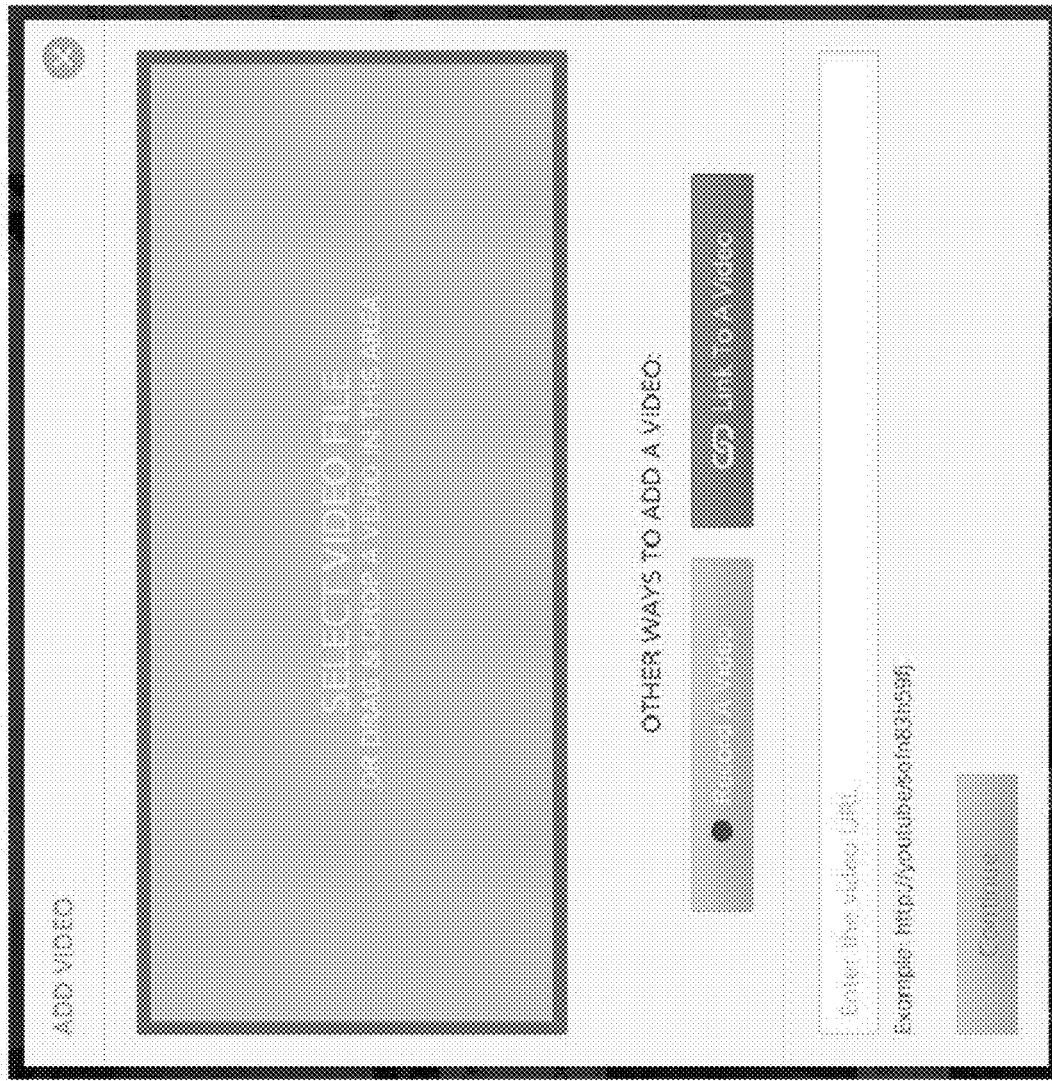
Figure 18I:
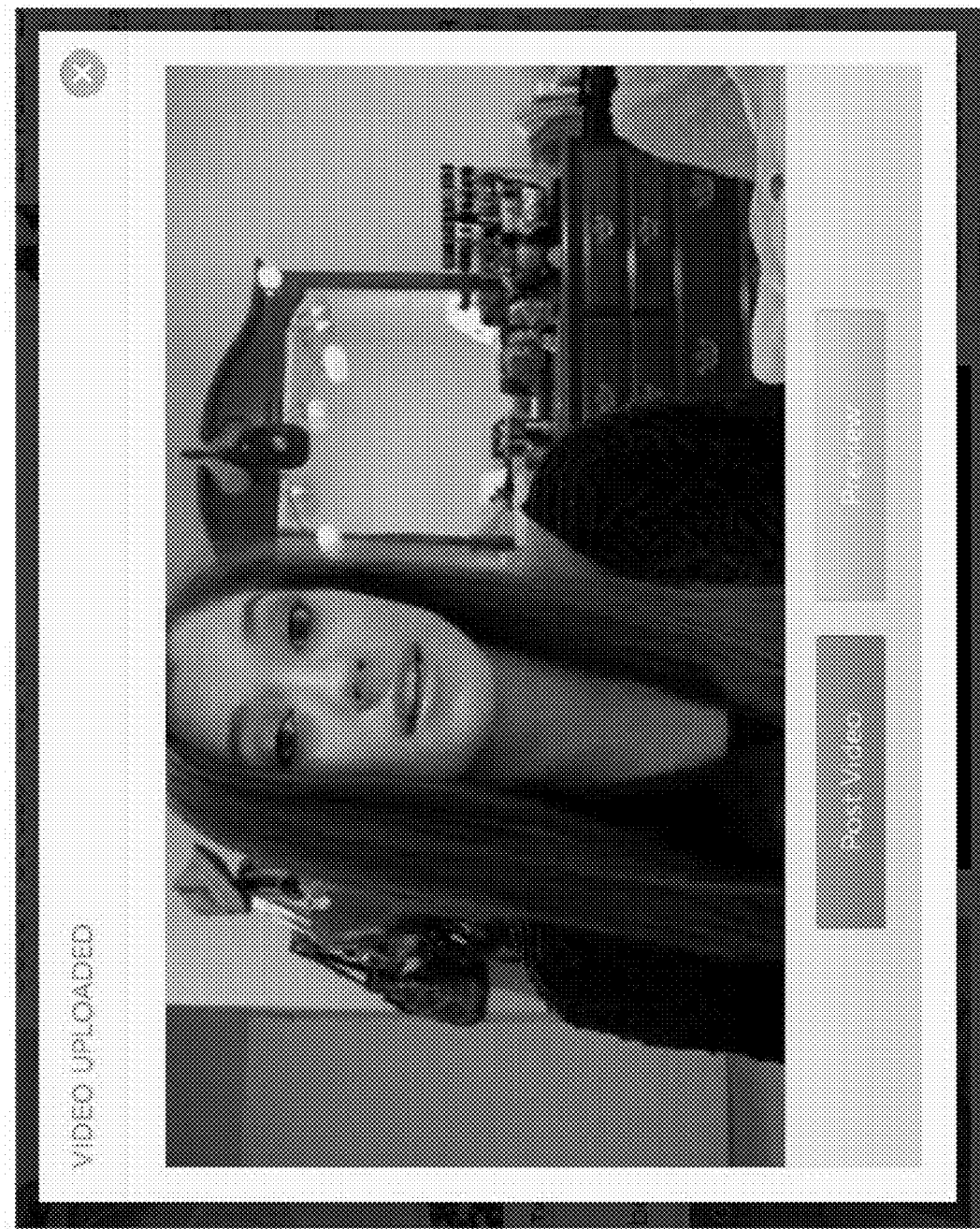

Referring to FIG. 18G, in this example, the user has activated the "link to video" control. Next, the example user interface illustrated in FIG. 18H is presented. A field is provided via which the user can enter a link to the video review (e.g., a uniform resource locator (URL)), which may then be saved in memory. Once the user enters the link, the user may activate a "continue" control. Referring to FIG. 18I, the user can preview the linked to video review via the illustrated user interface by activating a "preview" control, and activate a "post" control to post the video review.

Figure 18J:
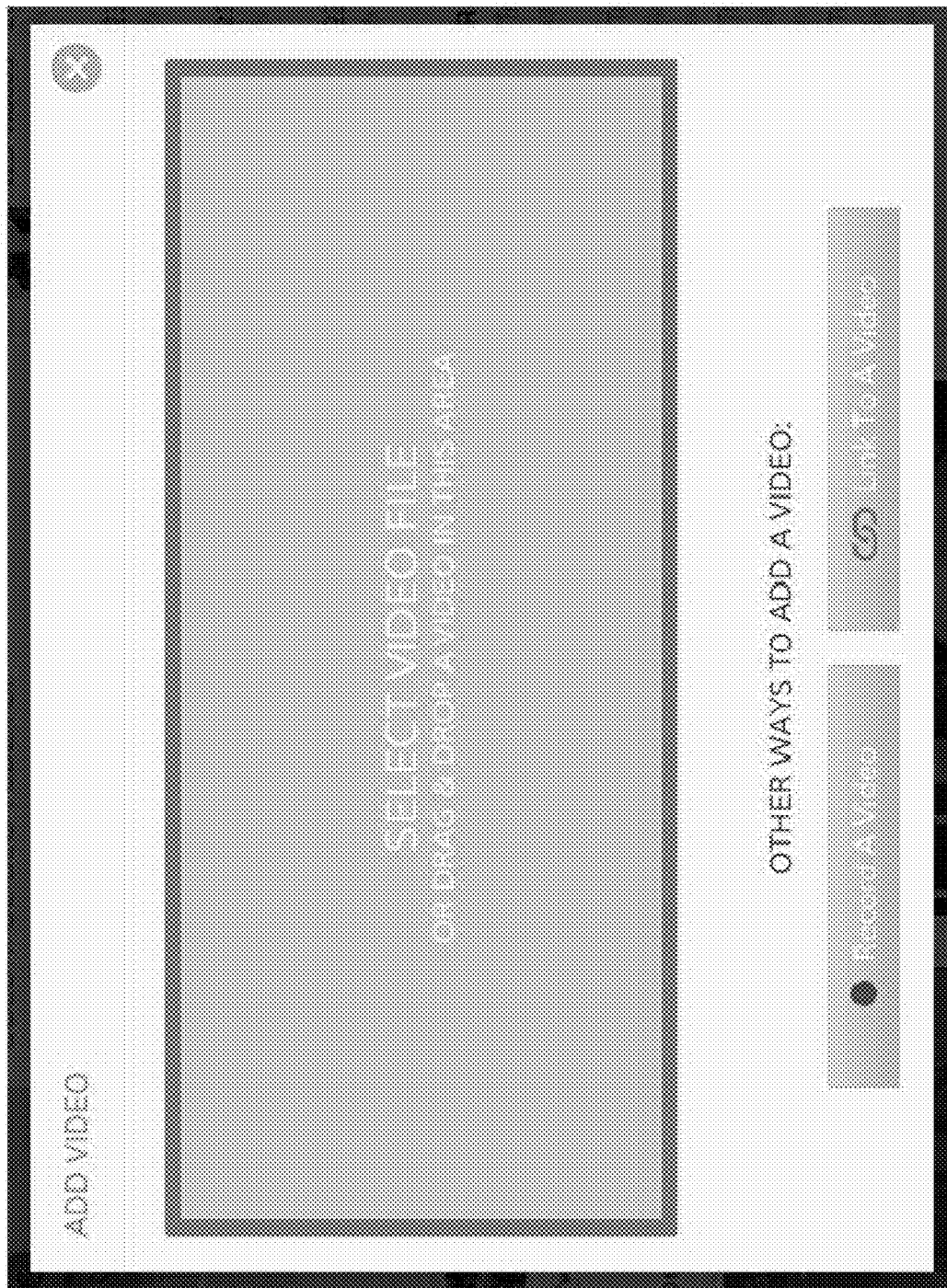

Referring to FIG. 18J, in this example, the user has activated the "upload" control, and the user may upload a preexisting video review stored on the user's terminal (or local to the user's terminal).

Figure 16A:
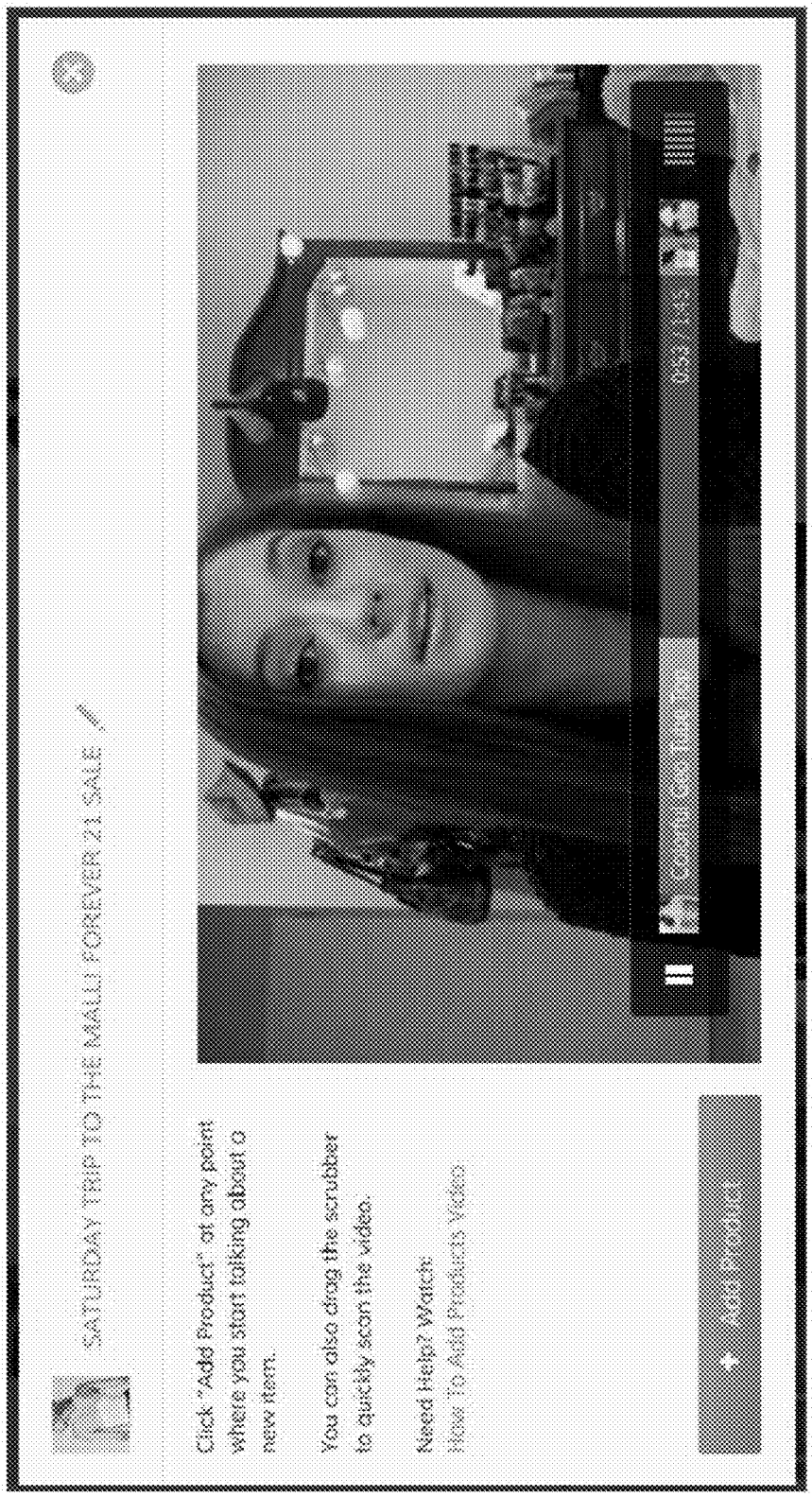
FIG. 16A-E illustrates example tagging and image upload user interfaces.

An example tagging process will now be described with reference to example user interfaces that may be provided for display on a user terminal (e.g., desktop, laptop, tablet, phone, interactive television, etc.). User inputs may be received by a remote system (e.g., the posting system), and data provided by the user may be stored and utilized by the system as discussed herein. Referring to FIG. 16A, a video review provided by a user is presented in association with a play/pause control, and a scrubber area including a scrubber control and timeline. An "add a product" control is provided, which when activated by the user, causes a tag or other indicator to be stored in association with the current point in the video review being displayed and/or the current position of the scrubber control in the timeline. This tag or other indicating may be used by the system to indicate the beginning point of the item review within the video review. The user may drag the scrubber control to a desired position to quickly scan the video to visually locate the beginning of an item review. An edit control (e.g., a pencil icon) may be provided, which when activate causes an edit user interface to be presented, such as the user interface illustrated in FIG. 16B.

Figure 16B:
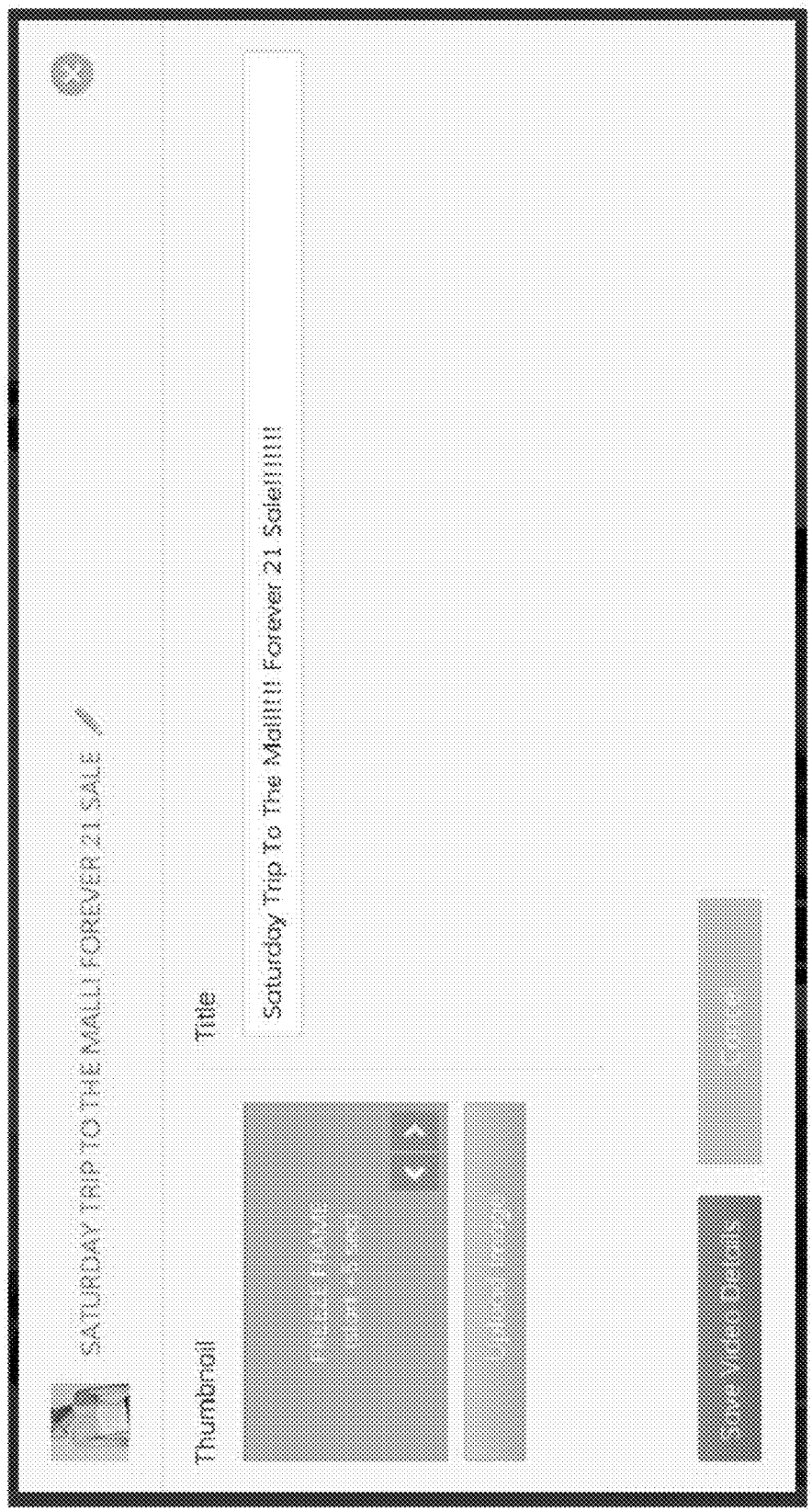

Referring to FIG. 16B, a user interface is provided via which the user can enter and edit descriptive details for the video review, which may be saved as metadata in association with the video review. For example, a field may be provided via which the user can enter and edit a title for the video review. The user may select a frame from the video review to act as a representative frame for the video review. For example, a freeze frame field is provided which statically displays a frame from the video review. Forward and reverse controls are provided via which the user can advance (e.g., on a frame by frame basis) the video review in the freeze frame field. When the user views a frame that the user wants to use as a representative frame for the video review, the user may select that frame (e.g., by clicking on the frame, activating a select frame control, activating a "save video details" control, or otherwise). Optionally, the user may upload an image (or a link to an image) that is to be used as a representative frame. Optionally, the video review title and/or the representative frame (e.g., in a thumbnail, reduced size version) may be displayed in search results that include the video review. Once the user has finalized the title and identified the representative image for the video review, the user may activate the "save video details" control, and the foregoing is saved in system memory, and the example user interface illustrated in FIG. 16C may be provided for display to the user. Optionally, in addition to or instead of the user providing descriptive information, such as an item review title or a name of the item being reviewed, the system may perform an automatic detection process that analyzes one or more frames in the item review and/or representative image, and performs an image analyses to identify the item being reviewed. The system may then add corresponding descriptive detail text, which may be displayed via the video player in association with the item review.

Figure 16C:
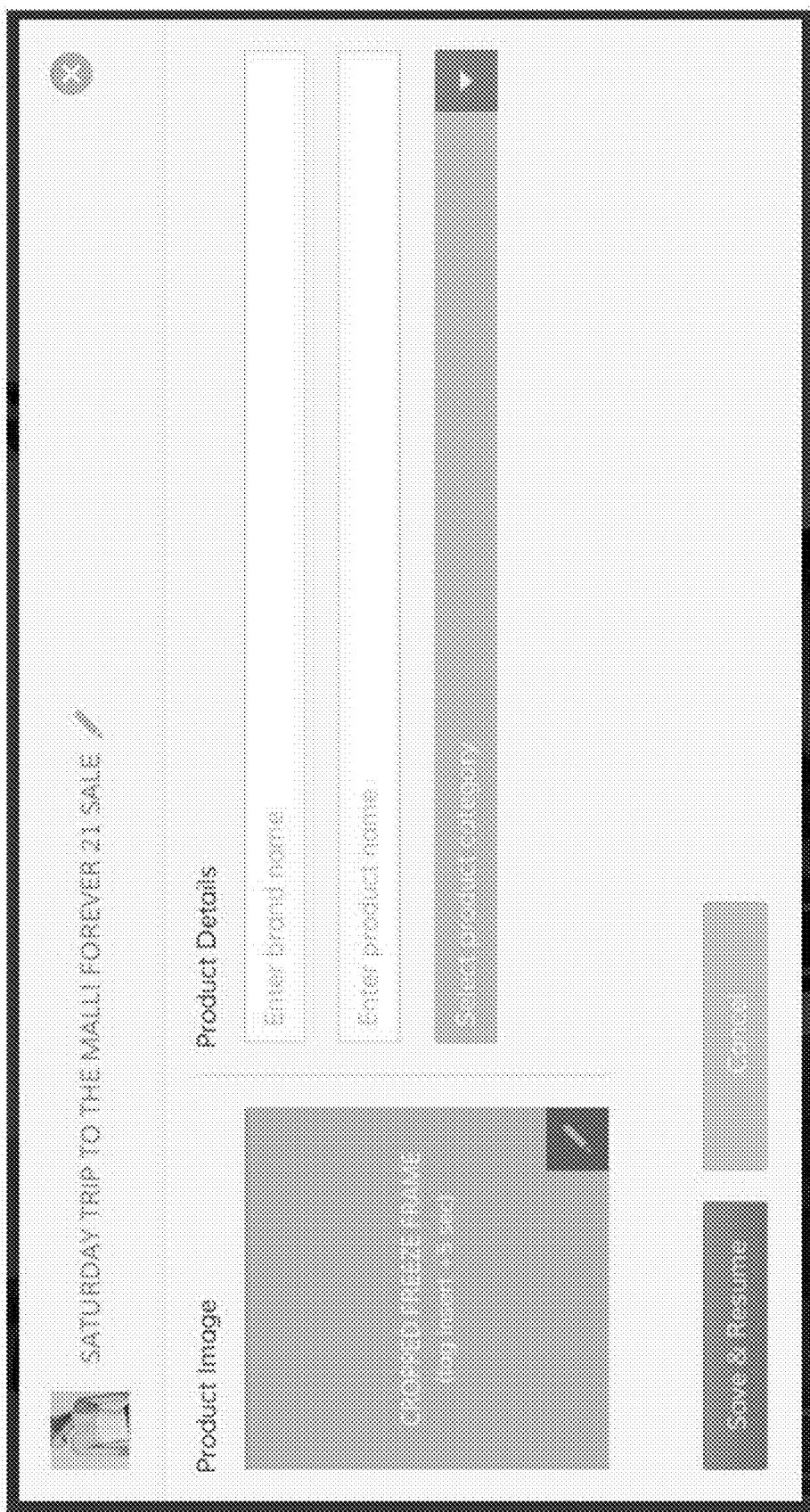

The example interface illustrated in FIG. 16C enables the user to add metadata with respect to the video review, and in particular, for a given item review within the video review. In this example, fields are provided via which the user can provide details regarding the item being reviewed. For example, a brand name field may be provided via which the user can enter a brand name of the item. A product name field may be provided view which the user can enter the item name (which may be a trademark name and/or a descriptive name). A product category field may be provided (e.g. as a drop down menu) via which the user can select, enter or otherwise specify the product category to which the item belongs (e.g., clothing, makeup, jewelry, electronics, accessories, etc.). Fields for receiving other metadata may be provided as well. For example, fields may optionally be provided for receiving the name of the merchant at which the item was purchased, the retail price of the item, the price paid for the item, the item color, the item size, etc.

As similarly discussed above with respect to FIG. 16B, a freeze frame field is provided which statically displays a frame from the video review. Forward and reverse controls are provided via which the user can advance (e.g., on a frame by frame basis) the video review in the freeze frame field. When the user views a frame from the item review, included within the video review, that the user wants to use as a representative frame for the item review, the user may select that frame as similarly discussed above. Once the user has provided the foregoing, the user may activate the "save and resume" control, and the user inputs are saved.

Figure 16D:
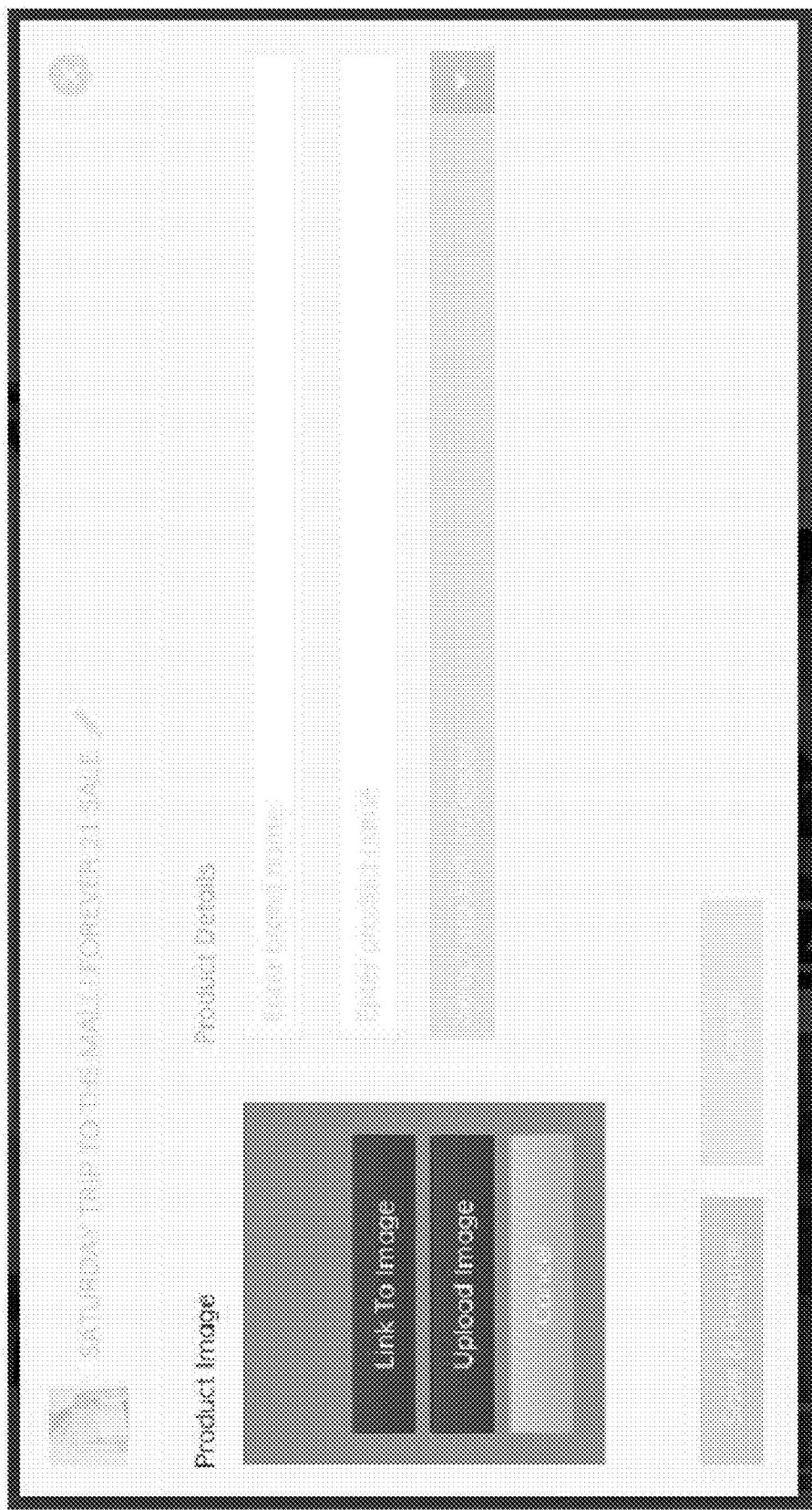

Optionally, an upload user interface, such as that illustrated in FIG. 16D, may be provided which enables the user to upload or link to an image of the item being reviewed, to be used as a representative frame for the item review, which the user may cause to be saved by activating the "save and resume" control.

Figure 16E:
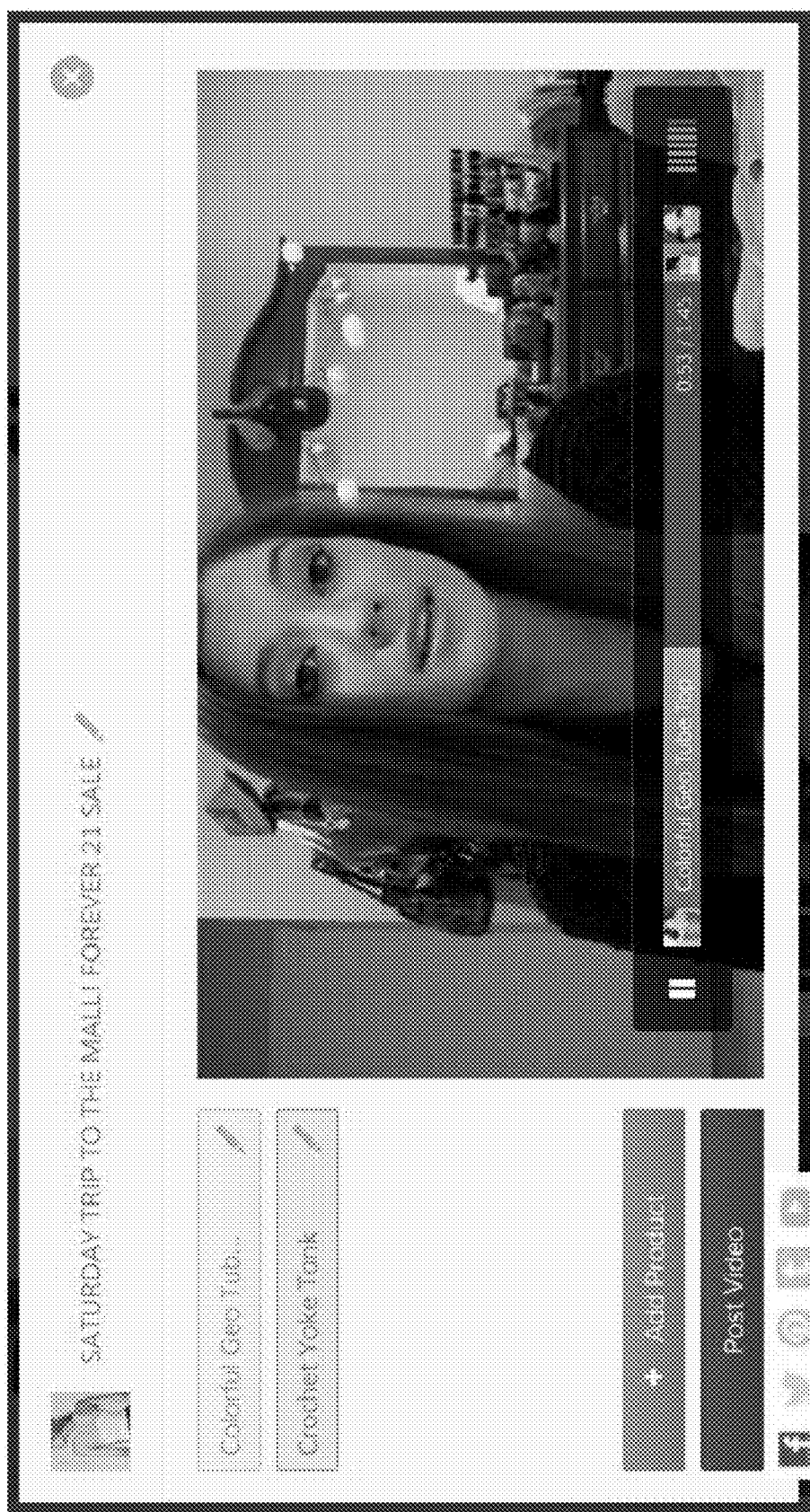

Referring to the example user interface illustrated in FIG. 16E, the user interface presents the video review to the user including some or all of the information provided by the user via the user interfaces discussed above. For example, the representative image and video review title may be displayed adjacent to (or overlaying) the video review playback area. The representative item image and/or item name may be displayed in the scrubber area. The user causes the system to post the video review on one or social networking sites by activating a respective social networking control provided via the user interface.

The user may add information regarding additional item reviews included in the video review by activating the "add product" control illustrated in FIG. 16E. If the user activates the "add product" control, the user may provide the item review information for an additional item review using, optionally the corresponding interfaces discussed above (e.g., the interfaces illustrated in FIGS. 16C-16D). As the user "adds a product" (e.g., by providing the information for a corresponding item review), the item review product name (and/or other identifier, such as the representative item image), appears in an item review listing menu (e.g., on the left side of the user interface, or other location). The user may also edit information for a listed item review. For example, the user may activate the pencil edit control for a corresponding item review, and the user interface illustrated in FIG. 16C may be presented, populated with the previously provided item review information from the user. The user can edit the item review information as desired, and then save the edits, which will then be reflected in the example user interface illustrated in FIG. 16E.

Figure 23A:
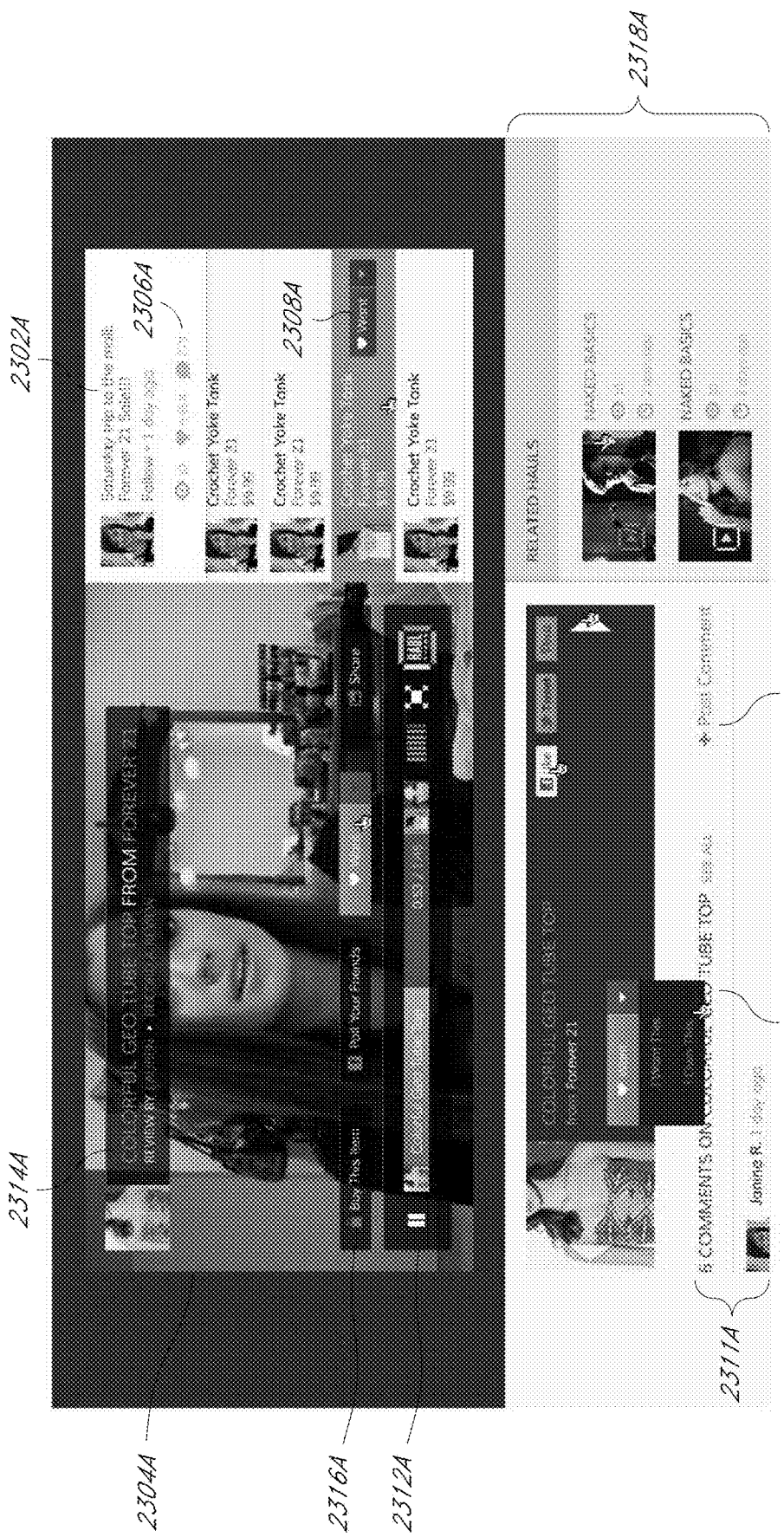

FIG. 23A illustrates an example video review player user interface, as it may appear on a native website (e.g., not as an embedded video review player on a third party website). In this example, a menu (e.g., a list) of item reviews 2302A, included in the video review being played back in playback area 2304A, is provided for display. There may also be a menu entry for the overall video review. A given item review entry in the list 2302A may include one or more of the following: an image from the item review (e.g., a representative image selected as discussed above), an image of the reviewer, the name of the item being reviewed (e.g., Crochet Yoke Tank), the brand of the item being reviewed, and/or a price of the item being reviewed. Other or different information may be provided as well (e.g., the name of the merchant at which the item was purchased, the color of the item, the size of the item, etc.). Social network information may be provided as well in association with a given item review entry and for the overall video review. For example, the number of views, wants, and comments may be displayed in association with an entry (see, e.g., social information 2306A) and/or the video review overall.

In addition, with reference to FIG. 23A, a control 2308A may be provided via which the user can indicate that the user wants the item in a given entry, does not want the item, or already owns the item. A control 2310A may be provided via which the user can provide comments (including questions) on the corresponding item or item review. Comments (by the user and/or other users) associated with the item review displayed in the playback area 2304A may appear in a comments area 2311A. As similarly discussed elsewhere herein, the displayed comments may be synchronized to correspond with the item review being displayed in the playback area 2304A.

A timeline of the video review 2312A may be provided which displays, in sequence, identifiers corresponding to some or all of the item reviews included in the video review (e.g., a representative item review image, a product name, etc.). The timeline may be associated with a scrubber control which the user can move to a desired location in the timeline, which will then be reflected in the video playback area 2304A, as similarly discussed above. Optionally, a user may go directly to an item review by clicking on an item review entry in the list area 2302 and/or in the timeline. Metadata 2314A related to the item review being shown in playback area 2304A may be presented in overlay fashion over the video review and/or elsewhere. For example, the metadata may include the representative image for the item review, the product name, the name of the user (which may be the user's actual name, a user ID or other alias), and/or other information. Play and pause controls may be provided. Optionally, other controls, such as fast forward, reverse, and/or fast reverse controls may be provided as well. A control may be provided enabling the user to record her own review for the item in the item review being displayed and/or for another item.

Controls 2316A may be provided via which the user may purchase the item in the item review being displayed, poll their friends regarding the item in the item review being displayed, indicate that the user wants the item in the item review being displayed, and/or share the item review with others (e.g., via email, SMS, MMS, social networks, blogs, microblogs, and/or otherwise), as similarly discussed in greater detail elsewhere herein. The user interface may also display related reviews the user can view in a related reviews area 2318A.

Figure 23B:
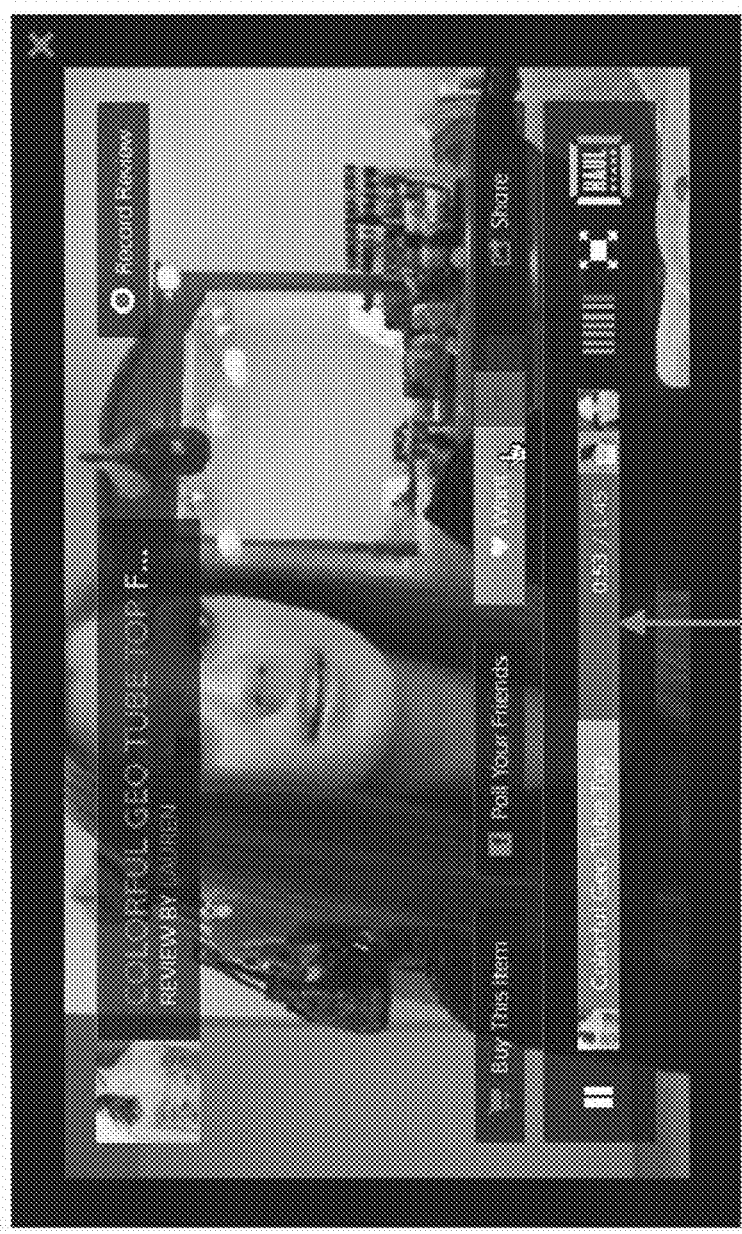

FIG. 23B illustrates another user interface, similar to that illustrated in FIG. 23A, as it may appear when the video review player is embedded on a non-native networked site (e.g., a third party website, in editorial content or in an advertisement, such as in a webpage banner ad). Optionally, the user interface may be initially displayed to a visiting user in an open state, such as that illustrated in FIG. 23B, or there may be a much smaller "watch the review" control, which when activated by a visiting users, causes the user interface to be displayed on the site, editorial content, or an advertisement.

Figure 23C:
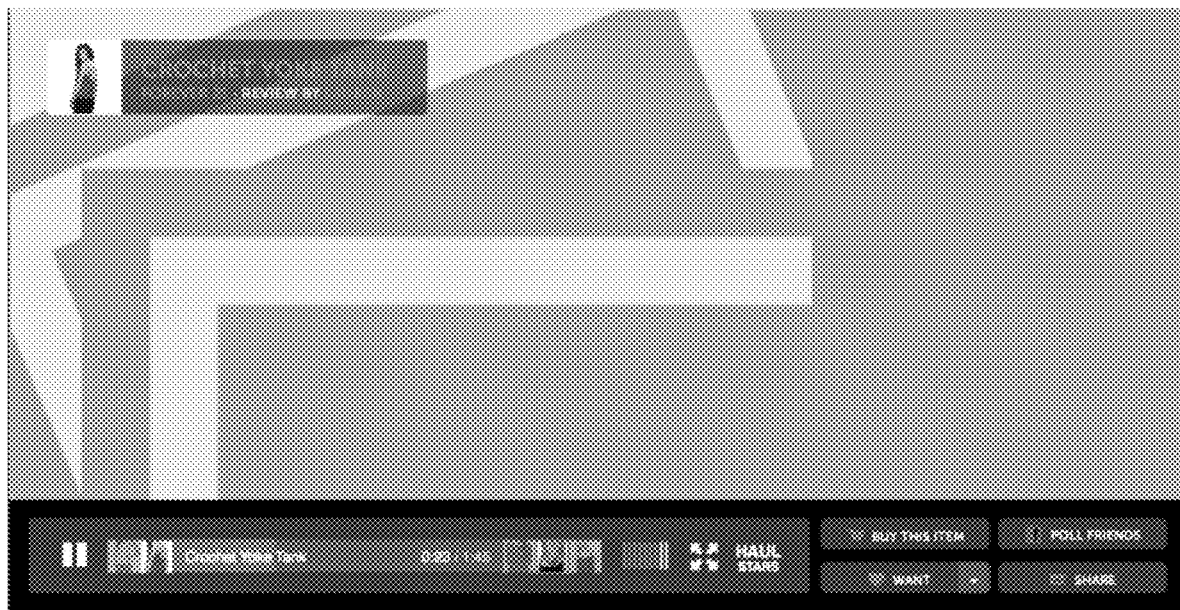

FIG. 23C illustrates another user interface as it may appear when a video player, incorporating some or all the features discussed herein, is embedded on a non-native networked site (e.g., a third party website or application, in editorial content or in an advertisement, such as in a webpage banner ad) or a native networked site. The video content played by the video player may be provided by, and accessed from one or more of the systems described above (e.g., from the system that provides the user interface configured for one or more of the following: providing or accessing comments, for purchasing an item, for indicating to other users that the user wants or likes an item, for recording a video review, for enabling users to poll others to obtain feedback regarding an item, for sharing content, etc.). The video content may be provided from a source different than the system that provides the user interface discussed above and different than the system hosting the user interface for display to users. For example, the content may be provided by one or more third party sites such as YouTube®, Vimeo®, and/or other site, which may be accessed via an application programming interface (API) or otherwise. Optionally, the user interface does not obscure messaging including, but not limited to logos and/or advertisements, included in association with the content from the third party site (e.g., some or all of the user interface controls do not hover over the video content being played). Thus, for example, the user interface may be configured as a frame that is positioned adjacent to or over one or more sides of the content being played, optionally without blocking advertisements provided by the third party providing the third party content (e.g., where the advertisements are embedded in video content or immediately adjacent to the video content). Therefore, certain embodiments advantageously enable and provide enhanced features (e.g., providing or accessing comments, for purchasing an item, for indicating to other users that the user wants or likes an item, for recording a video review, for enabling users to poll others to obtain feedback regarding an item, for sharing content, etc.) for third party content, optionally without blocking or obscuring advertisements provided by the third party with respect to the third party content, and optionally without violating terms of service for accessing and utilizing content from the third party site.

In the example illustrated in FIG. 23C, the user interface, including the play/pause control, the scrubber (optionally with images of products displayed in the scrubber area), a volume control, and maximize screen control, a record control (enabling the viewer to record a video), a "buy this item" control, a "want" control, a "poll friends" control, and a "share" control, is positioned below the video content area. In addition, in this example, an information display (with the name of a product being reviewed, the retailer from which it was purchased, and the name of the reviewer) overlays the video content area.

Tags and other data (such as discussed above) may be associated with video content from the content hosting system and stored on a system remote from the content hosting system (e.g., the system illustrated in FIG. 2). For example, the remote system operator or other user may add a video hosted on a third party content hosting system to a searchable index/directory of product reviews. The operator, other user, or an automated system may associate tags (e.g., words or phrases identifying brand, model, size, color, visual traits, functional specifications, uses, and other descriptive text) and a locator (e.g., a URL, a unique identifier, a uniform product code (UPC), and/or other location/identification information) with the video from the third party hosting site. Thus, at least a portion of the tags are optionally accessed from a source different than the third party content hosting system.

Then, when a user wants to access the video via the remote system (e.g., by clicking on a link in a directory of item reviews or in search results provided in response to a user query and displayed on the user's terminal), the system utilizes the associated locator to cause the video to stream from the third party content hosting site to the user's terminal to be displayed in a video player. The associated tags are retrieved by the remote system and some or all are appropriately displayed on the user terminal in association with the streamed video. As similarly discussed above, optionally, the video player user interface (optionally including a "buy this item" control, a "want" control, a "poll friends" control, and/or a "share" control) does not obscure messaging including, but not limited to logos and/or advertisements, included in association with the content from the third party site. The user can activate a given user interface control, and the system with detect the activation and perform the respective function as similarly described above.

As similarly noted above, the user interface may offer interstitial advertisements between items reviews in the same video file. The interstitial advertisements may optionally be selected by a remote system (such as that described elsewhere herein) using information obtained my monitoring a user's viewing history (which may be reported by a program executed by the user terminal or by monitoring content requests received over a network from the user interface) and/or a user's profile. For example, the advertisements may be selected based at least in part on the content/tags of the video review the user has just watched (e.g., where the advertisement is selected so as to be related or similar to an item reviewed in the video review), is just about to watch, on user profile and/or other historical viewing information, or otherwise. For example, if the user has just watched a video review for a blouse and the user is within a certain age range (e.g., as determined from user profile information), the system may select an advertisement and/or another review for a similar and/or complementary item (e.g., another blouse or a related product such as a belt, a scarf, etc.), in this example blouses geared for people within a certain age range.

One or more interstitial advertisements may be displayed at the same time and/or one or more items may be included in a given interstitial advertisement. The interstitial advertisement may be displayed in the video content area, in a pop-up window overlaying/obscuring the video content area, or elsewhere. A given interstitial advertisement may optionally include a user-selectable link or other reference to one or more reviews for an item in the advertisement. Upon detecting that the user has selected the link, the user interface may access (e.g., from a remote server) the corresponding video review of the item in the advertisement, which may then be displayed to the user. The interstitial advertisement may be displayed for a predetermined amount of time if the user does not select the review link in the advertisement. If the predetermined amount of time expires without the user selecting a review link (or optionally one or more other controls included in the advertisement), the video player may automatically begin playing the next review in the original video file. A timer (e.g., a countdown timer) may be provided indicating to the user how long until the next review in the original video file will begin playing. Optionally, the timer may be displayed in association with the name of the reviewer and a title for the next review (e.g., obtained from a tag provided in association with the next review). Optionally, an advertisement skip control may be provided on the advertisement or elsewhere, which when activated by the user causes the next review in the original video file to be displayed prior to the timer counting down to zero. If, however, the user selects a review link in the interstitial advertisement, then a video review for the advertised item may be displayed in the video content area or elsewhere prior to the timer counting down to zero.

Figure 27:

Referring to FIG. 27, another example user interface is illustrated, with an interstitial advertisement showing 4 different outfits being worn by models. Each outfit is associated with a control (e.g., a link) that enables the user to watch one or more video reviews of the corresponding outfit being advertised. The system may optionally determine how may reviews are available for the outfit (or a particular item on the outfit) from one or more sources, and provides a number indicating the quantity of available reviews to the user via the user interface, optionally in association with the control for initiating display/playback of the video review(s). Optionally, a control is provided in association with each outfit, which when activated causes the user interface to display additional information about the outfit (e.g., name of brand, cost, materials, available colors, available sizes, etc.) and/or to purchase the outfit. Of course other types of items may be advertised (e.g., electronics, movies, cars, furniture, etc.).

Optionally, user activations of the foregoing user interface controls are processed by a system different than the system providing the user interface. For example, when a user activates a given control (e.g., the "buy this item"), the hosting system routes an indication of the activation to a remote system (e.g., the system whose operator provided the user interface to the hosting system). The remote system may process the activation as similarly discussed above in the examples where the same system that hosted the user interface and video content. For example, the remote system may process the purchase request for the item associated with the "buy this item" control.

In addition, the remote system may optionally perform analytics and tracking with respect to such control activations. For example, the remote system may track and keep a record of some or all of the following: which controls were activated and how many times they were activated, what content was being displayed when the controls were activated, when the controls were activated, which purchase requests resulted in a completed purchase, how many item purchases were made, which items where purchased, how many times users indicated they wanted an item in a video, how many polls were created, what the poll results were, how many times a given video item was played, how many times a given video item was shared, etc.

The remote system may calculate relevant statistics, such as what percentage of "buy" control activations resulted in a sale, time distributions of when controls are activated, the percentage of users that liked a particular reviewed item or did not like a particular reviewed item, the average number of activations of a control for a given time of day, etc. Optionally, the site hosting the user interface may be able to opt out of having the information tracked by the remote system (e.g., for privacy purposes).

The remote system may provide an analytics dashboard to the operator of the site hosting the user interface (or other designated recipient), that will display some or all of the analytics information.

When the video review is displayed via an advertisement or in-line with editorial content, optionally initially an image corresponding to the video review may be presented in the advertisement or editorial content, adjacent to and in conjunction with advertisement/editorial text and/or image(s) separate from the image corresponding to the video review. The image corresponding to the video review may have been provided or selected by the video review author, or by another entity, such as the advertiser or editorial content provider. Optionally, the image corresponding to the video review is not an image from the video review. A video playback control may be displayed in association with the image corresponding to the video review (e.g., overlaying or adjacent to the image), which when selected by the viewer, causes the video played to be activated. For example, the video player optionally may pop up over the advertisement/editorial content, obscuring some or all of the advertisement/editorial content.

The video player may optionally provide a single video including reviews of multiple items reviewed by the same person, or the video player may provide different reviewers reviewing the same and/or different items. Optionally, the video review may include a single item review. The user interface may include some or all of the functionality described above with respect to FIG. 23A. Optionally instead, when the video player is in embedded form, certain functionality may not be provided or present. For example, optionally, the item review listing 2302A, the related reviews area 2318A, and/or the comments area 2311A may optionally be omitted. The video player optionally displays a scrubber area including a scrubber, or optionally does not display a scrubber area including a scrubber. Optionally, a record review control is provided in association with the video player as similarly discussed elsewhere herein. For example, if the user activates the record control the user may record a new video review of the item included in the item review presented to the user, or of another item in the video review, or an item not included in the video review. Optionally, the user may be provided with a user interface enabling the user to add titles, tags and/or item detail information to the video review as similarly discussed elsewhere herein. Optionally, the user may be instructed to only include one item review in the recorded video review, and optionally the ability to indicate start positions for item reviews within the video review may be disabled or not provided to further encourage the user not to include multiple item reviews in the video review.

The video player and/or a remote system with which the video player communicates, may monitor and track a user's interactions with the video player and with other users via the video player, and store and report such information (e.g., to an advertiser or a representative or agent thereof) to provide analytics regarding items being reviewed and user interaction processes. Such analytics may be used to better identify target audiences for advertisements and to better focus advertisement campaigns. Thus, such an embedded (or native) video player may drive user traffic to brand sites (e.g., websites) to purchase items being reviewed or other items from the brand, enables users to share item information with their friends, promoting virality and enabling the collection of consumer insights regarding items.

Figure 24:
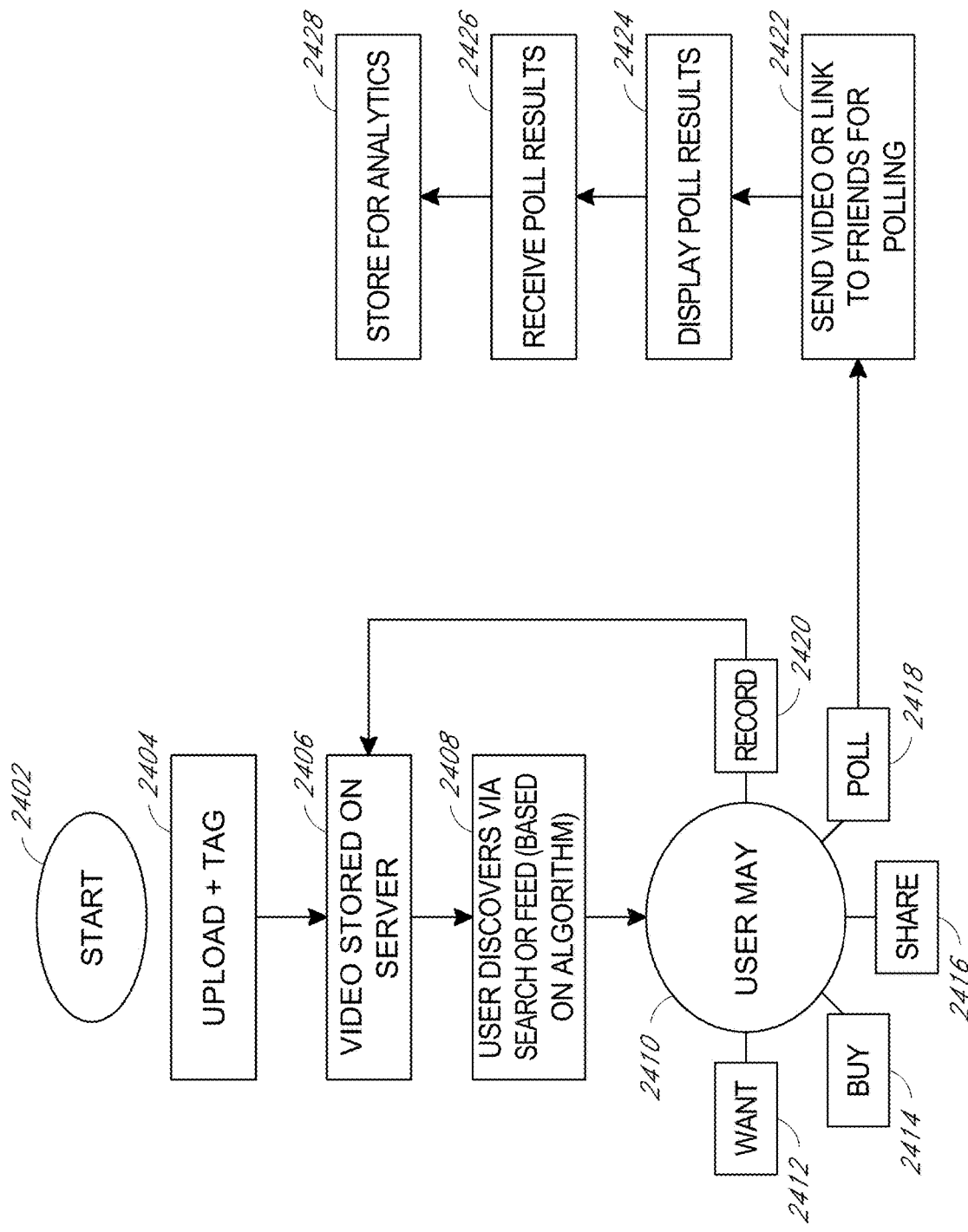
FIGS. 24-25 illustrate example processes.

FIG. 24 illustrates an example process including utilization of a native video player. The process begins at state 2402. At state 2404, a reviewer uploads from a reviewer terminal a video review, including one or more item reviews, and provides associated metadata (e.g., tags and detail information), as similarly discussed above. Optionally, the user may record a new review via a webcam, camcorder, or otherwise. At state 2406, the video review is stored on a remote system (e.g., of a posting system server). At state 2406, the video review is displayed to another user via a video player. For example, the video review may have been discovered by the user as a result of a user review search request submitted to the remote system and returned in search results, the review may be displayed within an advertisement, such as a banner ad, or the video review may have been presented to the user as part of a feed.

At state 2410, the user may interact with the video player. The video player enables the user indicate (e.g., via one or more controls) that the user wants the item 2414, wants to initiate a purchase of the item 2414, wants to share the video review or a subset thereof (e.g., an item review) with others 2416, wants to poll others regarding the item being reviewed 2418, and/or wants to record a review (e.g., of the item in the current review and/or of another item) 2420. If the user indicates that the user wants to record another review, the process proceeds back to state 2406. If the user indicates that the user wants to initiate a poll, the process may proceed to state 2422, and the remote system or video player transmits the video review (and optionally, just the item review contained in the video review, where the video review includes multiple item reviews) and/or a link to the video review, to one or more other users for polling (e.g., other users specified by the user, other users networked to the user via one or more social networking sites, other users in the user's contact database, and/or otherwise).

At state 2424, the results are received from the users that responded to the poll are tabulated (e.g., added up to determine how may users indicated they like the item, how many indicated they dislike the item, and/or how many indicated are indifferent or have no opinion regarding the item). The results, including the tabulation, may be transmitted to and presented to the user that initiated the poll via the user's terminal. At state 2426, the poll results may also be transmitted to, and received by, another system, such as that of an advertiser, retail enterprise, and/or manufacturer. At state 2428, the receiving system may store the poll results and perform analytics on the results. Optionally, the poll results may include demographics (which may have been obtained for a social network of which they are a member, and may include such information as gender, age, income, education, relationship status (e.g., single, married, divorced, in a relationship, etc.)) of poll respondents in association with their poll response, to further facilitate the performance of analytics (e.g., to determine characteristics of those that liked, disliked, or are indifferent to the item being reviewed).

An example review aggregation process will now be described with respect to a merchant of the item(s), a manufacturer of the item(s), or other entity (e.g., a media company which has properties that provide editorial and/or advertising content) related to items being reviewed. Such entities may have a networked site via which the item reviews can be accessed. User video reviews and advertisements (e.g., advertisements related to item(s) being reviewed) may be aggregated at a central or distributed system. A user interface may be provided via which the entity may rate a given item review, categorize a given item review for appropriate use (e.g., for publication, for selective publication on certain sites and not on other sites, for in-edit publication and/or in-ad publication, for research and not for publication, etc.). By way of example, the commerce-enabled video player and/or video reviews (and other content, such as tutorials on the user of the commerce enabled video player and user instructions on generating item reviews) may be licensed. By way of example, a media company could use such review content and the commerce enabled video player to make their properties (e.g., websites, applications, etc.) more attractive to advertisers and may enable such media company to charge advertisers relatively higher advertising rates.

Figure 19A:
Figure 19B:

FIGS. 19A-B illustrates an example item review provided via an in-edit. The video review may be similarly presented via an advertisement. As similarly discussed above, and as illustrated in FIG. 19A, an image corresponding to the video review may be presented in the advertisement or editorial content, adjacent to and in conjunction with advertisement/editorial text and/or image(s) separate from the image corresponding to the video review. Optionally, the image corresponding to the video review is not an image from the video review. A video playback control may be displayed in association with the image corresponding to the video review (e.g., overlaying image in this example), which when selected by the viewer, causes the video player to be activated. For example, the video player optionally may pop up over the advertisement/editorial content, obscuring some or all of the advertisement/editorial content, as illustrated in FIG. 19B. Optionally instead, the video player may be presented in-line with the advertisement, without obscuring advertisement text. As similarly discussed above, the video player may include controls via which the user can indicate that the user wants the item, wants to initiate a purchase of the item, wants to share the video review with others, wants to poll others regarding the item being reviewed, and/or wants to record a review (e.g., of the item in the current review and/or of another item). In this example, a scrubber is provided, including representative images corresponding to item reviews included in the video review. The user may jump to a given item review by selecting a corresponding representative image, as similarly discussed above. The video review author and title of the video review (as well as of item reviews) may be presented as well via the video player.

Figure 25:
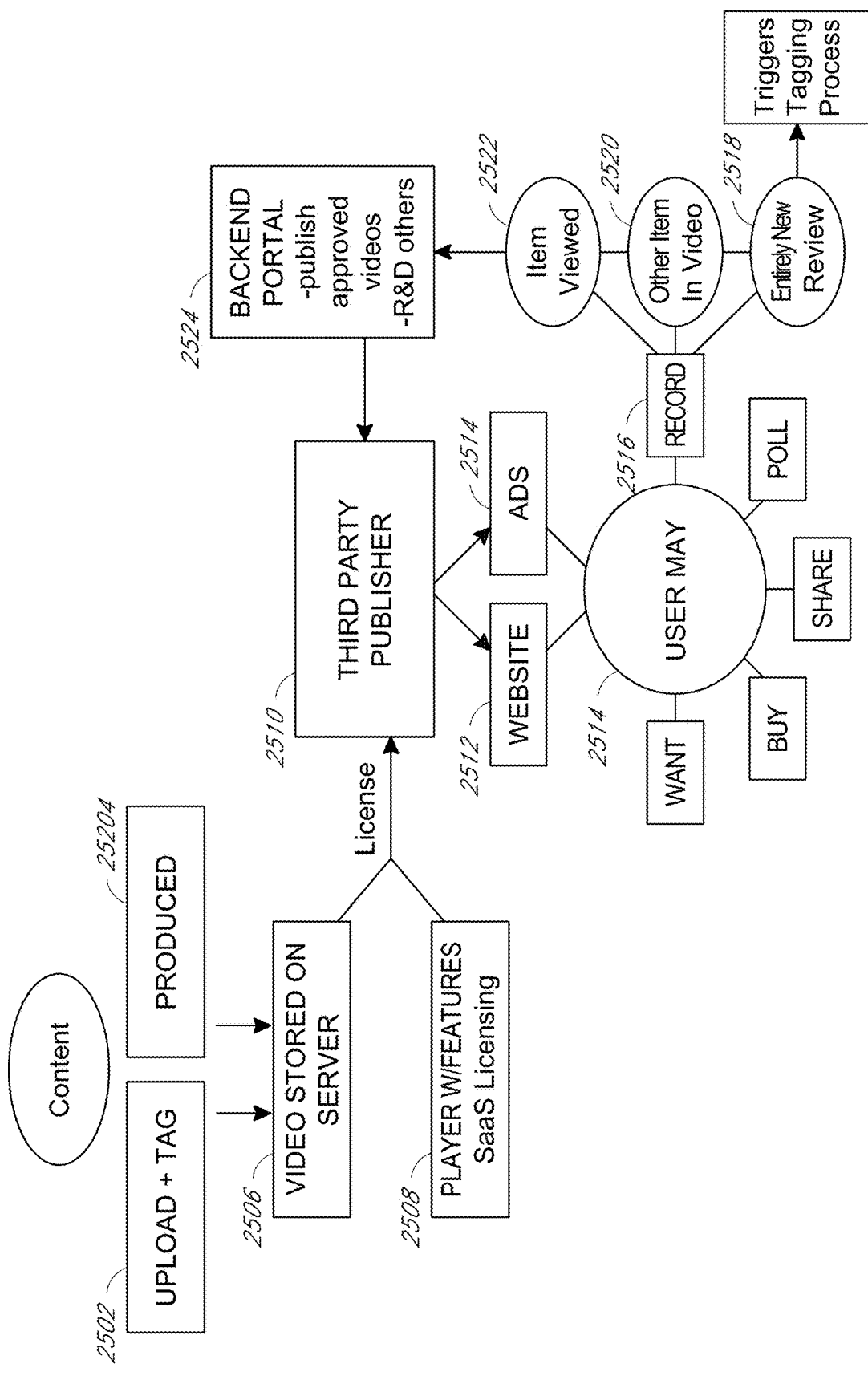

FIG. 25 illustrates an example process including utilization of an embedded video player, which may be displayed on a third party website, such as within editorial content (e.g., of an online magazine) or within an advertisement (e.g., a banner ad or otherwise). At state 2502, a reviewer uploads from a reviewer terminal a video review, including one or more item reviews, and associated metadata (e.g., tags and detail information) as similarly discussed above. At state 2504 the reviewer may instead record a new review (e.g., via a webcam or camcorder, as similarly discussed elsewhere herein). At state 2506, the video is stored on a remote system (e.g., of a posting system server). At state 2510, the review content and the video player 2508 is provided (or access thereto is provided) to a third party publisher. At states 2512, 2514 the third party publisher publishes the video player and the content in conjunction with editorial content (e.g., on a website magazine) and/or in an advertisement (which may be presented on a webpage), which users may then view via user terminals.

At state 2514, the user may interact with the video player as similarly discussed above with respect to FIG. 24. For example, the video player may enable the user indicate (e.g., via one or more controls) the user wants the item, wants to initiate a purchase of the item, wants to share the video review or a subset thereof (e.g., an item review) with others, wants to poll others regarding the item being reviewed, and/or wants to record a review (e.g., of the item in the current review and/or of another item). If the user indicates that the user wants to initiate a poll, the process may proceed as similarly discussed above with respect to FIG. 24.

If the user indicates that the user wants to record a new video review 2516, the process proceeds to states 2518 (where the user records a review for an item not included in the video review being viewed by the user), 2520 (where the user records a review for a different item included in the video review being viewed by the user), or 2522 (where the user records a review for the item whose review is currently displayed to the user). The process may then prompt the user to add metadata, such as tags and/or other item details, to the review, as similarly discussed elsewhere herein. Optionally, the user may be instructed to only include one item review in the recorded video review, and optionally the ability to indicate start positions for item reviews within the video review may be disabled or not provided.

At state 2524, the new review may optionally be reviewed by the third party publisher and/or other entity, as similarly discussed elsewhere herein, and/or may be used for research and development purposes and/or to better focus future advertising. If approved for publishing, the review may then be published by the third party publisher, optionally in conjunction with editorial content, an advertisement, and/or otherwise.

Certain embodiments provide location based services. Certain embodiments may determine a substantially current location of a user. For example, the user location may be determined from information transmitted by a mobile device being carried by the user. The mobile device may be a smart phone, a mobile entertainment device, a GPS enabled watch, or other device. The location information may be GPS-based, WiFi-based, and/or cell tower-based location information. The location information may be manually provided by the user (e.g., by entering in an address, selecting a corresponding contact record in a contact record data store, by checking in at a location, etc.). The location information may be transmitted via an application downloaded and installed on the user's mobile device to a remote system, such as the posting system, or may be preinstalled on the mobile device.

Based at least in part on the user's location, the system may determine which merchants are within a specified distance or vicinity of the user's location (e.g., within 30 meters, 100 meters, 500 meters, or other distance). The system may further determine what items and/or types of items are sold by merchants within the specified distance. The system may determine whether the system has access to video reviews (e.g., consumer generated video reviews) corresponding to one or more items and/or types of items sold by merchants within the specified distance. The system may then transmit to the user mobile device (e.g., to an application installed on the mobile device), one or more of the identified item video reviews (and/or links to such reviews), and may further transmit to the mobile device merchant referral information indicating which merchants sell or may sell the item, optionally in association with addresses of such merchants and/or directions from the user's location to such merchants.

Optionally, the system may further provide discount coupons or codes which can be applied to the purchase of the item at some or all of the identified merchants. Optionally, the merchants pay a fee to the system operator for such referral services and/or the merchants may pay a fee to the system operator for purchases made by users referred to the merchants. Optionally, when the user is close to (e.g., within a specified distance or area) and/or enters the merchant's establishment, the application installed on the user's mobile device (e.g., smart phone) may automatically prompt the user (via sound, text, and/or graphic alert) to view a review of an item the user has indicated they want or like and/or present a review (or notify the user regarding the review) based at least in part on the user's demographic information. The user may be presented with incentives, such as discounts, prior to and/or in response to entering the merchant's establishment. The user may also be provided incentives if the user records a review of an item(s) at the merchant's establishment. The review may be of the reviewed item or other item(s) at the merchant. Optionally, the user may manually access the application in order to record such a review. The review may be uploaded and tagged as similarly discussed above. In this manner, the viewing of a given review by a user leads to the user recording additional reviews, further expanding the amount of review content available to users.

Optionally, the user's friends or other contacts (e.g., as identified by the user on a social networking site) may be notified when the user enters a given merchant's establishment and/or makes a purchase at a given merchant's establishment. The notification may be transmitted in response to a manual indication provided by the user via the user's mobile device application (e.g., via a user interface) that the user has entered a given merchant's establishment and/or made a purchase at a given merchant's establishment. The notification may in addition or instead be transmitted in response to the system or the mobile device application detecting that the user has entered a given merchant's establishment (e.g., based on GPS, WiFi, cell tower-based, and/or other location information) and/or made a purchase at a given merchant's establishment. The notification may be posted on the user's social network page and/or transmitted to the user's friends (or other contacts) via email, SMS message, or otherwise.

While certain embodiments may have been discussed with reference to the reviews of items, such as products and services, certain of foregoing functionalities may be applied to other uses, such as online dating. For example, if a user provides a dating service with profile information of the user and/or of the traits desired by the user in a potential match, a dating system may utilize such information to identify other users who may be potential matches. If the potential matches are associated with video content, such as a potential match describing his or herself (e.g., a "self-review"), the dating system may assemble the video content for the plurality of potential matches into a single video file, with representative images included or identified corresponding to respective potential match videos. The representative image may include an image of the potential match.

The video file may be displayed via the video player, and some or all of the representative images may be displayed in the video player scrubber area. The user can select a given image in the scrubber area, and the corresponding portion of the video file will then be played back to the user, skipping over preceding video portions of other potential matches. Optionally, if a user selects an image, the user can indicate that they are interested in the corresponding potential match, and/or the application will navigate to an online dating site associated with the dating service, enabling the user to learn more about the potential match and/or to arrange a meeting with the potential match.

A navigation image or images may be displayed at locations other than the scrubber area. For example, one or multiple navigation images may be displayed outside of the video playback area, such as in a horizontal row above the video playback area, in a horizontal row below the scrubber area, in a vertical column to the left of the video playback area, and/or in a vertical column to the right of the video playback area. The navigation images may be displayed as an overlay (e.g., a translucent overlay) over an area of the video playback area. For example, one or multiple navigation images may be displayed over the video playback area, such as in a horizontal row towards the top of the video playback area, in a horizontal row towards the bottom of the video playback area, in a vertical column towards the left of the video playback area, and/or in a vertical column towards the right of the video playback area.

Figure 28A:
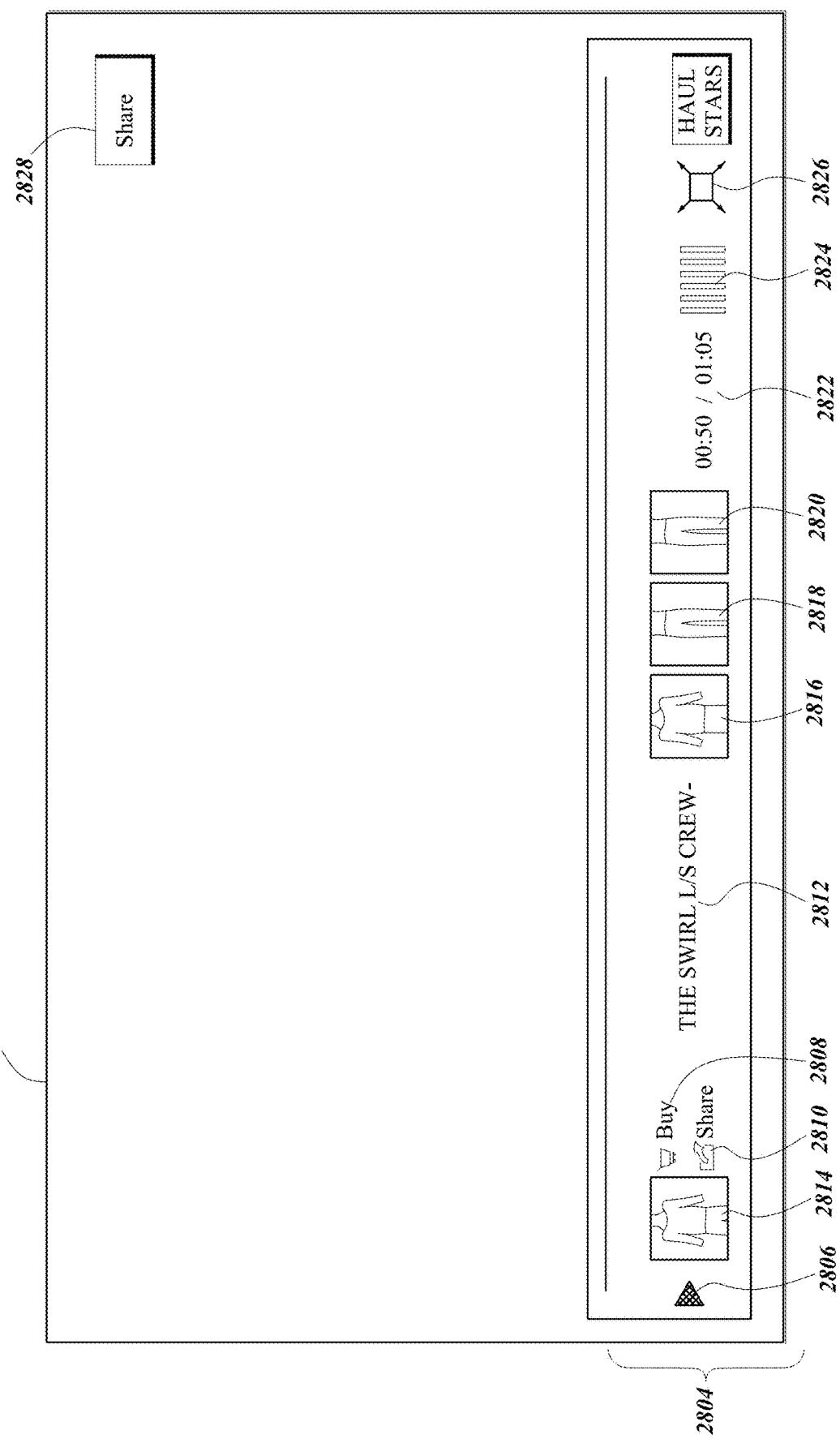
FIGS. 28A-28D illustrate still additional example user interfaces.

FIGS. 28A-28D illustrate example user interfaces comprising navigation images and video sharing controls. With reference to FIG. 28A, a media player is depicted with a video playback area 2802 and with a navigation area 2804. The navigation area 2804 includes a play control 2806, a buy control 2808, an item share control 2810, a title area 2812, navigation images 2814, 2816, 2818, 2820, a time indicator 2822, a volume control/indicator 2824, a full screen control 2826. In addition a video share control 2828 is provided. As discussed elsewhere herein, the navigation images may be positioned elsewhere, displaced from the video playback area 2802 or overlaying the video playback area 2802.

Figure 28B:
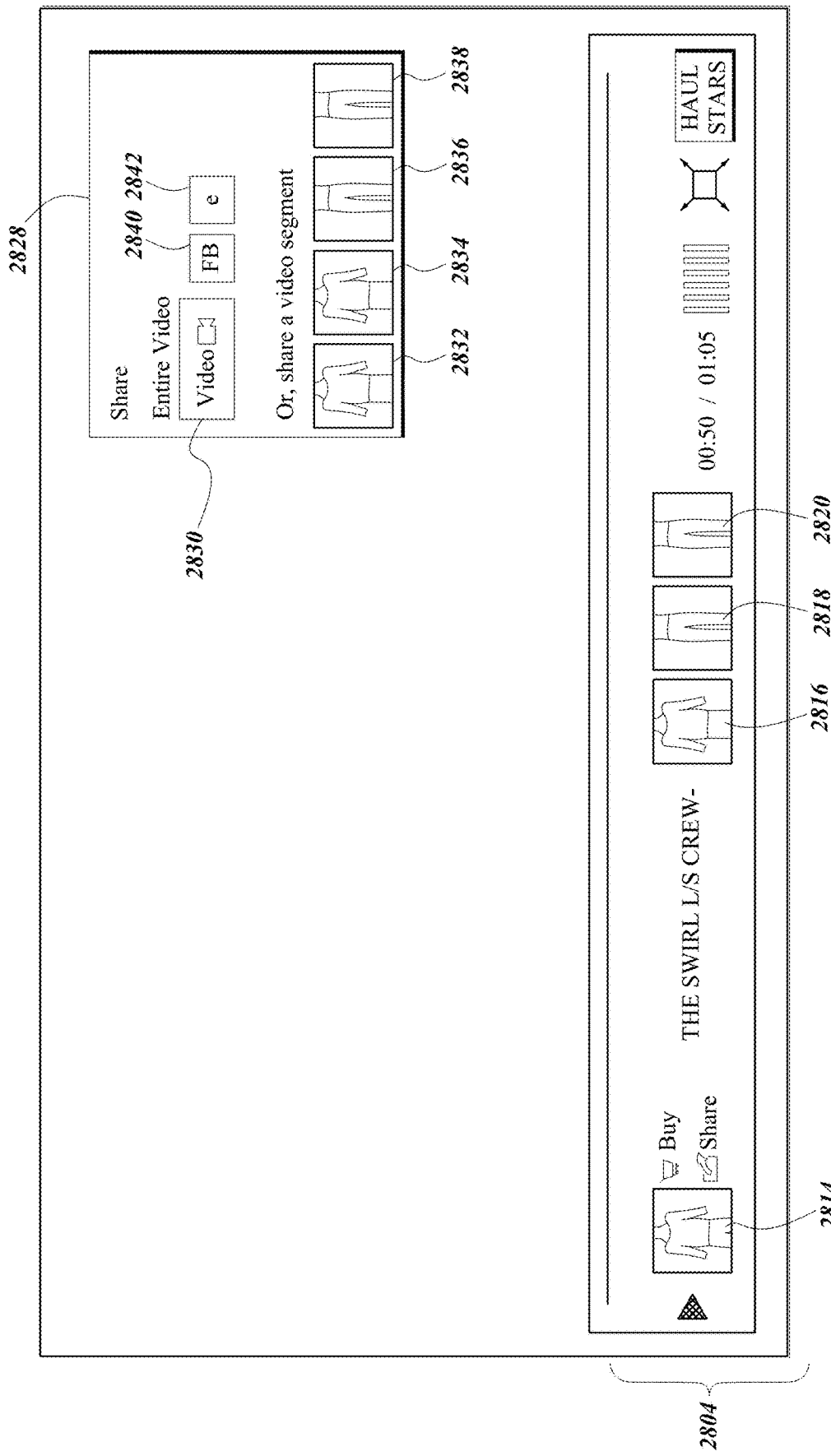

Referring to FIG. 28B, the media player is depicted in a state after a user activated the video share control 2828. The share control 2828 expands to provide a share entire video control 2830, and share video segments controls 2832, 2834, 2836, 2838 (where a given video segment may optionally correspond to an item (e.g., product) review. The share video segments controls 2832, 2834, 2836, 2838 may correspond to the navigation images 2814, 2816, 2818, 2820. Communication channel controls 2840, 2842 may be provided that enable a user to specify whether the video or video segment is to be shared via a social networking site, email, messaging service, microblog, etc.

Figure 28C:
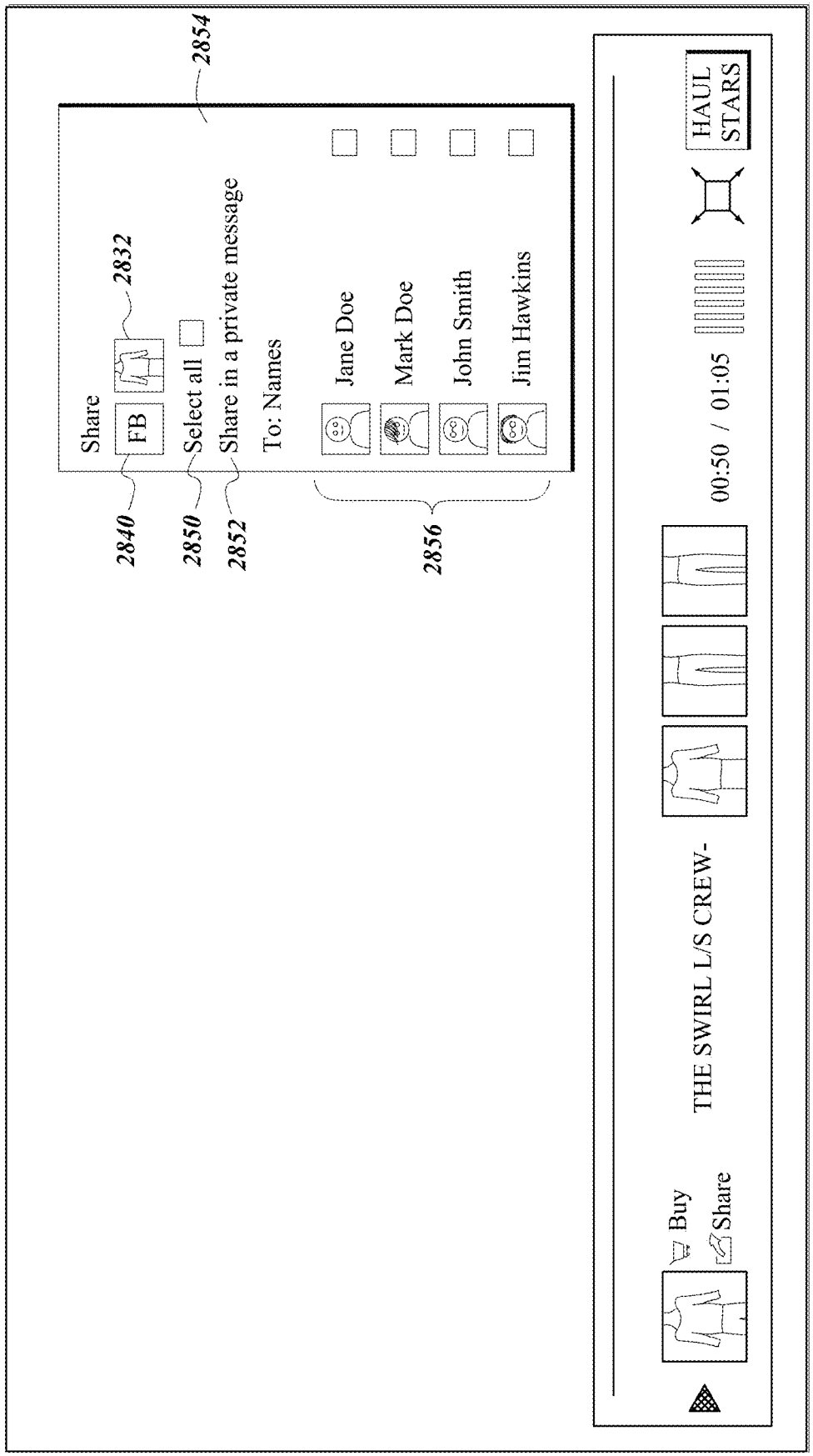

Referring to FIG. 28C, the media player is depicted in a state after a user activated the social network share control 2840 and the share video segment control 2832. A "select all" control 2850 enables the user to specify that the selected video or video segment is to be shared with the user's entire social network as defined via the social networking site. In addition, a "share in private message" control 2852 is provided enabling the user to share the video or video segment with recipients specified via the "to" field 2854 and/or by individually selecting (e.g., "checking") potential recipients in a listing of potential recipients 2856 gathered from the user's social networking site profile, the user's contact database, or otherwise.

Figure 28D:
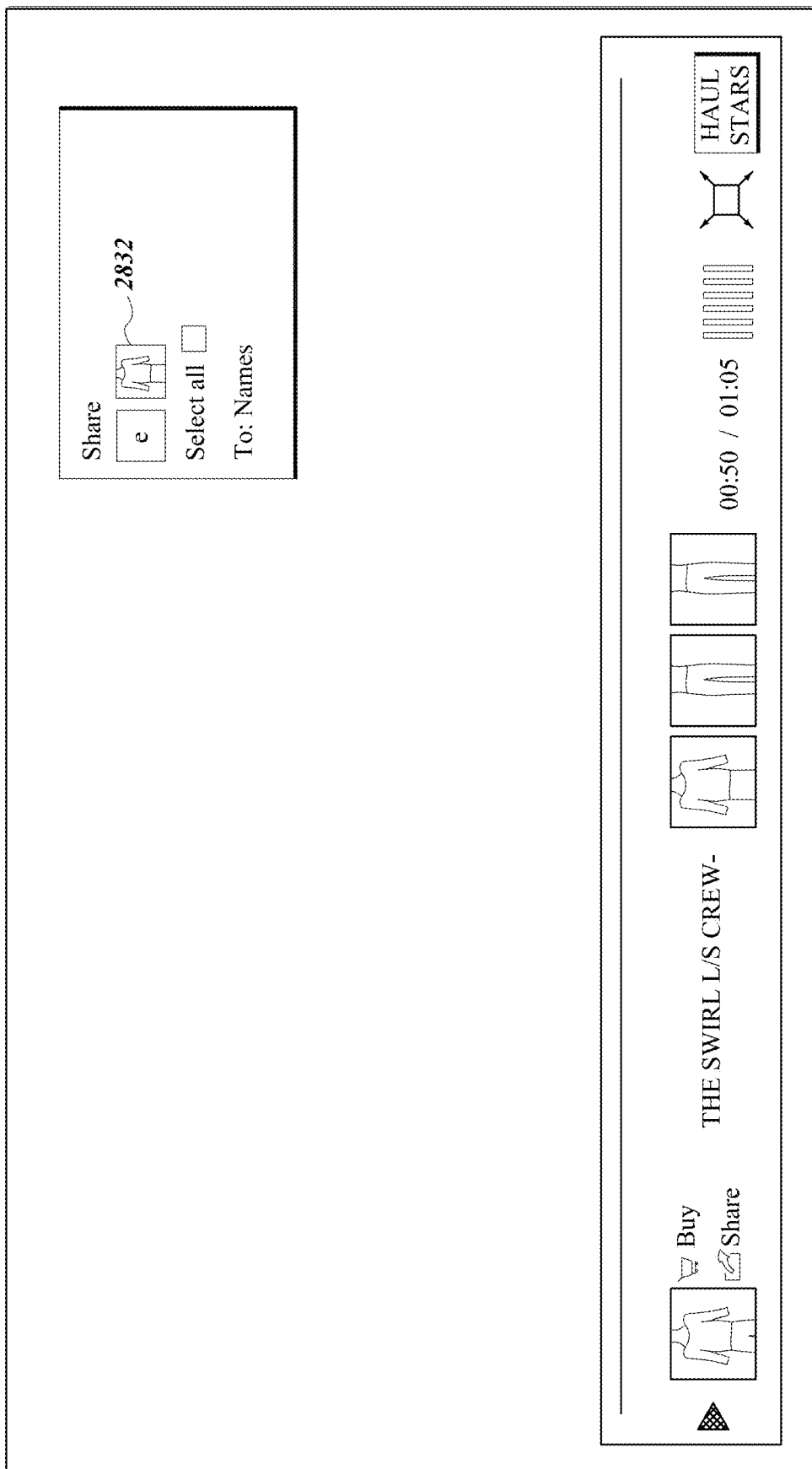

Referring to FIG. 28D the media player is depicted in a state after a user activated the email share control 2842 and the share video segment control 2832. A "select all" control enables the user to specify that the selected video or video segment is to be shared with the user's entire contact list, or the user can share the video or video segment with specific contacts via a "to:" address field."

Thus, example systems and methods are described for collecting and distributing user generated video reviews, for polling users with respect to reviewed items, and for enabling users to indicate that they want an item in a video review.

Certain embodiments may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors, wired and/or wireless network interfaces (e.g., cellular, Wi-Fi, Bluetooth, T1, DSL, cable, optical, or other interface(s) which may be coupled to the Internet), content databases, customer account databases, etc.). Data stores (e.g., databases) may be used to store some or all of the information discussed herein in memory.

By way of example, a given computing device may optionally include user interface devices, such as some or all of the following: one or more displays, keyboards, touch screens, speakers, microphones, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein a second.

While certain embodiments may be illustrated or discussed as having certain example components, additional, fewer, or different components may be used. Transmissions described herein may be via a wired and/or wireless network or other communications link. Further, with respect to the processes discussed herein, various states may be performed in a different order, not all states are required to be reached, and fewer, additional, or different states may be utilized.

User interfaces described herein are optionally presented (and user instructions may be received) via a user computing device using a browser, other network resource viewer, or otherwise. For example, the user interfaces may be presented (and user optionally instructions received) via an application (sometimes referred to as an "app") installed on the user's mobile phone, laptop, pad, desktop, television, set top box, phone, or other terminal. Various features described or illustrated as being present in different embodiments or user interfaces may be combined into the same embodiment or user interface. While certain examples may refer to a website or web page, other networked resources and other types of documents may be used, which may or may not use web standards to provide and/or receive information and instructions. While certain functionality may be described with respect to a mobile phone application, the same or similar functionality may be provided via other interfaces, such as a browser (optionally using browser plug-in), a camera equipped kiosk, or otherwise. Similarly, while certain functionality may be described with respect to a browser, similar or the same functionality may be provided via a dedicated app, a camera equipped kiosk, or otherwise.

While various features and advantages of the present invention have been described and illustrated in detail, it is to be understood by those skilled in the art that many modifications to the various embodiments herein can be made without departing from the spirit of the invention.

What is claimed is:

1. A method of providing improved navigation on a viewer device, the method comprising:

displaying a first user interface on a user device;

receiving over a network a first video uploaded via the first user interface at a first system, wherein the first system comprises multiple processors, wherein at least one of the multiple processors comprises multiple cores;

storing the first video in a plurality of storage mediums via a backup-enabled storage system;

in response to a user activating a first control, displaying on the user device a second user interface comprising a plurality of editing controls configured to enable the user to edit the first video after said receiving, wherein the plurality of editing controls comprises controls configured to edit metadata associated with the first video;

performing image analysis on a plurality of frames in the first video using the first system comprising multiple cores;

automatically generating descriptive text based on a result of said image analysis of the plurality of frames in the first video;

providing access to the first video to a viewer device comprising a display, the viewer device associated with a viewer;

streaming over the network, by the first system comprising multiple processors, the first video to the viewer device in a playback area, rendered on the display and enabling a draggable control to be displayed with the playback of the first video and overlaying the first video, wherein the draggable control comprises a draggable control useable to indicate where the viewer wants the video playback to begin or to browse frames in the first video;

displaying on the viewer device the automatically generated descriptive text in association with the playback of the first video;

detecting a viewer interaction with the automatically generated descriptive text; and at least partly in response to the viewer interaction, initiating a navigation event whereby a playback of the first video is initiated at a desired segment.

2. The method as defined in claim 1, the method further comprising:

wherein the second user interface comprises controls configured to enable removal of selected segments from the first video.

3. The method as defined in claim 1, the method further comprising:

displaying, on the viewer device, a third user interface enabling the viewer to share the first video via a communication, comprising a link to the first video, to a social network associated with the viewer;

displaying on the viewer device textual comments regarding the first video from a plurality of viewers at a same time as the first video;

displaying on the viewer device images corresponding to other videos uploaded by the user at a same time as the first video;

displaying on the viewer device, adjacent to the draggable control, images corresponding to respective segments of the first video in response to the draggable control being moved to respective draggable control positions;

receiving over the network a search query from the viewer device;

utilizing a search engine to identify one or more matching videos corresponding to the search query using tags associated with respective videos and to generate search results;

displaying on the viewer device at least a portion of the search results, the search results including respective images from respective videos included in the search results; and playing on the viewer device a video in the search results in response to the viewer interacting with a respective image in the search results.

4. The method as defined in claim 1, the method further comprising:

receiving inputs from a plurality of viewers regarding the first video; and rendering by the viewer device a graph, generated using the inputs from the plurality of viewers regarding the first video.

5. The method as defined in claim 1, the method further comprising:

displaying on the viewer device a user interface enabling the viewer to share the first video via a message comprising a link to the first video to a social network associated with the viewer.

6. The method as defined in claim 1, the method further comprising:

displaying using the viewer device a third user interface enabling the viewer to share a specified portion of the first video via a message comprising a link to the specified portion of the first video.

7. The method as defined in claim 1, the method further comprising:

receiving a search query over the network from the viewer device;

utilizing a search engine to identify one or more matching videos corresponding to the search query using tags associated with respective videos and to generate search results;

displaying at least a portion of the search results on the viewer device, the search results including respective images from respective videos included in the search results; and playing in full screen mode a video in the search results in response to the viewer interacting with a respective image in the search results.

8. The method as defined in claim 1, the method further comprising:

receiving over the network a search query from the viewer device;

utilizing a search engine to identify one or more matching videos corresponding to the search query using tags associated with respective videos and to generate search results;

displaying at least a portion of the search results on the viewer device, the search results including respective images from respective videos included in the search results; and playing a video in the search results in response to the viewer interacting with a respective image in the search results.

9. The method as defined in claim 1, the method further comprising:
displaying a search user interface on the viewer device;
receiving over the network a search query via the search user interface;
using a search engine to identify one or more matching videos corresponding to the search query and to generate search results;
displaying some or all of the search results on the viewer device, the search results including respective images from respective videos included in the search results;
displaying search terms on the viewer device in association with the search results;
detecting a viewer interaction with the search terms displayed on the viewer device in association with the search results;
in response to the detected viewer interaction with the search terms displayed on the viewer device in association with the search results, utilizing the search engine to identify one or more matching videos using tags associated with respective videos and to generate second search results; and
displaying some or all of the second search results on the viewer device, the second search results including respective images from with respective videos included in the second search results.

10. The method as defined in claim 1 the method further comprising:
embedding the first video on a third party website within an article in association with at least one feedback control;
receiving feedback via the at least one feedback control;
recording the received feedback; and
displaying data corresponding to the received feedback by at least one device.

11. The method as defined in claim 1 the method further comprising:
displaying images corresponding to respective segments of the first video adjacent to the draggable control in response to the draggable control being moved to respective draggable control positions.

12. The method as defined in claim 1 the method further comprising limiting a resolution of at least one video file to a first specified resolution.

13. The method as defined in claim 1, the method further comprising:
displaying on the viewer device at a same time as the draggable control a control overlaying the first video that when selected causes video content to be skipped and next video content to be presented;
displaying, overlaying the first video, on the viewer device time in the video indicating a current point in the first video;
displaying, at a same time as the first video, textual comments regarding the first video from a plurality of viewers; and
displaying at a same time as the first video images corresponding to other videos uploaded by the user and/or recommended videos.

14. The method as defined in claim 1, the method further comprising:
displaying on the viewer device a control with the first video via which the viewer can provide a like or dislike indications;
displaying by the viewer device a total number of likes received from viewers with respect to the first video;
displaying by the viewer device time indicating a current point in the first video, overlaying the first video;
displaying by the viewer device comments regarding the first video from one or more other viewers at a same time as the first video; and
displaying by the viewer device images corresponding to other videos uploaded by the user at a same time as the first video.

15. The method as defined in claim 1, the method further comprising:
displaying a control with the first video on the viewer device via which the viewer can provide a like indication with respect to the first video;
displaying on the viewer device with the first video a total number of likes received from viewers with respect to the first video;
generating a list of recommended videos for the viewer; and
displaying on the viewer device at least a portion of the list of recommended videos at a same as the first video is displayed, the list of recommended videos comprising respective images.

16. The method as defined in claim 1, the method further comprising live streaming at least one video.

17. The method as defined in claim 1, the method further comprising:
displaying on the viewer device a search user interface;
receiving a search query via the search user interface;
utilizing a search engine to identify a matching video corresponding to the search query using tags associated with respective videos and to generate search results;
displaying at least a portion of the search results on the viewer device;
displaying on the viewer device time data indicating a specific portion of at least a first matching video and an image from the specific portion of at first matching video, wherein the specific portion of the first matching video is after the beginning of the first matching video; and
at least partly in response to a viewer interaction with the image from the specific portion of the first matching video, playing the specific portion of the first matching video, wherein a prior portion of the first matching video is skipped.

18. The method as defined in claim 1, the method further comprising:
displaying a timeline user interface on the user device configured to enable multiple sections of a second video to be specified, the timeline user interface comprising:
a control enabling the user to navigate backwards and forwards through the second video;
a control enabling respective text and/or images to be associated with respective positions of the second video;
receiving via the timeline user interface an association of respective text and/or images with respective positions of the second video;
storing the association of respective text and/or images with respective positions of the uploaded video in association with the second video;
streaming the second video to be streamed to the viewer device; and
displaying on the viewer device some or all of the respective text and/or images associated with respective positions of the second video.

19. The method as defined in claim 1, wherein the first system comprises one or more computer systems.

20. The method as defined in claim 1, the method further comprising:
identifying videos that have at least one tag similar to a tag associated with the first video;
generating a list of recommended videos for the viewer from the identified videos that have at least one tag similar to the tag associated with the first video; and
displaying on the viewer device at least a portion of the list of recommended videos at a same as the first video is displayed, the list of recommended videos comprising respective images.

21. The method as defined in claim 1, wherein detecting a viewer interaction with the automatically generated descriptive text comprises detecting a viewer interaction within an area of a display of the viewer device containing the generated descriptive text.

22. A method of providing improved navigation on a viewer device, comprising:
receiving at a user device over a network from a remote system a streamed first video, the user device comprising a display and one or more processor devices;
displaying by the display of the user device a playback of the first video in a playback area;
displaying a draggable control overlaying the first video in the playback area, wherein the draggable control comprises a draggable control useable to indicate where the user wants the video playback to begin or to browse frames in the first video;
displaying by the user device automatically generated descriptive text from the remote system in association with the playback of the first video, the automatically generated descriptive text generated based at least in part on an image analysis of a plurality of frames in the first video;
detecting a user interaction with the automatically generated descriptive text;
at least partly in response to the user interaction, initiating a navigation event whereby a playback of the first video is initiated at a desired segment;
displaying on the user device a search user interface;
receiving a search query via the search user interface;
utilizing a search engine to identify a matching video corresponding to the search query using tags associated with respective videos and to generate search results;
displaying at least a portion of the search results on the user device;
displaying on the user device time data indicating a specific portion of at least a first matching video and an image from the specific portion of at first matching video, wherein the specific portion of the first matching video is after the beginning of the first matching video; and
at least partly in response to a user interaction with the image from the specific portion of the first matching video, playing the specific portion of the first matching video, wherein a prior portion of the first matching video is skipped.

23. The method as defined in claim 22, the method further comprising:
displaying by the user device a user interface enabling the user to share the first video via a message comprising a link to the first video to a social network associated with the user; and
in response to a user instruction received via the user interface, causing the first video to be shared via a first message comprising a first link to the first video to a first social network associated with the user.

24. The method as defined in claim 22, the method further comprising:
displaying using the user device a user interface enabling the user to share a specified portion of the first video via a message comprising a link to the specified portion of the first video; and
sharing a first specified portion of the first video via a first message comprising a first link to the first video in response to a user instruction provided via the user interface.

25. The method as defined in claim 22, the method further comprising:
displaying images corresponding to respective segments of the first video adjacent to the draggable control in response to the draggable control being moved to respective draggable control positions.

26. The method as defined in claim 22, the method further comprising:
displaying by the user device at a same time as the draggable control a control overlaying the first video that when selected causes video content to be skipped and next video content to be presented;
displaying, overlaying the first video, by the user device time in the video indicating a current point in the first video;
displaying, at a same time as the first video, textual comments regarding the first video from a plurality of users; and
displaying at a same time as the first video images corresponding to other videos uploaded by the user and/or recommended videos.

27. The method as defined in claim 22, the method further comprising:
displaying on the user device a control in association with a given video via which the user can provide a like indication with respect to a given video;
displaying on the user device in association with the given video a total number of likes received from users with respect to the given video; and
displaying on the user device a list of recommended videos received from the remote system at a same as the given video is displayed, the list of recommended videos comprising respective images.

28. The method as defined in claim 22, wherein detecting a viewer interaction with the automatically generated descriptive text comprises detecting a user interaction within an area of a display of the viewer device containing the generated descriptive text.

29. A method of providing improved navigation on a viewer device, comprising:
receiving at a user device over a network from a remote system a streamed first video, the user device comprising a display and one or more processor devices;
displaying by the display of the user device a playback of the first video in a playback area;
displaying a draggable control overlaying the first video in the playback area, wherein the draggable control comprises a draggable control useable to indicate where the user wants the video playback to begin or to browse frames in the first video;
displaying by the user device automatically generated descriptive text from the remote system in association with the playback of the first video, the automatically generated descriptive text generated based at least in part on an image analysis of a plurality of frames in the first video;

detecting a user interaction with the automatically generated descriptive text;

at least partly in response to the user interaction, initiating a navigation event whereby a playback of the first video is initiated at a desired segment;

displaying, by the user device, a user interface enabling the user to share the first video via a communication, comprising a link to the first video, to a social network associated with the user;

displaying by the user device textual comments regarding the first video from a plurality of users at a same time as the first video;

displaying by the user device images corresponding to other videos uploaded by a same entity as the entity that uploaded the first video at a same time as the first video;

displaying by the user device, adjacent to the draggable control, images corresponding to respective segments of the first video in response to the draggable control being moved to respective draggable control positions;

transmitting by the user device a search query to a search engine, the search query configured to utilize the search engine to identify one or more matching videos corresponding to the search query;

receiving by the user device search results generated by search engine, the search results including respective images from respective videos included in the search results; and playing by the user device a video in the search results in response to a user interacting with a respective image in the search results.

30. A method of providing improved navigation on a viewer device, comprising:

receiving at a user device over a network from a remote system a streamed first video, the user device comprising a display and one or more processor devices;

displaying by the display of the user device a playback of the first video in a playback area;

displaying a draggable control overlaying the first video in the playback area, wherein the draggable control comprises a draggable control useable to indicate where the user wants the video playback to begin or to browse frames in the first video;

displaying by the user device automatically generated descriptive text from the remote system in association with the playback of the first video, the automatically generated descriptive text generated based at least in part on an image analysis of a plurality of frames in the first video;

detecting a user interaction with the automatically generated descriptive text;

at least partly in response to the user interaction, initiating a navigation event whereby a playback of the first video is initiated at a desired segment;

displaying by the user device a control with the first video via which the user can provide a like or dislike indications;

displaying by the user device a total number of likes received from users with respect to the first video;

displaying by the user device time indicating a current point in the first video, overlaying the first video;

displaying by the user device comments regarding the first video from one or more other users at a same time as the first video; and displaying by the user device images corresponding to other videos uploaded by the user at a same time as the first video.

31. The method as defined in claim 30 the method further comprising:

transmitting by the user device a search query to a search engine, the search query configured to utilize the search engine to identify one or more matching videos corresponding to the search query;

receiving by the user device search results generated by search engine, the search results including respective images from respective videos included in the search results; and playing by the user device a video in the search results in response to a user interacting with a respective image in the search result.

32. The method as defined in claim 30, the method further comprising:

displaying a search user interface on the user device;

receiving a search query via the search user interface;

using a search engine to identify one or more matching videos corresponding to the search query and to generate search results;

displaying some or all of the search results on the user device, the search results including respective images from respective videos included in the search results;

displaying search terms on the user device in association with the search results;

detecting a user interaction with the search terms displayed on the user device in association with the search results;

in response to the detected user interaction with the search terms displayed on the user device in association with the search results, utilizing the search engine to identify one or more matching videos using tags associated with respective videos and to generate second search results; and displaying some or all of the second search results on the user device, the second search results including respective images from with respective videos included in the second search results.

\* \* \* \* \*